United States Patent [19]
Williams et al.

[11] Patent Number: 6,016,484
[45] Date of Patent: Jan. 18, 2000

[54] SYSTEM, METHOD AND ARTICLE OF MANUFACTURE FOR NETWORK ELECTRONIC PAYMENT INSTRUMENT AND CERTIFICATION OF PAYMENT AND CREDIT COLLECTION UTILIZING A PAYMENT

[75] Inventors: Humphrey Williams, Palo Alto; Kevin Hughes, San Mateo; Bipinkumar G. Parmar, Cupertino, all of Calif.

[73] Assignee: VeriFone, Inc., Santa Clara, Calif.

[21] Appl. No.: 08/639,880

[22] Filed: Apr. 26, 1996

[51] Int. Cl.⁷ .................................................. G06F 17/60
[52] U.S. Cl. ........................... 705/39; 235/375; 235/380; 345/326; 705/26
[58] Field of Search ................................... 705/26, 27, 39, 705/1; 380/23, 24; 235/375, 380, 381; 340/825.3, 825.35; 345/326, 333, 334, 340

[56] References Cited

U.S. PATENT DOCUMENTS

| | | | |
|---|---|---|---|
| 3,651,511 | 3/1972 | Andrews et al. | 340/324 |
| 3,956,615 | 5/1976 | Anderson et al. | 235/61.7 B |
| 4,277,837 | 7/1981 | Stuckert | 364/900 |
| 4,303,904 | 12/1981 | Chasek | 340/23 |
| 4,305,059 | 12/1981 | Benton | 340/825.33 |

(List continued on next page.)

FOREIGN PATENT DOCUMENTS

| | | |
|---|---|---|
| 0 172 670 A2 | 2/1986 | European Pat. Off. . |
| 0 256 768 A2 | 2/1988 | European Pat. Off. . |
| 0 256 768 A3 | 2/1988 | European Pat. Off. . |
| 0 326 699 | 8/1989 | European Pat. Off. . |
| 0 363 122 A2 | 4/1990 | European Pat. Off. . |

(List continued on next page.)

OTHER PUBLICATIONS

Warr, Michael. "Business Wants Telecom of the Future — Today," Telephony'SUPERCOMM Wrap—up, pp. 12–3, Apr. 1991.

Müller, R., "Lon—Das Universelle Netzwerk, Teil 1." Elektronik., vol. 40, No. 22, Oct. 29, 1991, Munchen De, pp. 59–69, XP000268228.

Snow, C.R. et al.: "Simple Authentication" Software Practice & Experience., vol. 24, No. 5, May 1994, Chichester Gb, pp. 437–447, XP0006555455, p. 440–441.

Stallings, W. "Data and Computer Communications", 1994, MacMillan Publishing Co., New York, US, XP002069639, pp. 636–644, 663–666.

Anderson, R. et al. "NetCard –a Practical Electronic—cash System." International Workshop Proceedings, Security Protocols. International Workshop, Cambridge, UK, Apr. 10–12. p. 49. XP00203977.

(List continued on next page.)

*Primary Examiner*—Edward R. Cosimano
*Attorney, Agent, or Firm*—Gardere & Wynne, L.L.P.; Sanford E. Warren, Jr.; Daniel J. Chalker

[57] ABSTRACT

An electronic monetary system provides for transactions utilizing an electronic-monetary system that emulates a wallet or a purse that is customarily used for keeping money, credit cards and other forms of payment organized. Access to the instruments in the wallet or purse is restricted by a password to avoid unauthorized payments. A certificate form must be completed in order to obtain an instrument. The certificate form obtains the information necessary for creating a certificate granting authority to utilize an instrument, a payment holder and a complete electronic wallet. Electronic approval results in the generation of an electronic transaction to complete the order. If a user selects a particular certificate, a particular payment instrument holder will be generated based on the selected certificate. In addition, a default bitmap for the instrument associated with a particular certificate is defined by the issuing agent for the certificate, and the default bitmap will be displayed when the certificate definition is completed. Finally, the number associated with a particular certificate will be utilized to determine if a certificate can be issued by a particular party.

21 Claims, 23 Drawing Sheets

U.S. PATENT DOCUMENTS

| | | | |
|---|---|---|---|
| 4,454,414 | 6/1984 | Benton | 235/379 |
| 4,614,861 | 9/1986 | Pavlov et al. | 235/380 |
| 4,630,201 | 12/1986 | White | 364/408 |
| 4,689,478 | 8/1987 | Hale et al. | 235/380 |
| 4,766,293 | 8/1988 | Boston | 235/379 |
| 4,799,156 | 1/1989 | Shavit et al. | 364/401 |
| 4,859,837 | 8/1989 | Halpern | 235/380 |
| 4,877,950 | 10/1989 | Halpern | 235/487 |
| 4,906,828 | 3/1990 | Halpern | 235/379 |
| 4,935,962 | 6/1990 | Austin | 380/25 |
| 4,968,873 | 11/1990 | Dethloff et al. | 235/380 |
| 4,977,595 | 12/1990 | Ohta et al. | 380/24 |
| 4,992,646 | 2/1991 | Collin | 235/375 |
| 5,016,274 | 5/1991 | Micali et al. | 380/23 |
| 5,030,806 | 7/1991 | Collin | 235/375 |
| 5,175,416 | 12/1992 | Mansvelt et al. | 235/379 |
| 5,221,838 | 6/1993 | Gutman et al. | 235/379 |
| 5,283,819 | 2/1994 | Glick et al. | 379/90 |
| 5,297,030 | 3/1994 | Vassigh | 705/25 |
| 5,420,405 | 5/1995 | Chasek | 235/379 |
| 5,440,634 | 8/1995 | Jones et al. | 380/24 |
| 5,442,791 | 8/1995 | Wrabetz et al. | 395/650 |
| 5,448,045 | 9/1995 | Clark | 235/382 |
| 5,452,352 | 9/1995 | Talton | 379/355 |
| 5,453,601 | 9/1995 | Rosen | 235/379 |
| 5,455,407 | 10/1995 | Rosen | 235/380 |
| 5,459,304 | 10/1995 | Eisenmann | 235/380 |
| 5,465,291 | 11/1995 | Barrus et al. | 379/67 |
| 5,475,826 | 12/1995 | Fischer | 395/182.04 |
| 5,476,259 | 12/1995 | Weingardt | 273/85 |
| 5,478,993 | 12/1995 | Derksen | 235/380 |
| 5,485,510 | 1/1996 | Colbert | 379/145 |
| 5,506,832 | 4/1996 | Arshi | 370/241 |
| 5,557,518 | 9/1996 | Rosen | 364/408 |
| 5,590,038 | 12/1996 | Pitroda | 385/241 |
| 5,590,197 | 12/1996 | Chen et al. | 380/24 |
| 5,671,279 | 9/1997 | Elgamal | 380/23 |
| 5,671,280 | 9/1997 | Aucsmith et al. | 380/30 |
| 5,677,955 | 10/1997 | Doggett et al. | 380/24 |
| 5,710,887 | 1/1998 | Chelliah et al. | 705/26 |
| 5,715,314 | 2/1998 | Payne et al. | 380/24 |
| 5,729,594 | 3/1998 | Klingman | 379/93.12 |
| 5,742,845 | 4/1998 | Wagner | 395/831 |
| 5,754,772 | 5/1998 | Leaf | 395/200.33 |
| 5,793,966 | 8/1998 | Amstein et al. | 395/200.01 |
| 5,796,841 | 8/1998 | Cordery et al. | 380/55 |

FOREIGN PATENT DOCUMENTS

| | | |
|---|---|---|
| 0 363 122 A3 | 4/1990 | European Pat. Off. . |
| 0 416 482 | 3/1991 | European Pat. Off. . |
| 0 527 639 | 2/1993 | European Pat. Off. . |
| 0 256 768 B1 | 3/1994 | European Pat. Off. . |
| 0 363 122 B1 | 12/1994 | European Pat. Off. . |
| 0 658 862 | 6/1995 | European Pat. Off. . |
| 0 666 681 | 8/1995 | European Pat. Off. . |
| 0 668 579 | 8/1995 | European Pat. Off. . |
| 2 251 098 | 6/1992 | United Kingdom . |
| WO 91/16691 | 10/1991 | WIPO . |
| WO 93/08545 | 4/1993 | WIPO . |

OTHER PUBLICATIONS

Computer Shopper, AT&T Offers Low–Tech Protection for Internet: No–Deductible Insurance for Online Buyers, May, 1996, pp. 81–82.

Computer Technology Review, Digital Signatures Keep Cyberstreets Safe for Shoppers, Feb. 1996, pp. 132–134.

Computer Weekly, Web Takes the Credit; Visa, MasterCard Join Forces to Develop Secure Payment Systems for Electronic Commerce; Company Business and Marketing, Feb. 8, 1996, pp. 9–10.

Computerworld, News Shorts, Feb. 5, 1996, pp. 32–33.

Computerworld, Microsoft Provides Rapid Net Deployment Ability, Mar. 18, 1996, pp. 321–323.

Computerworld, Briefs, Mar. 18, 1996, p. 324.

Computerworld, Predictions, Apr. 29, 1996, pp. 108–110.

Computerworld, Credit–Card Authorization Set For Net, May 13, 1996, pp. 16–17.

Corporate EFT Report, MasterCard, Visa to Combine Internet Security Standards, Feb. 7, 1996, pp. 12–13.

Corporate EFT Report, Products Could Spur On–Line Transactions, Mar. 6, 1996, pp. 364–365.

Corporate EFT Report, Amex Eyes Internet Security, Mar. 6, 1996, p. 366.

Corporate EFT Report, Corporate EFT Report News Briefs, Apr. 3, 1996, pp. 230–231.

Credit Card Management, Internet Commerce Gets A Boost, Mar. 1996, pp. 404–405.

Credit Card News, Electronic Commerce Gets a Boost, Feb. 15, 1996, pp. 526–527.

Daily Mail, Now Spending Cuts Are On the Cards; Money Mail, Feb. 7, 1996, pp. 14–15.

Daily Telegraph, Card Guard Makes It Safer to Cybershop, Feb. 2, 1996, p. 63.

Daily Telegraph, Innovations: Codes to Beat the Criminal Internet, Feb. 13, 1996, pp. 534–535.

Datamation, Microsoft Plays Internet Catch–U. Microsoft & the Enterprise: I–Nets; Company Business and Marketing; Cover Story, Mar. 15, 1996, pp. 344–348.

Des Moines Register, Safe Shopping On–Line; Card Associations Agree On Internet Security, Feb. 17, 1996, pp. 520–522.

Digital Media, Turning the Page; MCI Switches From News Corp to the Microsoft Network; Letter; Company Business and Marketing Column, Mar. 12, 1996, pp. 358–360.

Discount Merchandiser, Secure Electronic Transactions, Mar. 1996, pp. 406–407.

DM News, Open Market Offers Internet Security; Clients Can Get On the World Wide Web For Less than $1,000, Apr. 3, 1995, pp. 281–282.

DM News, Mainstream Alternative For Advertisers; Business Wants to be Visible; Cybercitizens Want to Buy, Feb. 12, 1996, pp. 543–545.

DM News, Canadian Big Guns Set Sights On Skittish Cybershoppers; St. Remy Multimedia, Cogco Cable in Quadruple Play, Feb. 19, 1996, pp. 506–508.

DM News, IBM's Commercial Online Service Will Build DBs, Track Spending, Feb. 19, 1996, pp. 509–510.

Denver Post, On–Line Car Dealer Rings Up 57 Sales In Four Months, Feb. 10, 1995, pp. 299–300.

dot.COM, Internet Data's Payment Service, Mar. 1, 1996, p. 408.

Edge: Work–Group Computing Report, Digital ID: Verisign Inc. To Provide Digital IDS For Open Market's Secure Webserver; Key Technology For Verifying the Identifies of Parties In Electronic Commerce, Aug. 21, 1995, pp. 236–237.

Edge: Work–Group Computing Report, E–Commerce: IBM Leads Industry With Comprehensive Strategy, Technologies for Electronic Commerce; Electronic Shopping, Secure Transactions, May 6, 1996, pp. 48–52.

EDI News, MasterCard, Visa To Combine Internet Security Standards, Feb. 19, 1996, pp. 511–512.
EDP Weekly, Visa, MasterCard Announce Single Technical Standard To Safeguard Payment Card Purchases on Internet, Feb. 12, 1996, p. 546.
EDP Weekly, American Express To License Microsoft Software To Help Secure Transactions Via Internet, Mar. 11, 1996, p. 361.
EDP Weekly, ANSI Committee Creates Special Task Group To Review Secure Electronic Transaction Protocol, Mar. 25, 1996, p. 304.
EDP Weekly, Network Security Expert Notes Major Flaws in Visa/MasterCard Security Plan, Apr. 22, 1996, p. 140.
EFT Report, Service Variety Seen Key to Home Banking's Future, Mar. 29, 1995, pp. 288–290.
EFT Report, MasterCard, Visa To Combine Internet Security Standards, Feb. 14, 1996, pp. 532–533.
Electronic Buyers' News, EC Providers Take On Security—Visa, MC Announce Transaction Standard; GE Intros B–to–B Solution, Feb. 12, 1996, pp. 547–548.
Electronic Buyers' News, SET Controversy Flares UP—Insiders Debate Integrity Of Proposed Standard, Apr. 29, 1996, pp. 113–115.
Electronic Engineering Times, Credit–Card Firms Agree On Security, Feb. 5, 1996, p. 34.
Electronic Engineering Times, E–Cash Coming? Bank On It, Feb. 19, 1996, pp. 513–516.
Electronic Engineering Times, Secure Internet Transactions Seen, Feb. 26, 1996, pp. 480–481.
Electronic Engineering Times, Copyright Protection Moves Into Digital Age, Mar. 18, 1996, pp. 325–327.
Electronic Engineering Times, Form Factors Figures Into Security Debate, Apr. 29, 1996, pp. 111–112.
Electronic Marketplace Report, Visa, MasterCard Announce Standard For Securing Internet Transactions, Feb. 6, 1996, pp. 17–18.
Electronic Messaging News, Visa, MasterCard Combine Standards, Feb. 7, 1996, p. 16.
Electronic Messaging News, MasterCard, Visa In Internet Pact, Feb. 26, 1996, p. 482.
Electronic Payments International, Ingenico Buys Innovatron Data Systems, Mar. 1996, pp. 409–410.
Electronic Payments International, Getting All SET For On–Line Commerce, Mar. 1996, pp. 411–412.
Electronic Payments International, The Growing Impact of the Internet, Mar. 1996, pp. 413–415.
Electronic Payments International, Telefonica Makes the Right Calls Before SET, Apr. 1996, pp. 244–245.
Electronic Payments International, Consortium Explores Internet Payments, Apr. 1996, pp. 246–247.
Electronic Payments International, Telefonica Makes the Right Calls Before SET, Apr. 1996, pp. 248–249.
Electronic Payments International, Consortium Explores Internet Payments, Apr. 1996, pp. 250–251.
Exchange, Novell Expands Networked Application and Electronic Commerce Offerings, Mar. 22, 1996, pp. 315–316.
Extel Examiner, Microsoft, American Express Unit Sign Internet Payment System, Feb. 29, 1996, p. 435.
FDCH Political Transcripts, The National Consumers League Holds a News Conference on Combatting Fraud on the Internet; Washington, D.C., Feb. 27, 1996, pp. 446–455.

Federal Document Clearing House Congressional Testimony, Testimony Oct. 17, 1995 Eugene Ludwig Comptroller Office of the Comptroller of the Currency House Banking Financial Institutions and Consumer Credit Bank Consolidation and Interstate Mega–Mergers, Oct. 17, 1995, pp. 214–226.
Federal News Service, Prepared Testimony of Eugene A. Ludwig Controller of the Currency Before the House Committee on Banking and Financial Services Subcommittee on Financial Institutions, Oct. 17, 1995, pp. 195–205.
Federal News Service, Prepared Statement of Joel S. Lisker Senior Vice President, Security and Risk Management Mastercard International Incorporated Before the House Committee on Banking and Financial Services, Apr. 15, 1996, pp. 168–172.
Federal News Service, Hearing of the House Banking and Financial Services Committee, Apr. 15, 1996, pp. 173–216.
Financial Post, Reaching Out on the Electronic Highway, Mar. 14, 1996, pp. 353–355.
Financial Post, Race on to Come Up With Web Payment System, Apr. 27, 1996, pp. 122–124.
Financial Times, Credit Card Groups to Co–Operate on Internet Security, Feb. 2, 1996, p. 64.
Fresno Bee, Credit Firms Set Internet Security Code, Feb. 2, 1996, p. 65.
Gazette (Montreal), Digital Sermon Packs 'Em In: 1,100 From Business World listen Raptly to Technoguru's Generalities, Apr. 18, 1996, pp. 149–151.
Gazette (Montreal), Bell Global Has High Hopes for Business Network, Apr. 19, 1996, pp. 147–148.
Houston Chronicle, Firms Back Cyberspace Verification System, Jun. 26, 1995, pp. 253–256.
Independent, In Brief: Amex and Microsoft Sign Internet Deal, Mar. 1, 1996, p. 416.
Industry Week, Move Over China, Caught In the Web, May 1, 1995, p. 271.
Information & Interactive Services Report, Microsoft, Wal–Mart Pact Aims for Online Bargain–Hunters, Feb. 23, 1996, pp. 491–492.
InformationWeek, Intranet Tools, E–Mail on the Net to Debut—Major Announcements Expected at Internet World, Electronic Messaging Association Conferences, Apr. 22, 1996, pp. 142–143.
InformationWeek, Cisco Places $4 Billion Network Bet—StrataCom Buy Seen Extending ATM, Typing Switching and Routing, Apr. 29, 1996, pp. 116–117.
InformationWeek, Netscape's Corporate Push Grows—CompuServe Tie–In Puts Groupware on Internet, May 13, 1996, p. 27.
InformationWeek, In Short; Terisa Names CEO, May 13, 1996, p. 29.
InfoWorld, National Semiconductor's PersonaCard; Card Holds Key to On–Line Security, Nov. 14, 1994, pp. 310–311.
InfoWorld, Standards; Adapt or Die: Internet Standards May Always Be In Flux, Nov. 6, 1995, pp. 187–192.
InfoWorld, At Deadline, Feb. 5, 1996, pp. 35–36.
InfoWorld, RSA Sale May Improve Security, Apr. 22, 1996, p. 144.
InfoWorld, Pipeline, Apr. 22, 1996, p. 145.
InfoWorld, Internet Servers; Netscape Antes Up for Commerce, May 13, 1996, pp. 30–31.
InfoWorld, IBM, HP Preview Net Products Aimed On–Line Commerce, May 13, 1996, p. 33.

InfoWorld, Web Page Authoring Tool; Internet Creator Builds Sites One Paragraph at a Time; No Need to Master HTML; Tool Enables On–Line Commerce, May 13, 1996, pp. 35–37.

InformationWeek, Europe, Oct. 2, 1995, pp. 231–234.

Interactive Daily, 4. Cyberspace Security Bolstered by Pact, Feb. 2, 1996, p. 68.

Interactive Daily, 5. Microsoft Allies With American Express, Mar. 1, 1996, p. 417.

Interactive Marketing News, Mastercard and Visa Reach Agreement on Security Protocols, Feb. 16, 1996, pp. 523–524.

International Herald Tribune, A Giant Leap for Credit Cards? System to Protect Payments on Internet is Unveiled, Feb. 2, 1996, pp. 66–67.

Investor's Business Daily, The Electronic Wallet: Secure Payment Methods Sought for Internet, Dec. 8, 1994, pp. 305–307.

Investor's Business Daily, CEO Briefing; A4, Mar. 28, 1996, pp. 285–286.

Korea Economic Daily, Mastercard, Visa Agree to a Single Security Standard, Feb. 6, 1996, p. 19.

Los Angeles Times, The Cutting Edge: Special Report/Hot Tips; What's Coming, When, and Whey It's a Big Deal; Next Year Could Bring Start Of On–Line Profits, Dec. 18, 1994, pp. 303–304.

Los Angeles Times, Technology, Feb. 1, 1996, p. 139.

M2 Presswire, Adobe and Netscape to bring Commercial Publishing to the Internet (C) 1994–95 M2 Communications LTD, Mar. 31, 1995, pp. 283–285.

M2 Presswire, Verisign, Inc: VeriSign Inc to Provide Digital IDs for Open Market's Secure WebServer, Aug. 16, 1995, pp. 238–240.

M2 Presswire, Rednet: EDI for the Apple Macintosh and Power PC, Oct. 24, 1995, pp. 193–194.

M2 Presswire, Visa Intl: Security Specifications for Card Transactions on Internet Combined into One Standard, Feb. 1, 1996, pp. 140–141.

M2 Presswire, First Data: FD and Netscape Offering Internet Payment Processing Service New Service Available Now, Feb. 21, 1996, pp. 495–496.

M2 Presswire, Visa: Visa and MasterCard Welcome American Express to Their Internet Payment System, Mar. 1, 1996, pp. 418–419.

M2 Presswire, Credit Card Research Group: Cards to Make a Clean Sweep of the Cybermarket, Mar. 1, 1996, pp. 420–421.

M2 Presswire, Racal Airtech: Racal Supports the Visa/MasterCard Secure Electronics Transactions, (SET) Specification, May 2, 1996, pp. 62–63.

Media Daily, Microsoft, Visa Announce Specification to Secure Payments, Sep. 27, 1995, p. 235.

Media Daily, Mastercard and Visa Agree on Online Security Standard, Feb. 1, 1996, p. 136.

Media Daily, Netscape Launches Payment System, May 13, 1996, p. 38.

Report on Microsoft, News Briefs: Visa and Mastercard, Apr. 22, 1996, p. 146.

Midrange Systems, GEIS Aims to Stimulate EDI Growth, Mar. 15, 1996, pp. 349–350.

Milwaukee Journal Sentinel, U.S. Postal Service to Enter Electronic Age, Mar. 4, 1996, pp. 379–380.

Multimedia & Videodisc Monitor, Tools & Technology: Mastercard, Visa Agree on Encryption Technology, Mar. 1, 1996, p. 422.

Multimedia Week, Industry Briefs: Encryption, Feb. 5, 1996, p. 39.

Nation's Restaurant News, Amex, Microsoft Seal Security Agreement. American Express Travel Related Services Co. Signs Licensing Agreement With Microsoft Corp.; Brief Article, Mar. 18, 1996, p. 328.

Nave Research Group, Navigating and Acting in Virtual Environments, May 16, 1996, pp. 1–9.

Network Briefing, Visa & Mastercard Agree E–Payment Spec, Feb. 16, 1996, p. 525.

Network Computing, More Than One Way to Skin a Coded Cat, Mar. 15, 1996, p. 351.

Network World, Wells Fargo Hops Aboard 'Net Wagon, Feb. 6, 1995, pp. 301–302.

Network World, An Insecure Feeling Haunts the 'Net, Feb. 12, 1996, pp. 541–542.

Network World, Wal–Mart to Lure Electronic Shoppers With Web Retail Store, Feb. 19, 1996, pp. 504–505.

Network World, News Briefs, Mar. 4, 1996, pp. 377–378.

Network World, Security Specification Is Full of Holes, Critics Charge, Apr. 22, 1996, pp. 138–139.

Network World, ActiveX Pioneer Pushes Commerce, May 6, 1996, pp. 46–47.

Network World, Ready, SET, Go; American Express, MasterCard, and Visa Throw Their Combined Weight Behind the SET Payment Protocol for the Web; Merchants May Face a Learning Curve, May 13, 1996, pp. 18–23.

Network World, Effort Aims to Unite 'Net Payment Schemes, May 13, 1996, p. 24.

Network World, Netscape Unveils New 'Net Commerce Offerings, May 13, 1996, pp. 25–26.

News, Credit Card Fraud New Concern of Internet Business, Mar. 16, 1996, pp. 329–330.

Newsbytes News Network, France—Bull Forms Smart Card Subsidiary Apr. 13, 1995, pp. 274–275.

Newsbytes News Network, Open Market Intros "Secure" Web Storefront Oct. 17, 1995, pp. 206–207.

Newsbytes News Network, Newsbytes Daily Summary Oct. 17, 1995, pp. 208–213.

Newsbytes News Network, Commerce Direct Offers Secure Electronic Transactions Jan. 22, 1996, pp. 177–178.

Newsbytes News Network, ****Visa, Mastercard Combine Internet Security Standards Feb. 2, 1996, pp. 71–72.

Newsbytes News Network GTE's CyberTrust For Web Electronic Commerce Feb. 6, 1996, pp. 20–21.

Newsbytes News Network, AT&T WorldNet Spurs Online Credit Use Feb. 6, 1996, pp. 22–23.

Newsbytes News Network, Open Market, Interleaf Team On Web "Secure Doc Mgt" Mar. 5, 1996, pp. 367–369.

Newsbytes, Web Marketplace—Online Security Agreement Almost Here Apr. 10, 1996, pp. 224–225.

News Tribune, Business Briefly, Feb. 2, 1996, pp. 69–70.

New York Times, A New Standard is Proposed for Electronic Verification, Jun. 26, 1995, pp. 257–258.

New York Times, Plan to Guard Credit Safety on Internet, Feb. 1, 1996, pp. 142–143.

New York Times, Jan. 28–Feb. 3; Attention, Cyber–Shoppers!, Feb. 4, 1996, p. 40.

New York Times, Diary, Feb. 4, 1996, pp. 41–43.

Nightly Business Report, Feb. 1, 1996, pp. 144–154.

Orange County Register, Life on the Line; Credit Where Credit is Due, Mar. 31, 1996, pp. 283–284.

Orange County Register, Bits and Pieces, Apr. 7, 1996, pp. 226–227.

PC Magazine, MasterCard and Visa Join Forces for Net Commerce; To Develop the Secure Electronic Transactions Technical Standard for Protecting Credit Card Purchases Made Over the Internet; Technology Information; Brief Article, Mar. 26, 1996, pp. 291–292.

PC Magazine, Skinny Client to Rule on Web; Corporate Intranets Will Fuel a New Breed of Applications; Industry Trend or Event; Brief Article, Mar. 26, 1996, pp. 293–294.

PC Magazine, MasterCard and Visa Join Forces for Net Commerce, Mar. 26, 1996, pp. 295–296.

PC Magazine, Skinny Clients to Rule on Web, Mar. 26, 1996, pp. 297–298.

PC Magazine, Digital Bucks? Stop Here; Electronic Commerce Services; The Web at War: The Battle for the Future of the Internet; Company Business and Marketing, May 28, 1996, pp. 2–5.

PC Magazine, Digital Bucks Stop Here, May 28, 1996, pp. 6–9.

PC User, Shortlist; News Briefs, Feb. 21, 1996, pp. 497–499.

PC Week, Briefly Noted; News Briefs; Brief Article, Feb. 5, 1996, pp. 37–38.

PC Week, AT&T Ramps Up Internet Commerce, Access to WorldNet Service; Company Business and Marketing: Brief Article, Feb. 19, 1996, p. 517.

PC Week, Big Player; Deals to Speed Net Commerce; Netscape, Oracle, HP Cut Agreements for Credit–Card Systems, Security; Industry Trend or Event, Feb. 26, 1996, pp. 483–484.

PC Week, Microsoft Reposition MSN; Microsoft Network to Offer New Services; Online Service Information; Brief Article, Feb. 26, 1996, pp. 485–486.

PC Week, Microsoft Reposition MSN, Feb. 26, 1996, pp. 487–488.

PC Week, Briefly Noted; News Briefs; Brief Article, Mar. 4, 1996, p. 381.

PC Week, New Security Protocol Spurs Internet Took Kits; Secure Electronic Transaction, Industry Trend or Event, Apr. 15, 1996, pp. 217–218.

PC Week, New Security Protocol Spurs Internet Took Kits, Apr. 15, 1996, pp. 219–220.

PC Week, IBM Takes Charge of E–Commerce: Plans Client, Server Apps Based on SET; NetCommerce Electronic Commerce System; Product Announcement, Apr. 29, 1996, pp. 118–119.

PC Week, IBM Takes Charge of E–Commerce; Plans Client, Server Apps Based on SET, Apr. 29, 1996, pp. 120–121.

Portland Press Herald, L.L. Bean to Offer Ordering By Internet; It's a Bold Move for a Firm That's Usually Slow to Adopt New Technology, May 2, 1996, pp. 56–58.

PR Newswire, Bank One Joins Commercenet, Oct. 17, 1994, pp. 314–315.

PR Newswire, Rudolph Beware MCI to Offer Cyber–Santas a Faster Route to the Mall via Mouse; MarketplaceMCI Opens Door to 25 Million New Customers; Integrated Software Package Assures Secure Electronic Transactions, Nov. 22, 1996, pp. 308–309.

PR Newswire, Microsoft Corp. Chooses Software.Net (TM) to be first to Electronically Deliver Microsoft Software; Software.Net to Electronically Market Over Microsoft Products Via the Internet, Oct. 17, 1995, pp. 227–228.

PR Newswire, Visa and MasterCard Combine Security Specifications for Card Transactions on the Internet into One Standard; Move Expected to Accelerate Development of Electronic Commerce and Bolster Consumer Confidence in the Security of Cyberspace Transactions, Feb. 1, 1996, pp. 155–156.

PR Newswire, SAIC is £Yourservice for Secure Electronic Transactions on the Internet, Feb. 29, 1996, pp. 436–437.

PR Newswire, American Express Signs Licensing Agreement With Microsoft to Make Secure Purchases Over the Internet, Feb. 29, 1996, pp. 438–439.

PR Newswire, Visa and Mastercard Welcome American Express, Feb. 29, 1996, pp. 440–441.

PR Newswire, Centura Announces the Next Step in Online Money Management, Apr. 15, 1996, pp. 221–222.

PR Newswire, Industry Security Leader Racal Supports Visa/Mastercard Proposal for Internet, Apr. 17, 1996, pp. 152–153.

PR Newswire, Spyglass(TM) Supports Microsoft's ACTIVEX, SET, PCT and ISAPI With Introduction of New Spyglass Web Technology Kits, Apr. 23, 1996, pp. 132–133.

PR Newswire, Cybersource's New Internet Commerce Services Provide Software Publishers Turn–Key Electronic Transaction and Distribution Services; Qualcom, Insignia, Wall Data and Seven Other Publishers Choose CyberSource to Distribute Products Via the Internet, Apr. 30, 1996, pp. 99–101.

PR Newswire, 1996 Olympic Games Web Site Proves a Successful as Venue for Olympic Ticket Sales; IBM–Developed Server Enables Secure Electronic Transactions for a Large Number of Consumers, May 1, 1996, pp. 83–84.

PR Newswire, Dynamic Duo Taxware and IBM; Partners on the Commerce.Net, May 1, 1996, pp. 85–86.

PR Newswire, DocuMagix Hotpage Available Now Online Via Software.Net; Software.Net Offers DocuMagix HotPage with Exclusive Custom Content, May 7, 1996, pp. 44–45.

PR Newswire, Netscape Announces Netscape Livepayment (TM) to Facilitate Internet Commerce; Leading Companies to Support Netscape's Open, Cross–Platform Softweare for Online Credit Card Processing, May 13, 1996, pp. 39–41.

Record, Security is Going on Line; Mastercard, Visa Agree on Standard, Feb. 2, 1996, pp. 73–75.

Reuters, Bank One Corp <One.N> Says Joins Commercenet, Oct. 17, 1994, p. 316.

Reuters, MasterCard, Visa to Set Electronic Standard NYT, Feb. 1, 1996, p. 160.

Reuters, Visa and Mastercard Adopt Joint Internet Standard, Feb. 1, 1996, pp. 164–165.

Reuters, GE<GE.N> Info Services Debuts net Commerce System, Feb. 6, 1996, pp. 24–25.

Reuters, AMEX <AXP.N>, Microsoft <MSFT.O> In Pact, Feb. 29, 1996, p. 442.

Reuters, Netscape<NSCP.O> Offers Secure Internet Collection, May 13, 1996, p. 42.

Reuter Business Report, America Online, Others Push for Net Security, Apr. 11, 1995, pp. 276–277.

Reuter Business Report, Visa and Mastercard Adopt Joint Internet Standard, Feb. 1, 1996, pp. 158–159.

Reuter Business Report, Mastercard, Visa to Set Electronic Standard NYT, Feb. 1, 1996, p. 157.

Reuter Business Report, Improving Internet Safety to Protect Commerce, Apr. 3, 1996, p. 232–234.

Reuter European Business Report, American Online, Others Push for Net Security, Apr. 11, 1995, pp. 278–279.

Reuter European Business Report, Mastercard, Visa to Set Electronic Standard—NYT, Feb. 1, 1996, p. 161.
Reuter European Business Report, Visa and Mastercard Adopt Joint Internet Standard, Feb. 1, 1996, pp. 162–163.
Reuter World Service, MasterCard, Visa to Set Electronic Standard—NYT, Feb. 1, 1996, p. 169.
Risk Management, Are You Exposed on the Internet? Security Issues and Data Protection; Circuit Breakers, Apr. 1996, pp. 252–254.
Rocky Mountain News, Visa, MasterCard Agree on 'Net Security; Deal Allows to Offer Customers Greater Protection in On Line Services, Feb. 2, 1996, pp. 76–77.
Rocky Mountain News, The Web: It's Anybody's Business; Colorado Retailers and Service Companies Caught Up in Awesome Potential of Internet, Mar. 24, 1996, pp. 305–310.
Sacramento Bee, Credit Card Standard Set for Net, Feb. 23, 1996, pp. 78–79.
The San Diego Union–Tribune, Business; Ed. 1,2,3,4,5,6,7, 8; p. C–2, Mar. 1, 1996, pp. 423–424.
The San Francisco Chronicle, Mastercard, Visa Accord on Internet Credit–Card Giants Agree on a Security Standard, Feb. 1, 1996, pp. 137–138.
The San Francisco Examiner, Credit–Card Companies OK Internet Security Deal, Feb. 1, 1996, pp. 166–167.
The San Francisco Examiner, Infobahn leads to a Volvo Dealer, Mar. 1, 1996, pp. 297–298.
Seybold Report on Desktop Punlicshjing, Visa, MasterCard Adopt SET, Feb. 19, 1996, pp. 518–519.
South China Morning Post, Business; Banking; p. 7, Mar. 30, 1995, pp. 286–287.
Standard & Poor's Emerging & Special Situation, New Issues—Cybercash Avoid, Feb. 20, 1996, pp. 502–503.
The Straits Times (Singapore), Larger NetworkAsia Show This Year, Apr. 25, 1995, pp. 272–273.
The Straits Times (Singapore), Credit Card Firms Devise Joint Net Payment Scheme, Feb. 2, 1996, p. 81.
The Straits Times (Singapore), Music Scene Alive and Thriving Since the '30s, Feb. 6, 1996, pp. 26–27.
The Straits Times (Singapore), Concern Grows Over Credit Card Debts, Mar. 24, 1996, pp. 311–314.
Sunday Times, Credit Card Set Standard for Net Buys, Feb. 4, 1996, p. 44.
Telecomworldwire, Global Players Unite on Payment Standards, Feb. 1, 1996, p. 168.
Telecomworldwire, Sidewire: Science Applications International Corp, a US Provider of Information and Network, Mar. 1, 1996, p. 425.
Telecomworldwire, Adobe, Netscape Form Major Commercial Internet Publishing Plan, Apr. 4, 1995, p. 280.
The Toronto Star, Firm Unveils Secure Net Paying System, Mar. 27, 1996, pp. 287–288.
Origin Universal New Services Limited, Racal Supports the Visa/Mastercard Secure Electronics Transactions (SET), May 1, 1996, pp. 87–88.
Upside, The Cyber Bowl, Apr. 1996, pp. 255–266.
Upside, The Key to Security, Apr. 1996, pp. 267–276.
Upside, End of the Line for On–Line Services?, May 1996, pp. 89–98.
U.S. Banker, Card Pact Weaves A Tighter Net, Mar. 1996, p. 426.
Wall Street Journal, Visa, Mastercard Reach an Agreement for Single System of Internet Payment, Feb. 1, 1996, p. 170.
The Washington Post, Feb. 2, 1996, pp. 83–84.
The Washington Post, Give Us Some Credit: Your Card is Safe; There Are Many Very Good Reasons Not to Shop On–Line. Fear That Your Credit Card Number Will be Abused Should Not Be One of Them, Apr. 24, 1996.
The Washington Post, Who Was That Masked Cybershopper?; MasterCard–Visa Agreement on Credit Card Security May Make On–Line Commerce Fly, Feb. 2, 1996, p. 82.
Working Woman, Adventure On–Line . . . ; Using Online Services to Make Travel Arrangements, Apr. 1996, pp. 277–282.
Your Money, Brokers Not Equal When It Comes to Charging Customers, Mar. 16, 1996, pp. 331–337.
Your Money, Credit Card Fraud New Concern of Internet Business, Mar. 16, 1996, pp. 338–339.
Borenstein et al., MIME (Multipurpose Internet Mail Extensions) Part One: Mechanisms for Specifiying and Describing the Format of Internet Message Bodies, Borenstein & Freed, Sep. 1993.
Fielding et al., Hypertext Transfer Protocol—HTTP/1.1, Fielding, Frystyk, Berners–Lee, Gettys and Mogul, May 2, 1996, Jun. 3, 1996.
An RSA Laboratories Technical Note, Version 1.5, Revised Nov. 1, 1993.
Internet Protocol, DARPA Internet Program Protocol Specification, University of Southern California, Sep. 1981.
Transmission Control Protocol, DARPA Internet Program Protocol Specification, University of Southern California, Sep. 1981.
Anderson, R.J., UEPS—A Second Generation Electronic Wallet, (1992) University of Cambridge Computer Laboratory, pp. 411–418.
Bank Systems Technology, SET Tool Kit for Secure Commerce, (May 1996) p. 16.
Warr, Michael. "Business Wants Telecom of the Future—Today, " Telephony's Supercomm Wrap–up, pp. 12–3. Apr. 1991.
Müller, R., "Lon–Das Universelle Netzwerk, Teil 1." Elektronik., vol. 40, No. 22, Oct. 29, 1991, Munchen De, pp. 59–69, XP000268228.
Snow, C.R. et al: "Simple Authentication" Software Practice & Experience., vol. 24, No. 5, May 1994, Chichester GB, pp. 437–447 XP0006555455, pp. 440–441.
Stallings, W. "Data and Computer Communications", 1994, MacMillan Publishing Co., New York, US, XP002069639, pp. 636–644, 663–666.
Anderson, R. et al. "NetCard—a Practical Electronic–cash System." International Workshop Proceedings, Security Protocols. International Workshop, Cambridge, UK, Apr. 10–12. p. 49. XP00203977.
Bellare et al., iKP—A Family of Secure Electronic Payment Tools, USENIX Association, First USENIX Workshop on Electronic Commerce, (Jul. 11–12, 1995) pp. 89–106.
Bryant, A., Am I Bid Six? Click to Bid Six!, The New York Times, (Mar. 13, 1996) pp. D1–D6.
Camp et al., Token and Notational Money in Electronic Commerce, USENIX Association, First USENIX Workshop on Electronic Commerce, (Jul. 11–12, 1995), pp. 1–12.
Cox et al., NetBill Security and Transaction Protocol, USENIX Association, First USENIX Workshop on Electronic Commerce, (Jul. 11–12, 1995), pp. 77–88.
One–Click Software Distribution Via the Web, Cutting Edge, Datamation, (May 1, 1996), p. 16.
Software Taps Net for Supply Data Sharing, Purchasing, EBN, (Apr. 22, 1996), p. 50.
Flohr, U., Electronic Money, Byte, (Jun. 1996), p. 74.

Gifford, et al., Payment Switch for Open Networks, USENIX Association, First USENIX Workshop on Electronic Commerce, (Jul. 11–12, 1995), pp. 69–75.

Gosling, et al., The Java Language Environment a White Paper, Sun Microsystems Computer Company, (May 1995).

Jones, et al., Securing the World Wide Web, Smart Tokens and Their Implementation, World Wide Web Journal, O'Reilly & Associates, Inc., (Dec. 11–14, 1995), pp. 397–409.

Kamens, J., Retrofitting Network Security to Third–Party Applications—The SecureBase Experience, USENIS Association, UNIX Security Symposium IV, (1993) pp. 41–57.

Marshall, M., Banking on the Internet, Communications Week, (May 20, 1996) No. 611.

Messmer, E., ActiveX Pioneer Pushes a Commerce, Network World, (May 6, 1996) p. 33.

Messmer, E., Edify Soft to Let Banks Open Doors Online, Network World, (May 20, 1996).

Messmer, E., Start–Up Puts Security Socks on Window Apps, Network World, (May 20, 1996).

Microsoft and VeriFone Announce Agreement to Deliver Commerce–enabled Internet Retailing Solutions, Microsoft Press Release, (Aug. 5, 1996) pp. 1–3.

Real Security, Mondex Magazine, (Summer 1996) pp. 5–6.

What's Up Doc?, That's Infotainment, Mondex Magazine, (Summer 1996) pp. 8–10.

Ready to Go. The Trillion Yen Business, Mondex Magazine, (Summer 1996) pp. 27–29.

Morgan, L., Cashing In: The Rush is on to Make Net Commerce Happen, Internet World, (Feb. 1995), pp. 48–51.

Nash, et al., Vendors Deliver IS–Specific Apps Over the 'Net, News (May 6, 1996) p. 16.

Nee, E., Hatim Tyabji, Upside, (Sep. 1996) pp. 85–93.

Neuman, et al., Requirements for Network Payment: The NetCheque™ Perspective, University of Southern California, (1995) pp. 32–36.

Ozer, K., Online Software Stores, PC Magazine, (May 28, 1996), p. 36.

Rodriguez, K., Pushing the Envelope, Communications Week, (May 13, 1996) pp. 37–39.

Rupley, S., Digital Bucks? Stop Here PC Magazine, (May 28, 1996), pp. 54–60.

Semilof, M., Boosting Web Business, Communications Week, (May 20, 1996) pp. 31–32.

Sibert et al., The DigiBox: A Self–Protecting Container for Information Commerce, First USENIX Workshop on Electronic Commerce, (Jul. 11–12, 1995), pp. 171–183.

Sirbu, et al., NetBill: An Internet Commerce System Optimized for Network Delivered Services, Carnegie Mellon University, (1995) pp. 20–25.

Sliwa, C., Netscape Unveils New 'Net Commerce Offerings, Network World, (May 13, 1996) p. 10.

Singleton, A., Cash on the Wirehead, Byte, (Jun. 1995) pp. 71–78.

Tang, et al., A Set of Protocols for Micropayments in Distributed Systems, First USENIX Workshop on Electronic Commerce, (Jul. 11–12, 1995) pp. 107–115.

Thompson, et al., A Secure Public Network Access Mechanism, UNIX Security Symposium, (1992) pp. 227–238.

Trommer, D., ECS Catalog Merges EDI/Net Platforms: Enables Online Ordering in EDI Format Over Net, EBN, (May 20, 1996) p. 54.

Trommer, D., GE/Netscape Form Software Venture: Will Focus on Electronic Commerce Solutions, EBN, (Apr. 22, 1996) p. 54.

Vaughan–Nichols, Steven, XVision Turns a PC Into X Terminal for Unix, VMS Host, Government Computer News, Jul. 8, 1996, pp. 38, 42.

Vincenzetti et al., STEL: Secure TELnet, 5th UNIX Security Symposium, Jun. 5–7, 1995.

Wexler, Joanie, AT&T Sell Insurers on the Web, Network World, May 20, 1996, p. 27.

Wiggins, Richard, Business Browser: A Tool to Make Web Cocmmerce Secure, Internet World, Feb. 1995, pp. 52, 54, 55.

Yacobi, Yacov, Efficient Electronic Money, Official Gazette, Apr. 23, 1996, p. 2976.

Yee et al., Secure Coprocessors in Electronic Commerce Applications, First USENIX Workshop on Electronic Commerce, Jul. 11–12, 1995, pp. 155–169.

ABA Banking Journal, Will SET Kill Card Fraud On the Internet?, Apr., 1996, pp. 237–238.

Advertising Age, Visa Turns to Redgate for Online, CD–Rom Work; Sample the Surf; Checkfree, Cybercash Interact; New on the 'Net; EDS Joins the Cyber–Rush, Jul. 17, 1995, pp. 249–250.

AFX News, Microsoft, American Express Unit Sign Internet Payment System Agreement, Feb. 29, 1996, p. 427.

Agence France Presse, Visa, Matercard Announce Security Standard for Internet, Feb. 1, 1996, p. 85.

The American Banker, Vendors Ready—and Waiting—for E–Commerce, Feb. 2, 1996, pp. 47–50.

The American Banker, News Analysis: Despite Accord, Hard Work Ahead On Security Standard for Internet, Feb. 2, 1996, pp. 51–53.

The American Banker, Microsoft Signs Visa as a Processor; Pact Gives Banks Alternative to Intuit, Feb. 14, 1996, pp. 528–529.

The American Banker, Two New On–Line Alliances Pair Niche Leaders, Feb. 21, 1996, pp. 493–494.

The American Banker, News Analysis: Beware of Deals Like Verifone–Oracle, Banks Told, Feb. 27, 1996, pp. 443–445.

The American Banker, Amex Accepts SET Protocol For Payments On Internet, Mar. 1, 1996, pp. 382–383.

The American Banker, Encryption Software Firm Adopt On–Line Protocol, Mar. 14, 1996, p. 352.

The American Banker, Frontiers, Mar. 18, 1996, pp. 317–319.

The American Banker, Card Briefs: Novus Supporting SET Payment Protocol, Apr. 2, 1996, p. 235.

The American Banker, If It Has To Do With Data Security, Changes Are This 'Little' Company Is in Involved, Apr. 15, 1996, pp. 156–160.

The American Banker, On the Question of Internet Security, A Three–Sided Debate, Apr. 15, 1996, pp. 161–165.

The American Banker, Web Security Firm To Add MC–Visa Protocol, Apr. 23, 1996, pp. 130–131.

The American Banker, Card Briefs: ICverify Internet Tools To Get SET Protocol, May 3, 1996, p. 53.

The American Banker, Mastercard Official Resigns To Lead Internet Security Firm, May 3, 1996, pp. 54–55.

American Marketplace, Visa–Mastercard Security Agreement: A Green Light For Online Commerce, Feb. 8, 1996, pp. 5–6.

Amusement Business, More 'Digital Homeless' Find Place in Cyberspace; Professionals Not Subscribing To An Online Computer Service, Feb. 12, 1996, pp. 536–537.

AP Online, Cable TV's Sci–Fi Channel, Jun. 9, 1995, pp. 259–261.

AP Online, Purchases On Net Studied, Jan. 31, 1996, pp. 171–172.
AP Online, AP Top News At 5 a.m. EST Thursday, Feb. 1, 1996, pp. 86–88.
AP Online, AP Top News At 6 a.m. EST Thursday, Feb. 1, 1996, pp. 89–91.
AP Online, AP Top News At 7 a.m. EST Thursday, Feb. 1, 1996, pp. 92–94.
AP Online, AP Top News At 8 a.m. EST Thursday, Feb. 1, 1996, pp. 95–97.
AP Online, AP Top News At 9 a.m. EST Thursday, Feb. 1, 1996, pp. 115–117.
AP Online, AP Financial News At 9:10 a.m. EST Thursday, Feb. 1, 1996, pp. 118–122.
AP Online, AP Top News At 10 a.m. EST Thursday, Feb. 1, 1996, pp. 125–127.
AP Online, Standard Found for Web Credit, Feb. 1, 1996, pp. 123–124.
AP Online, AP financial News At 11:10 a.m. EST Thursday, Feb. 1, 1996, pp. 107–110.
AP Online, AP Financial News At 3:10 p.m. EST Thursday, Feb. 1, 1996, pp. 98–102.
AP Online, AP Financial News At 5:10 p.m. EST Thursday, Feb. 1, 1996, pp. 103–106.
AP Online, AP Financial News At 5:20 p.m. EST Thursday, Feb. 1, 1996, pp. 111–114.
AP Online, Amer Express Backs Rival Ides, Feb. 29, 1996, pp. 428–429.
AP Worldstream, Financial Pages, Feb. 1, 1996, pp. 128–129.
AP Worldstream, Financial Pages, Feb. 29, 1996, pp. 430–432.
AP Worldstream, A Summary of News From the U.S. Virgin Islands, May 25, 1995, pp. 265–268.
Asia, Inc., Internet Security, May 1996, pp. 64–66, 67–69.
Asian Banker, Shopping On the Internet, Mar. 1996, pp. 384–388.
Asian Wall Street Journal, Fraud, Nosy Web Pages Torment Internet Users, Mar. 18, 1996, p. 320.
Asiaweek, Protocols, Cyber Security; How to Head Off the Hackers, Feb. 23, 1996, pp. 489–490.
Associated Press, Cable's Sci–Fi Channel Creates World Wide Web 'Home Page', Jun. 9, 1995, pp. 262–264.
Associated Press, Visa and MasterCard Lead Group to Make Credit Purchases Safe On the Net, Jan. 31, 1996, pp. 173–174.
Associated Press, Visa, MasterCard Resolve Technical Diferences For On–Line Credit Transactions, Feb. 1, 1996, pp. 130–131.
Associated Press, American Express Endorses Rivals' Ideal for Secure Online Credit, Feb. 29, 1996, pp. 433–434.
Associated Press, American Express Endorses Rivals' Ideal for Secure Online Credit, Mar. 1, 1996, pp. 389–390.
Austin American–Statesman, Standard Proposed For Electronic Verification, Jul. 3, 1995, pp. 251–252.
Austin American–Statesman, Credit Cards To Get Internet Security; Visa, MasterCard Have Agreed On a Way to Scramble Card Numbers, Feb. 2, 1996, pp. 45–46.
Baltimore Sun, Sun Names former Reporter to lead Move Into Internet; Service Will offer News and Advertising, Jan. 31, 1996, pp. 175–176.
Banker, Banks Take Charge, Mar. 1996, pp. 396–399.
Banker, Product, Mar. 1996, pp. 400–403.
Banker, Technology, Banks Take Charge, Mar. 1996, pp. 391–394.
Banker, Visa and MasterCard Join Forces to Develop Standards, Mar. 1996, p. 395.
Banker, Credit Card Standards, Apr. 1996, p. 239.
Banking Policy Report, Visa and MasterCard Move to Safeguard Card Transactions on Internet, Mar. 4–18, 1996, pp. 370–371.
Bank Systems & Technology, First Union, Open Market Hit the Internet, May 1995, pp. 269–270.
Black Sun Interactive, 3D PointWorld, Downloading, PointWorld, Apr. 16, 1996, p. 1.
Business Journal–Portland, Taking the Plunge Into On–Line Sales, Feb. 9, 1996, pp. 2–4.
Business Times, SNS Online Service Confident of Success, Nov. 27, 1995, pp. 184–186.
Business Times, Opening Windows to Net Security, Mar. 6, 1996, pp. 362–363.
Business Times, Card, IT Leaders Make Shopping On the Net Safer, Apr. 2, 1996, p. 236.
Business Wire, MasterCard International Goes Live On the Internet; New MasterCard World Wide Web Site Home Page Combines Utility and Imagination, Mar. 27, 1995, pp. 294–296.
Business Wire, Adobe and Netscape to Bring Commercial Publishing to the Internet, Mar. 28, 1995, pp. 291–293.
Business Wire, Emerging U.S. Debit Market Attracts International Player Jul. 27, 1995, pp. 244–245.
Business Wire, VeriSign Inc. to Provide Digital IDs for Open Market's Secure WebServer; Key Technology for Verifying the Identities of Parties in Electronic Commerce, Aug. 14, 1995, pp. 241–243.
Business Wire, ComNet '96 Explores Electronic Commerce; Business On the Internet the Focus of Many Conference Sessions, Jan. 4, 1996, pp. 181–183.
Business Wire, "Computer Within a Floppy Disk" Puts Secure Electronic Commerce In the Palm of Your Hand, Jan. 17, 1996, pp. 179–180.
Business Wire, RSA Data Security, Inc. Establishes Japanese Subsidiary Company to Market RSA Encryption Technology to Developers in Japan, Feb. 8, 1996, pp. 7–8.
Business Wire, VeriSign to Provide Digital ID Services for FTP Software's Esplanade (TM) Web Server for Windows NT; Alliance Will Ensure Secure Electronic Transactions for Users of New Web Servers, Feb. 12, 1996, pp. 538–540.
Business Wire, First Data dn Netscape Offering Internet Payment Processing Service; New Service Available Now, Feb. 20, 1996, pp. 500–501.
Business Wire, RSA Announces Support for SET Payment Standard Across Entire Product Line; World's Most Popular Encryption Solution Provider Now Supports Visa/MasterCard Standard for Secure Payments Over the Internet, Mar. 4, 1996, pp. 372–373.
Business Wire, Certicom—Special Task Group to Review Secure Electronic Transaction Protocol Developed by Visa and MasterCard—Sherry E. Shannon Appointed Chair of the New Task Group, Mar. 15, 1996, pp. 340–341.
Business Wire, Panel of Electronic Commerce Experts to Reveal "What Gates and McNealy Won't Tell You About Electronic Commerce"—ICat Corp. Convenes Panel of Pioneers to Discuss the Hype and Reality at New York Trade Show, Mar. 26, 1996, pp. 289–290.
Business Wire, Major Flaws Seen in Visa/MasterCard Security Plan for Internet Commerce; Network Security Expert Says RSA Encryption and Authentication Standard Leaves Consumers Vulnerable to Hackers, Apr. 16, 1996, pp. 154–155.

Business Wire, ICVERIFY to Incorporate SET Specification in its Software Solutions; SET Specification Provides Long Awaited Internet Security for both Customers and Merchants, Apr. 26, 1996, pp. 125–126.

Business Wire, John Gould Joins Terisa Systems As Chief Executive Officer, Apr. 29, 1996, pp. 102–103.

Business Wire, IBM Leads Industry With Comprehensive Strategy, Technologies for Electronic Commerce; Electronic Shopping, Secure Transactions, May 1, 1996, pp. 70–75.

Business Wire, L.L. Bean Signs Up With IBM; IBM Announces New Products, Services that Make Internet Real for Business, May 1, 1996, pp. 76–80.

Business Wire, Electronic Commerce Just Got Real; NETCOM, Federal Express, Open Market and CheckFree Join iCat to Discuss Breakthrough Electronic Commerce Solution, May 2, 1996, pp. 59–61.

Calgary Herald, Visa and MasterCard Agree On Standard, Feb. 2, 1996, pp. 54–55.

Calgary Herald, 'Net Security Hinders Commerce, Apr. 4, 1996, pp. 228–229.

Canada Newswire, Attention Business/Technology Editors: Special Task Group to Review Secure Electronic Transaction Protocol Developed by Visa and MasterCard, Mar. 15, 1996, pp. 342–343.

CardFAX, A Joint Technical Standard for Security Credit Card Transactions Over the Internet, Feb. 2, 1996, p. 56.

Card News, Security Advances May Improve, Not Perfect, On–Line Transactions, Feb. 5, 1996, pp. 28–30.

Card News, Amex, First Data Initiate On–Line Purchase Efforts, Mar. 4, 1996, pp. 374–375.

Card News, Card News Briefs: Discovery Joins Security Rush, Apr. 1, 1996, p. 240.

Card News, Cards on the Web Addressed, Apr. 29, 1996, pp. 104–105.

Cards International, VeriSign Secures Net Deals, Jul. 20, 1995, pp. 246–247.

Cards International, International: MC and Visa Co–Operate On Internet Specs, Feb. 14, 1996, 530–531.

Cards International, Amex Set to Support Security Specs, Mar. 12, 1996, pp. 356–357.

Charleston Gazette, Secure Internet Credit Code Unveiled, Feb. 2, 1996, pp. 57–59.

U.P.I., Checkfree Partnering With Cybercash, Jul. 19, 1995, p. 248.

Chicago Sun–Times, Visa, MasterCard Agree On Online Security, Feb. 2, 1996, pp. 60–61.

Christian Science Monitor, Visa, MasterCard Tackle Internet Security, Feb. 2, 1996, p. 80.

Columbus Dispatch, Roving Bandits Make Buying Risky Business, Nov. 6, 1994, p. 312–313.

COMLINE Daily News from Korea, MasterCard, Visa Agree to a Single Security Standard, Feb. 7, 1996, p. 11.

Communications News, Business Banks Its Future On Electronic Commerce; Strategies Being Pursued for Secure Financial Transactions on the Internet; Netcomm Update; Industry Trend or EventCom, Apr. 1996, pp. 241–243.

CommunicationsWeek, MCI Offers Secure Transaction Service, Oct. 2, 1995, pp. 229–230.

CommunicationsWeek, In Brief; Charge It On the 'Net, Feb. 5, 1996, p. 31.

CommunicationsWeek, On–Line Payment Scheme Arrives, Feb. 26, 1996, pp. 456–458.

CommunicationsWeek, In Brief; Amex 'Set' For Internet, Mar. 4, 1996, p. 376.

CommunicationsWeek, Safety on the 'Net—Can Encryption Offer Peace of Mind to Nervous Network Managers, Mar. 25, 1996, pp. 299–303.

CommunicationsWeek, Tandem, VLSI Partner to Develop Security Chips for Commercial Use, Apr. 15, 1996, p. 166–167.

CommunicationsWeek, Shop Till You Drop With the JEPI Standard, Apr. 22, 1996, pp. 134–135.

CommunicationsWeek, Terisa, to Add SET to Web Software, Apr. 29, 1996, pp. 106–107.

CommunicationsWeek, Netscape Adds Electronic–Commerce Apps, May 13, 1996, pp. 10–11.

CommunicationsWeek, Internet Security—A Moving Target, May 13, 1996, pp. 12–15.

Computer Conference Analysis Newsletter, UniForum; Conference On Unix and Open Systems With Focus On the Internet; Industry Trend or Event, Feb. 26, 1996, pp. 459–479.

Computer Connection, Telecomm Decency Act Draws Cheers, Jeers and Fears, Feb. 10, 1996, pp. 549–557.

Computer Connection, Internet Security Standards Agreement, Feb. 10, 1996, pp. 558–559.

Computergram International, Microsoft Confounded: Visa–MasterCard Spec Free, Feb. 2, 1996, p. 62.

Computergram International, First Data, Netscape Jointly Deliver First Real–Time On–Line Credit, Apr. 11, 1996, p. 223.

Computer Reseller News, Terisa Systems Enters Channel With Security Products, Apr. 22, 1996, pp. 136–137.

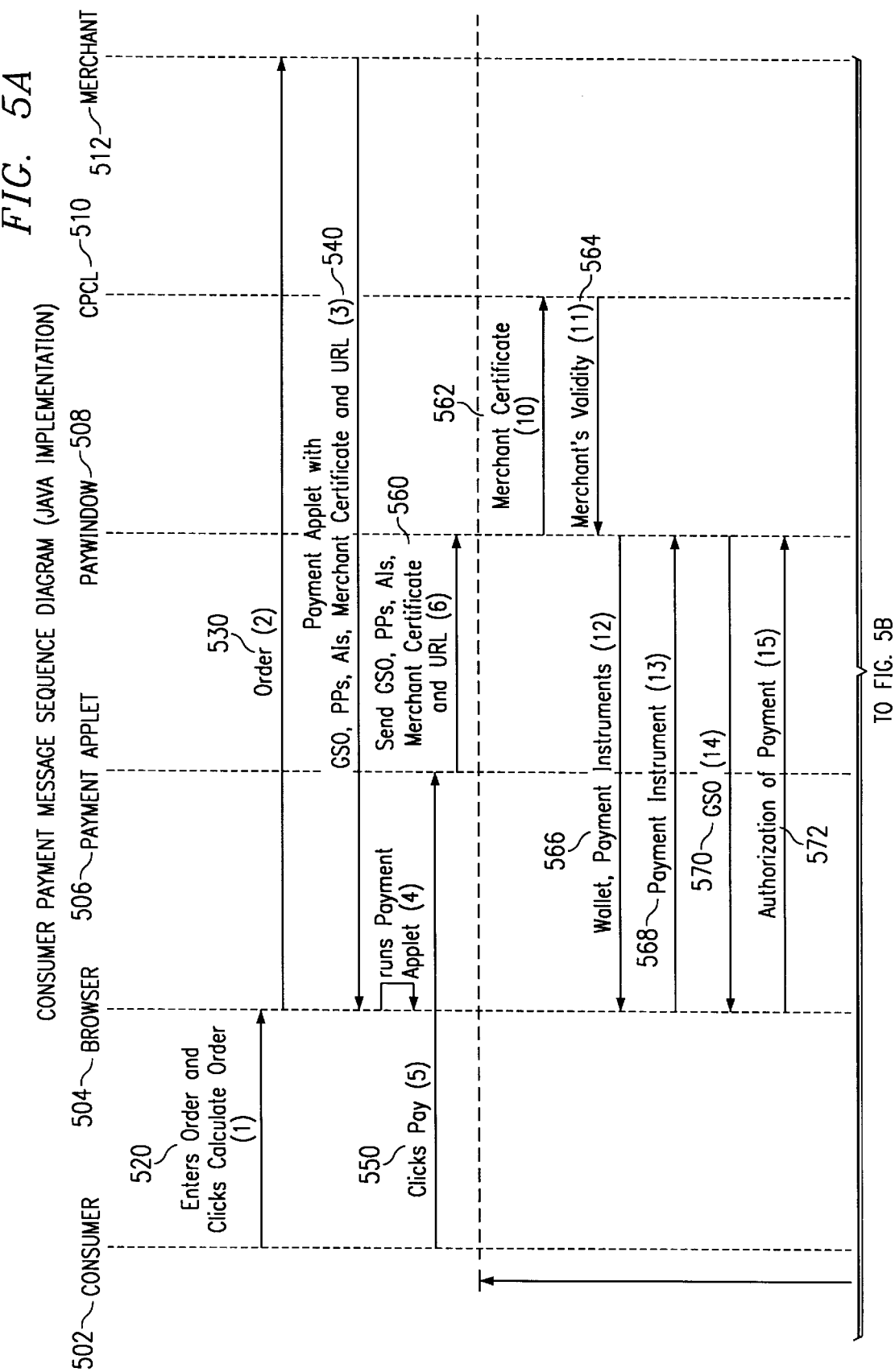

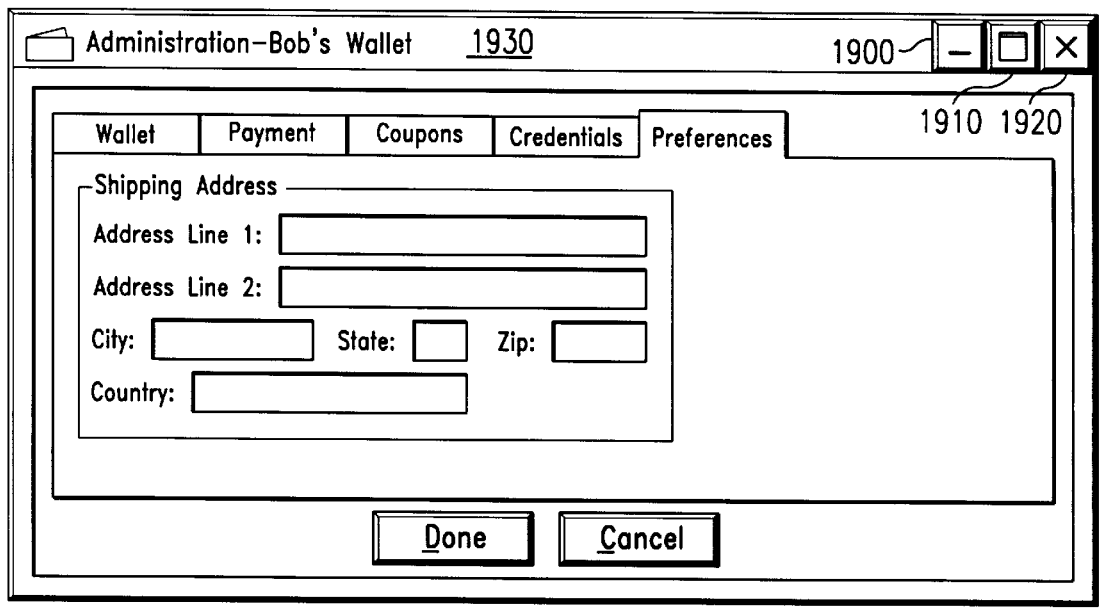

FIG. 19

| 2080 | 2082 | 2084 | 2086 | 2088 | 2070 | 2072 |
|---|---|---|---|---|---|---|
| Date | Time | Payment Instrument | Item | Amount | Paid | Received |
| 3/6/96 | 10:30AM | VISA: Family | Music CD | 12.37 | ● | ● |
| Memo Vivaldi's | | Ref 12A-923 | Merchant Tower Records | | | |
| 3/7/96 | 10:20PM | VISA: Family | Car Registration renewal | 78.45 | ● | ● |
| Memo | | Ref A31-001 | Merchant DMV | | | |
| 3/7/96 | 10:24PM | VISA: Family | Utility Bill | 110.90 | ● | ● |
| Memo | | Ref 123-09 | Merchant PG&E | | | |
| 3/10/96 | 10:30AM | VISA: Family | Music CD | 12.37 | ○ | ● |
| Memo Beetles | | Ref 13C-321 | Merchant Tower Records | | | |
| 3/10/96 | 11:15AM | VISA: Family | Hawaiin Blend Decaf | 69.25 | ○ | ● |
| Memo | | Ref 1231 | Merchant HAWAII'S BEST ES.. | | | |
| 3/10/96 | 11:55AM | Business VISA | HP Laser Jet 5L | 459.56 | ○ | ● |
| Memo | | Ref A11-012 | Merchant PC Connection | | | |
| 3/11/96 | 4:50PM | Business VISA | RAM 16M SIMM | 249.10 | ○ | ○ |
| Memo | | Ref 199-001 | Merchant Fry's Electronics | | | |
| 3/11/96 | 4:59PM | VISA: Family | Turbo Tax Federal | 52.45 | ○ | ● |
| Memo | | Ref 130911 | Merchant Intuit | | | |
| 3/12/96 | 6:00PM | Business VISA | Laser Jet 5L Cartridge | 45.90 | ○ | ● |
| Memo | | Ref A12-006 | Merchant PC Connection | | | |
| 3/13/96 | 6:24PM | VISA: Family | Turbo Tax CA | 29.50 | ○ | ○ |
| Memo | | Ref 131009 | Merchant Intuit | | | |

2090

[ Detail... ] [ Find... ] [ Customize... ] [ Delete ] [ Output... ] [ Close ]
2010      2020      2030              2040      2050        2060

FIG. 20

Register Detail—Bob's Wallet    2100    2110    2120

Date: 3/6/1996

Time: 10:30AM

Paid by: Family VISA
4219-0909-0989-1234 exp 1/98

Received: ☐ —2160
Paid: ☐ —2170
Memo: [_____]
    2150

| Order | Merchant | Ship To Address |

HAWAII'S BEST ESPRESSO COMPANY
1 Hawaiian Blend Decaf    $7.50
1 Hawaiian Blend    $6.00
1 Kona Wailapa Regular    $18.99
1 Maui ONO Farms Regular    $25.99

S&H    $8.00
Tax    $2.77

Total    $69.25

2130 — [ Go To Merchant Site ]

2140 — [ Done ]

Find Record—Bob's Wallet —2200   2210

From Date: [____] To: [____] —2220

Paid by: [_____▼] —2225

Item: [_____] —2230

Merchant: [_____▼] —2250

Memo: [_____] —2240
2265—

Search
○ Up —2260
○ Down —2270

2295—[ Cancel ]   [ Find ] —2290   [ Find Next ] —2280

*FIG. 22*

| Report-Bob's Wallet | 2530 | | | | | | |
|---|---|---|---|---|---|---|---|
| Report Type: Detail: Sorted by Merchant ▼ | | | | | | | |

Report-Bob's Wallet
From Date: January 1st, 96 to March 3rd, 96

2540 / 2550 / 2560 / 2570 / 2580 / 2590

| Merchant | Date | Time | Payment Method | | Amount | Paid | Received |
|---|---|---|---|---|---|---|---|
| Tower Records | 1/21/96 | 10:21AM | Visa: Family | | $12.20 | | |
| | | | Item: Music CD-Mozart's Greatest Hits | 10.00 | | | |
| | | | Shipping Handling | 1.80 | | | |
| | | | Sales Tax | 0.40 | | | |
| Tower Records | 2/12/96 | 6:05PM | Visa: Family | | $12.20 | | |
| | | | Item: Music CD-Johannes's Best | 10.00 | | | |
| | | | Shipping Handling | 1.80 | | | |
| | | | Sales Tax | 0.40 | | | |
| | | | Amount Spent at Tower Records | | $24.40 | | |
| Macy's | 1/21/96 | 10:21AM | Visa: Family | | $12.20 | | |
| | | | Item: Desk lamp | 10.00 | | | |
| | | | Shipping Handling | 1.80 | | | |
| | | | Sales Tax | 0.40 | | | |
| Macy's | 2/12/96 | 6:05PM | Visa: Business | | $12.20 | | |
| | | | Item: Lamy Pen | 10.00 | | | |
| | | | Shipping Handling | 1.80 | | | |
| | | | Sales Tax | 0.40 | | | |
| | | | Amount Spent at Macy's | | $24.40 | | |
| | | | Total Amount Spent | | $48.80 | | |

[Customize... 2500] [Output 2510] [Done 2520]

*FIG. 25*

Certificate Issuance Form

Please enter information into all fields. If a field does not apply to you, enter N/A.

Card Information
- 2900 — Card Number: 4417 2222 3333 9191
- 2902 — Expiry Date: 12/98

Personal Information
- First Name: John
- Middle: F.
- Last: Smith
- Home Phone #: 111 222-3333 (example: 555 555-5555) — 2912
- Social Security Number: 111-22-3333 (example: 999-99-9999) — 2908
- Date of Birth: 12/12/72 (month/day/year as 01/25/50) — 2910
- Mother's Maiden Name: Jones (for security purposes only)

(2904)

Address — 2906
- Line 1: 141-22 Long Drive
- Line 2: Kensington
- Apt. #:
- City: Palo Alto    State: CA    Zip: 94025

VeriFone Wallet Information
- Icon Preference: Wallet — 2930
- Password: **** — 2932
- Confirm Password: **** — 2934

*FIG. 29*

SYSTEM, METHOD AND ARTICLE OF MANUFACTURE FOR NETWORK ELECTRONIC PAYMENT INSTRUMENT AND CERTIFICATION OF PAYMENT AND CREDIT COLLECTION UTILIZING A PAYMENT

FIELD OF THE INVENTION

The present invention relates to the electronic payment in exchange for goods and services purchased over a communication network, and more specifically, it relates to an ergonomic, graphical user network interface which simulates a real life transaction for the credit card, cash or other payment of goods.

BACKGROUND OF THE INVENTION

The present invention relates to an electronic graphical representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change therefor. Furthermore, the handling and managing of paper cash and coins is inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House (ACH) where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations. However, the payments made through these types of EFT systems are limited in that they cannot be performed without the banking system. Moreover, ACH transactions usually cannot be performed during off business hours.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems which provide non-ergonomic interfaces are disclosed in U.S. Pat. Nos. 5,476,259; 5,459,304; 5,452,352; 5,448,045; 5,478,993; 5,455,407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

While the art pertaining to cash alternatives for transactions is a well developed one, there is a substantial need for a more user friendly system and method for such transactions. Thus, there is a need for a system that allows a user to interface with a display that looks and feels natural. Of particular importance is the ease of acceptance resulting from the similarity to accepted norms of payment.

SUMMARY OF AN EXEMPLARY EMBODIMENT

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred, exemplary embodiment adequate to allow one of ordinary skill in the art to make and use the inventive concepts will follow in later sections.

According to a broad aspect of the invention, an electronic monetary system provides for transactions utilizing a preferred embodiment in the form of an electronic-monetary system that emulates a wallet, a purse, a smart card, a pocketbook, a checkbook, a satchel or other payment instrument holder that is customarily used for storing money, credit cards and other payment instruments. Access to the wallet is restricted by a password, which can be encrypted, or used to generate an encryption key for restricting access to sensitive information, to avoid unauthorized payments. When access is authorized, a graphical representation (bitmap) of the instrument(s) is presented on the display based on either a user default, an instrument issuer default or payment instrument holder default to enable a user to select a payment instrument for use in a particular transaction. Once a payment instrument is selected, a summary of the goods for purchase are presented to the user and the user enters their electronic approval for the transaction or cancels the transaction. Electronic approval results in the generation of an electronic transaction to complete the order. If a user selects a particular certificate, a particular payment instrument holder will be generated based on the selected certificate. In addition, a default bitmap for the instrument associated with a particular certificate is defined by the issuing agent for the certificate, and the default bitmap will be displayed when the certificate definition is completed. Finally, the number associated with a particular certificate will be utilized to determine if a certificate can be issued by a particular party.

BRIEF DESCRIPTION OF THE DRAWINGS

The foregoing and other objects, aspects and advantages are better understood from the following detailed description of a preferred embodiment of the invention with reference to the drawings, in which:

FIGS. 5A and 5B are Consumer Payment Message Sequence Diagram in accordance with a preferred embodiment of the invention;

FIG. 19 illustrates the window controls in accordance with a preferred embodiment;

FIG. 20 is a register display in accordance with a preferred embodiment of the invention;

FIG. 21 is register detail display in accordance with a preferred embodiment;

FIG. 22 is a register find display in accordance with a preferred embodiment;

FIG. 25 is a report of a wallet in accordance with a preferred embodiment;

FIG. 29 is an illustration of a certificate issuance form in accordance with a preferred embodiment;

DETAILED DESCRIPTION

Figure 1A:
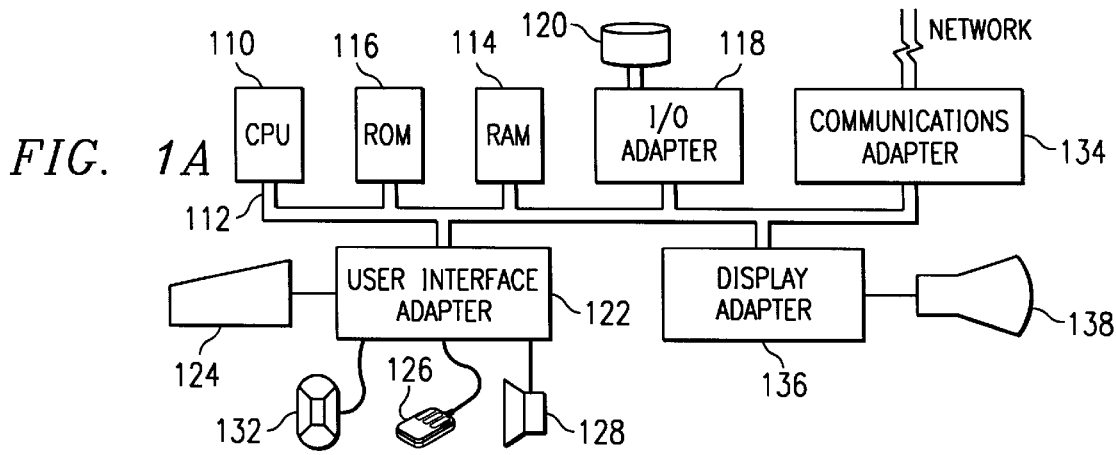
FIG. 1A is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1A, which illustrates a typical hardware configuration of a workstation in accordance with a preferred embodiment having a central processing unit 110, such as a microprocessor, and a number of other units interconnected via a system bus 112. The workstation shown in FIG. 1A includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associates with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

A preferred embodiment of the invention utilizes Hyper-Text Markup Language (HTML) to implement documents on the Internet. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX could be substituted for JAVA without undue experimentation to practice the invention.

Figure 1B:
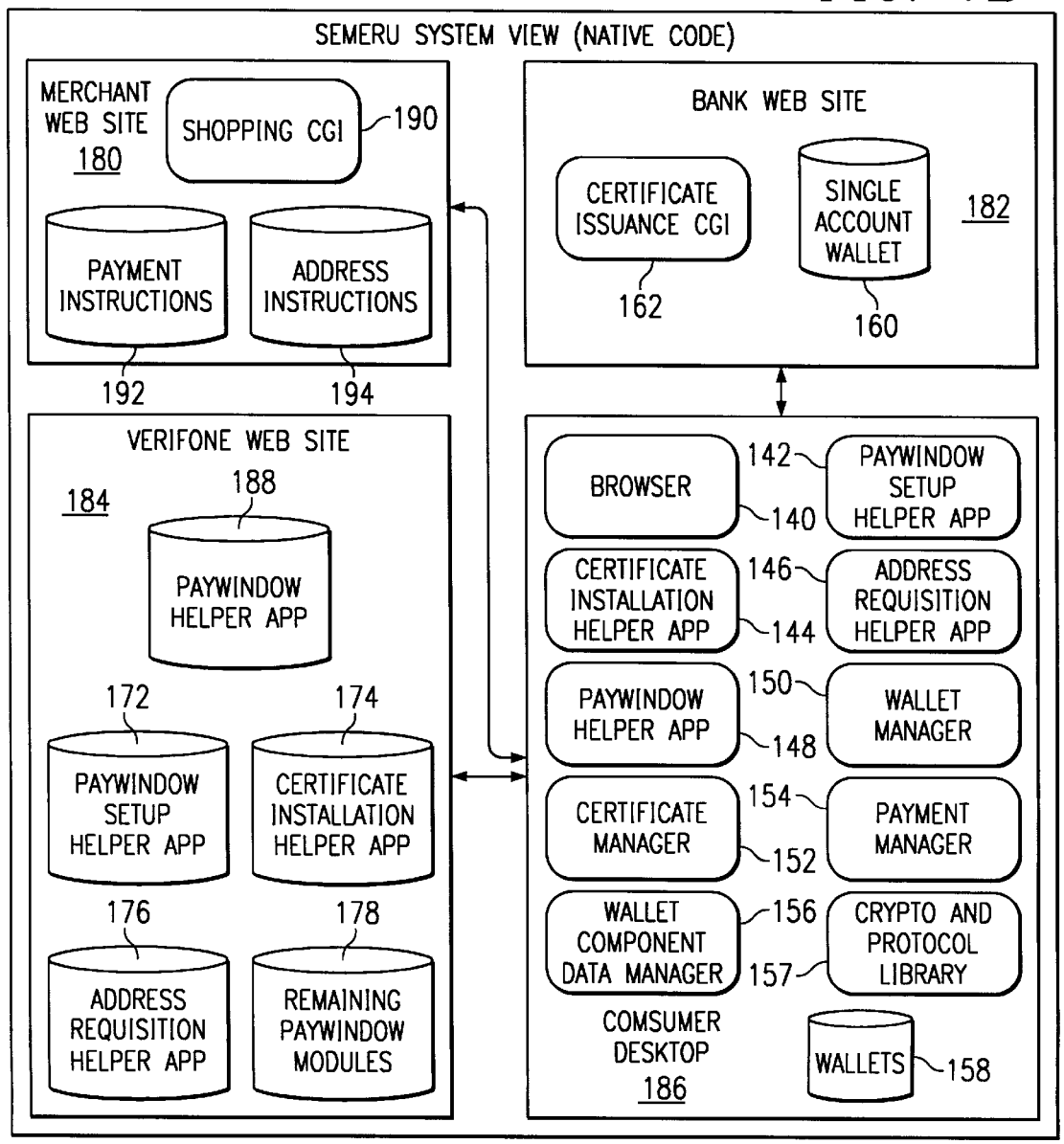
FIG. 1B is a block diagram of the system in accordance with a preferred embodiment.

FIG. 1B is a block diagram of a preferred embodiment of the system utilizing native code. The major components of the system are described below with reference to FIG. 1B. The merchant web site 180 contains the shopping Common Gateway Interface (CGI) 190 which is provided by the merchant or other web server communication system. The CGI is an interface which allows applications to access, process and respond to incoming messages. Industry slang is to refer to CGI scripts as a way of saying that a programmer is writing web server applications in scripting languages. A CGI script is a type of software application program. Merchants typically are setup with programs for authorization that are made up of CGI scripts. A certificate of authority will also have a web server and the handling of certificate requests will utilize CGI scripts. Consumers interact with this system to shop at the merchant site. The merchant system also accepts payment transactions originating from the consumer using the PayWindow helper application 148. The payment instruction 192 is a file representing the Multipurpose Internet Mail Extension (MIME) message that is created by the merchant system when the consumer elects to pay. This MIME message contains the order information and the payment instructions which are specific to the merchant. The order information contains the Goods and Services Order (GSO), shipping address, merchant Uniform Resource Locator (URL), merchant certificate, merchant name and address, and transaction ID associated with the order. The payment instructions contains the payment instruments that the merchant accepts and the payment protocol preferences.

On receiving the MIME message from the merchant system 180, the browser 140 launches the PayWindow application 148 which is defined as a helper application in the browser 140. The browser 140 sends the MIME message to the PayWindow 148 and the PayWindow application 148 interacts with the consumer to complete the payment. One of ordinary skill in the art will readily comprehend that Java, Netscape/Oracle plugins and ActiveX could readily be substituted for the MIME message underlying the architecture of this embodiment. A Java embodiment is presented below as an alternative embodiment to provide another example in accordance with another preferred embodiment.

The Address Instructions file 194 contains information representative of the MIME message that is created by the merchant system when the consumer clicks on a button on the merchant's web page for an automatic fill-in of his or her address from the wallet database. The MIME message contains the merchant's URL and the type of address that the merchant is seeking from the wallet database. The wallets contain the consumer's shipping and billing address. Once the MIME message is received from the merchant system, the browser launches the Address Requisition application 176 of the Verifone Web Site 184 which is defined as a helper application in the browser. The Address Requisition application 146, 176 interacts with the consumer to complete the address requisition request.

The Certificate Issuance at the Bank Web Site 162 resides at the bank web site 182. It is utilized for issuing SET complaint/X.500 certificates to consumers. The implementation of this system may vary from one bank to another. However, at a high level, this system gathers consumer's personal information. After processing the information, the system issues a certificate along with a payment instrument to the consumer.

The Single Account Wallet 160 at the bank web site 182 represents the MIME message that is created by the Certificate Issuance system. This MIME message contains a VeriFone wallet. The VeriFone wallet contains a single payment instrument and the certificate associated with it. For security reasons, the private key is not included in the wallet. The consumer has to specify a private key before using the instrument for payment. When the consumer is issued the certificate, this MIME message is sent to the browser. The browser launches the Certificate Installation application 174, 144 which is defined as a helper application in the browser. The Certificate Installation application 174, 144 reads the MIME message and install the wallet into the wallet database 158.

Various helper applications 188, 172, 174, 176 are provided to make the consumer's shopping experience easy and efficient including the following helper applications. The Paywindow helper application 188 is utilized by the consumer to authorize the payment to the merchant, to administer their wallets, to review their previously completed payment transactions and to perform housekeeping activities on the wallets. This application is defined as a 'helper' application on the consumer's desktop. The browser launches this application when the merchant system sends a MIME message requesting payment.

The PayWindow Setup Helper application 172, 142 is used by the consumer to install helper applications and other modules from the web site 184 onto the consumer desktop 186. When a consumer attempts to install an application for a first time, the consumer does not have a helper application on the desktop. Thus, the first time installation of an application requires a consumer to perform two steps. First the user must download the system package to their desktop 186 and then the user must run setup to decompress and install the system. Thereafter, whenever the consumer gets a new release of system software, the browser 140 launches this helper application which in turn installs the appropriate other system modules.

The Certificate Installation Helper Application 174 is utilized to install a wallet that is issued by a bank. When the bank's certificate issuance web system sends the MIME message containing the VeriFone wallet, the browser 140 launches this application. This application queries a consumer to determine if the payment instrument contained in the wallet is to be copied to an existing wallet or to be kept in the new wallet. This application then installs the payment instrument and the certificate into the wallet database 158.

The Address Requisition Helper Application 176 is utilized by a consumer to send his or her address from a specified wallet directly to the merchant system 180. When the merchant system 180 sends the MIME message requesting the consumer's shipping and/or billing address, the browser 140 launches this application. This application 176 queries a consumer to open a wallet if a wallet is not already open and show the requested address to the consumer. Once the consumer okays the address, the application 'posts' the requested information via an HTML form to the merchant. The HTML format of this form is standardized. Every merchant system electing to use this (Address Requisition) feature accepts this form. In addition there are other software modules that are required to run the helper applications. First time around, these modules and the helper applications is downloaded and installed by the consumer on his or her desktop. Thereafter the Setup Helper application 172, 142 automatically installs future releases of helper applications or other software modules. Whereas an address requisition is presented as an embodiment, one of ordinary skill in the art will readily comprehend that clothing sizes, music preferences, mother's name or other information to assist a merchant can also be uploaded via similar means without departing from this embodiment. The wallet manager 150 provides a standard interface to the wallet, while the payment manager 154 coordinates and completes the payment request that is received from the merchant system 180. The certificate manager 152 manages the operations of downloading, validating, and renewing certificates. The data manager 156 provides storage and retrieval of database records and items which are encryted according to the Crypto and Protocol Library 157.

Figure 2:
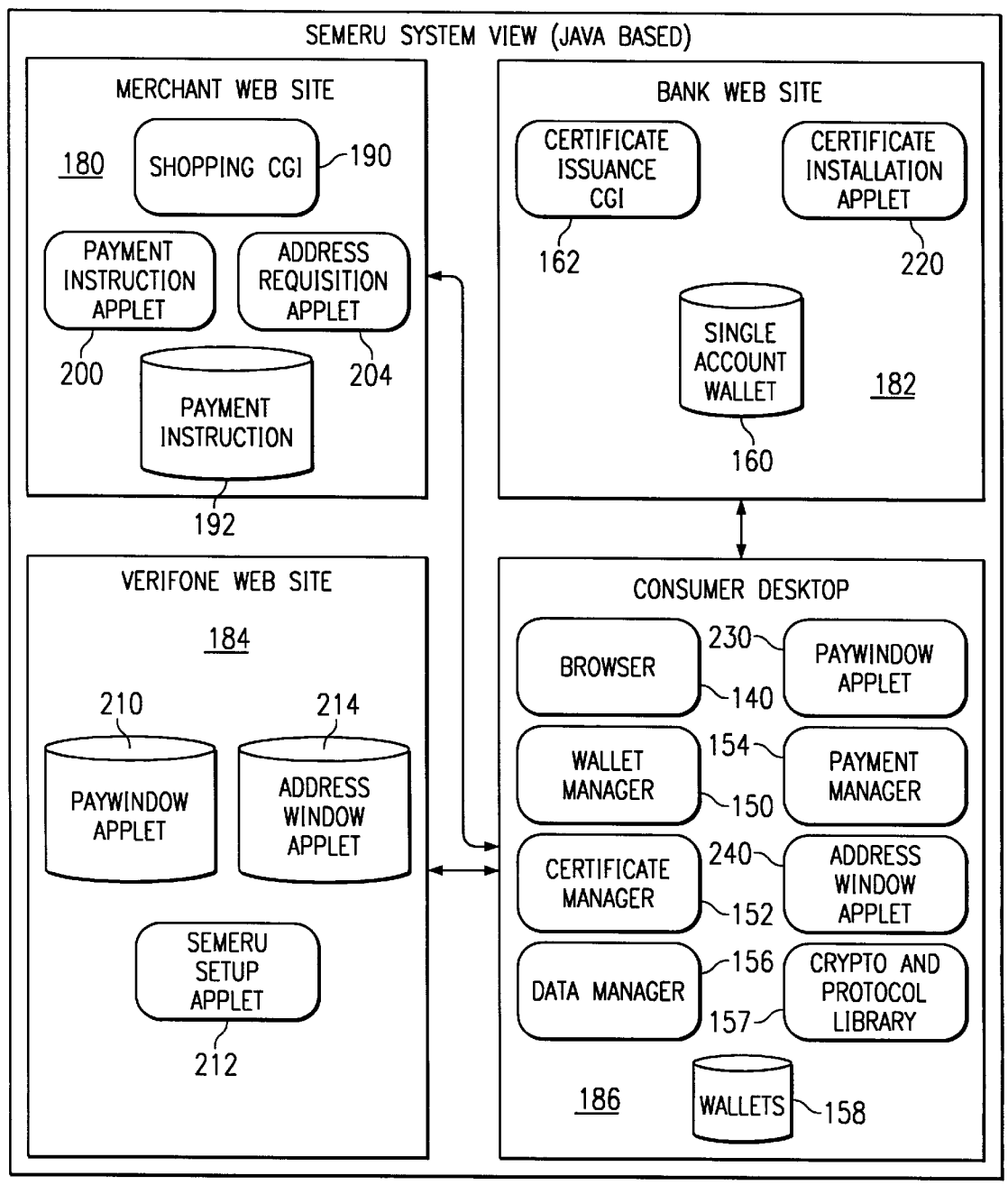
FIG. 2 provides an alternative preferred embodiment in accordance with a Java based implementation of the invention.

FIG. 2 provides an alternative preferred embodiment in accordance with a Java based implementation of the invention. Java is a network application enabler for applications that utilize the Internet and HTML. Java is an object-oriented langugage that was developed by Sun Microsystems to speed development of their network applications.

Only the differences between the native embodiment discussed earlier and the Java version is addressed to clarify the discussion. Accordingly, the browser 140, wallet manager 150, certificate manager 152, data manager 156, crypto & protocol library 157 and wallets 158 are the same as described in reference to FIG. 1B. A Payment Instruction Applet 200 at the Merchant Web Site 180 is responsible for delivering the order information to the PayWindow Applet 230 on the consumer's desktop 186. This order information has the same information that is contained in the Payment Instruction MIME message which was described in the PayWindow System View Native Code section.

The Pay Instruction Applet 200 is a part of the payment HTML 192 page which is displayed by the merchant to the consumer. The Pay Instruction applet 200 requires that the following parameters be set with appropriate data when the payment page is generated by the merchant system GSO, Shipping Address, Merchant, Merchant Certificate, Merchant URL and Button Text. The Pay Instruction Applet 200 displays a button called "Pay", "Use PayWindow" or the value of the Button Text parameter. Once clicked, Pay Instruction Applet 200 delivers the above information to the Pay Window Applet 230 on the customer's desktop 186. The consumer interacts with the Pay window Applet 230 Applet to complete the payment transaction.

The Address Requisition Applet 204 at the Merchant Web Site 180 is utilized by the merchant system 180 to obtain a consumer's shipping and/or billing address. This applet is displayed on the HTML page which accepts the consumer's shipping or billing address. The Address Requisition Applet 204 displays a button called "V-wallet" or the value of the Button Text parameter. Once clicked, the address Requisition Applet 204 launches the AddressWindow applet 240 utilizing the consumer's address. The AddressWindow applet 240 interacts with the consumer and send the address information to the merchant system 180. The address information is then processed consistent with the processing in the native system.

The Certificate Issuance CGI scripts 162 and the Single Account Wallet 160 at the Bank Web Site 182 is processed as described in the native system. The Certificate Installation Applet 220 of the Bank Web Site 182 is utilized by the Certificate Issuance CGI scripts 162 system to deliver a consumer's certificate to the consumer's desktop.

A variety of applets are provided at the Veri Fone web site 184 to make the consumer's shopping experience easy and efficient. These helper applications include a Setup Applet 212, PayWindow Applet 210 and an AddressWindow Applet 214 similar to the PayWindow Helper Application Native section discussed above.

Figure 3:
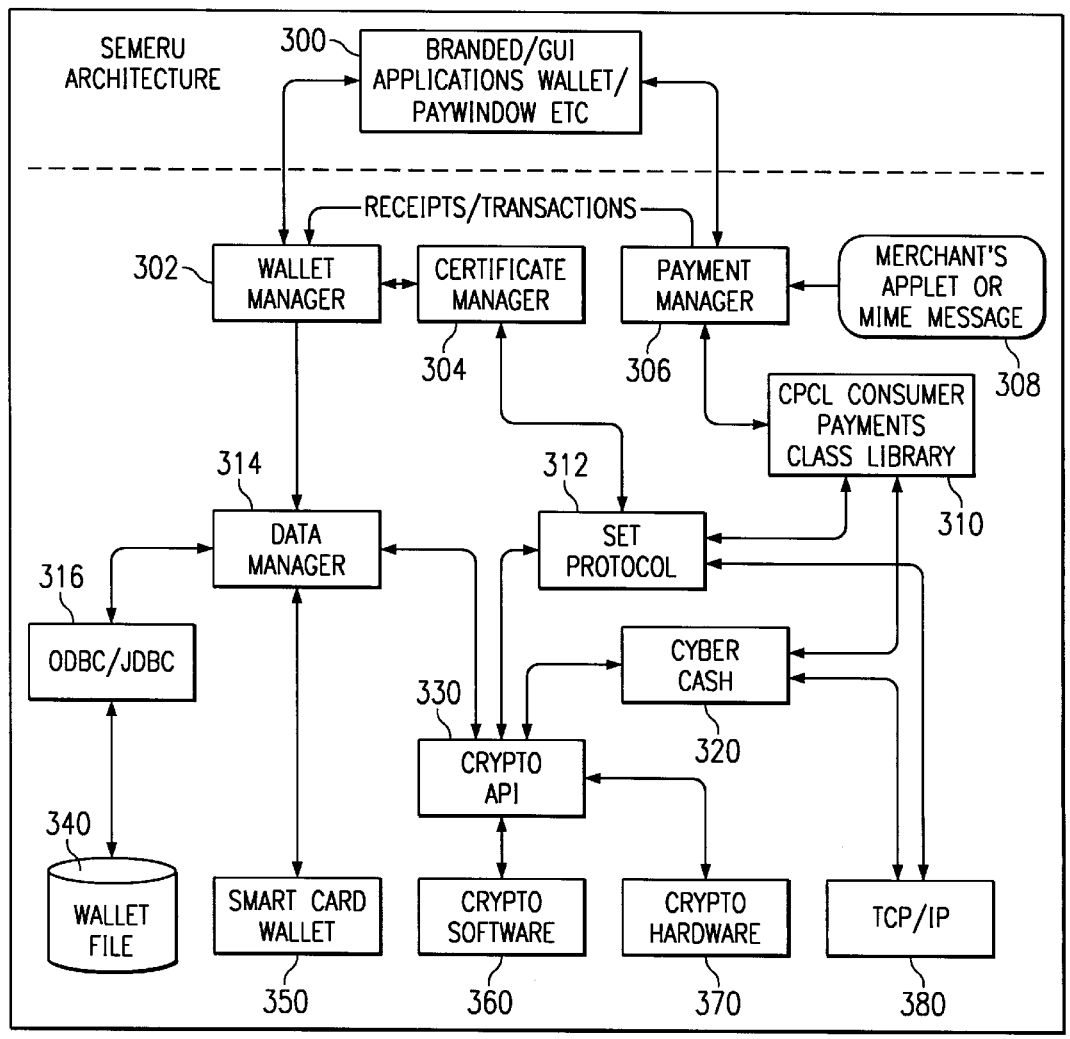
FIG. 3 is an architecture block diagram in accordance with a preferred embodiment of the subject invention.

FIG. 3 is an architecture block diagram in accordance with a preferred embodiment of the subject invention. Processing commences at function block 300 where the Graphical User Interface (GUI) part of the application is initialized. The GUI application 300 provides the consumer with support for ordering and making payments during the shopping process. There are also GUI components provided for wallet creation; importing, certificate and payment method creation and maintenance; and for transaction register review and reporting. The screen designs, and their associated logic, for the helper applications and applets are individually discussed in detail below. The wallet manager 302 defines data structures and manages data using the data manager 314. The data manager 314 uses an Open Data Base Connectivity (ODBC)/Java Data Base Connectivity (JDBC) component 316 to provide Data Base Connectivity to the wallet files 340. The data manager 314 also allows wallet data to be stored and/or secured by a cryptographic token, such as a Smart Card Wallet 350. A cryptographic API component 330 provides a standard interface for RSA and related cryptographic software and hardware. The Cryptographic Software portion 360 provides RSA and DES support. Cryptographic Hardware 370 creates a lower level API which facilitates replacing the Cryptography Software 360 with an off-the-shelf cryptography engine.

The Certificate Manager 304 manages the automatic downloading of a consumer's certificate from a bank, validation of a consumer's and a merchant's certificates and automatic requisition of certificate renewal.

The Payment Manager 306 coordinates and completes the payment request that is received from the merchant system. The payment request is received via a MIME message in the native code implementation or via an applet in the Java implementation 308. The payment request received contains the final GSO, Ship-To name, merchant certificate, merchant URL, coupons and the payment amount. The Payment Manager 306 then communicates with the payment related GUI component to interact with the consumer to authorize and complete the payment transaction. The Payment Manager 306 is also responsible for determining the payment protocol based on the consumer's payment instrument and the merchant's preferred payment protocol.

The Payment Manager 306 utilizes the Consumer Payments Class Library (CPCL) 310 to encapsulate the payment protocol into a single API and includes a client-side component of the Secure Electronic Transaction (SET) Protocol 312 and a client-side component of the CyberCash micro-payment protocol 320. TCP/IP protocols 380 may be used to allow the merchant, consumer, and third party computers to share resources across the network.

Figure 4:
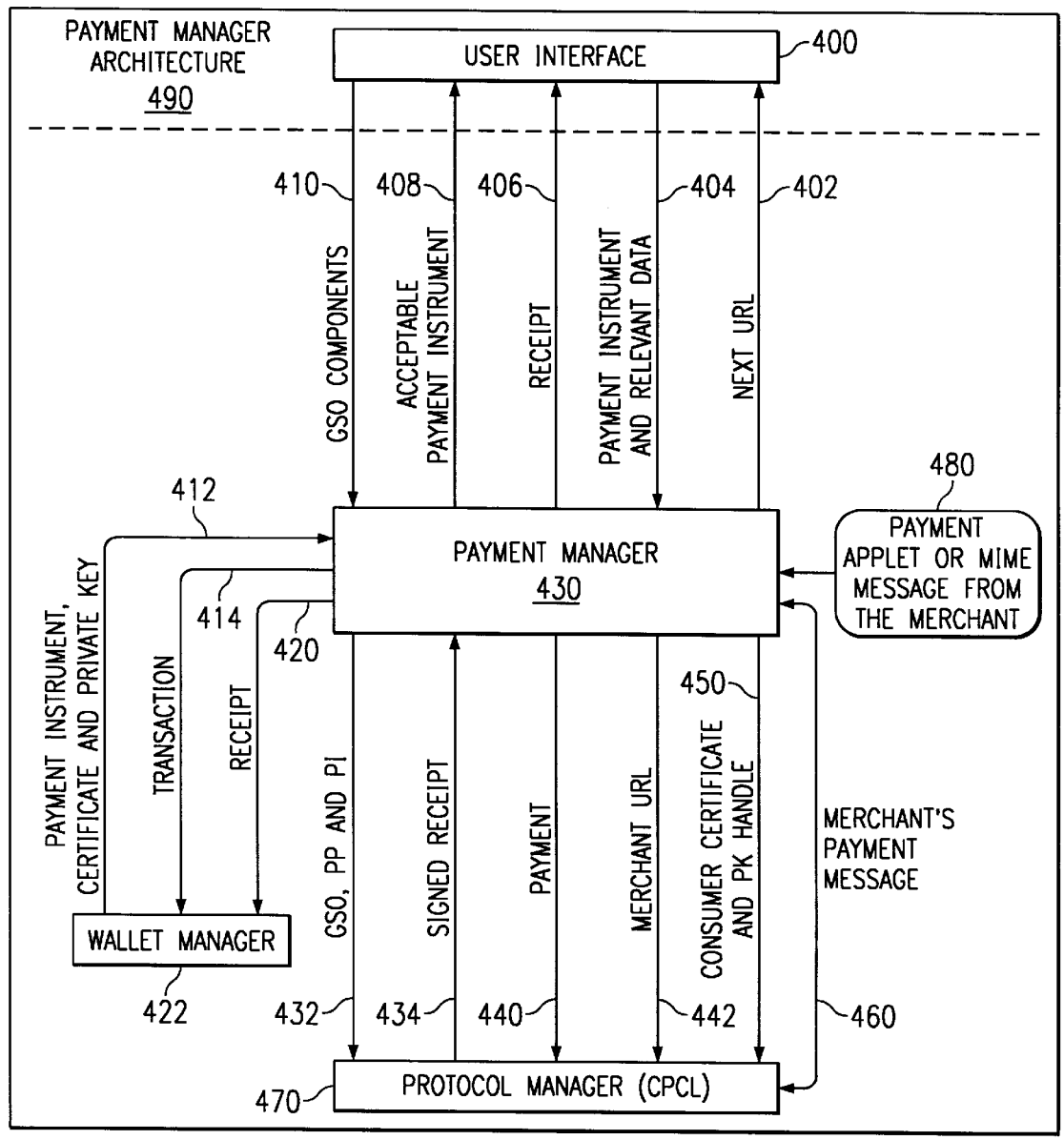
FIG. 4 presents the detailed logic associated with the payment manager in accordance with a preferred embodiment.

The Payment Manager 306 includes a well defined Application Programming Interface (API) which enables OEMs to interface with the Payment Manager 306 to make payments to specific HTTP sites. The detailed logic associated with the Payment Manager 306 is presented in FIG. 4.

The Payment Manager 306 enforces standard operations in the payment process. For example the receipt and the transaction record can automatically be transferred to the Wallet file once the payment is completed. The payment manager architecture in accordance with a preferred embodiment is presented in FIG. 4. A user interfaces with the payment manager 430 via a user interface 400 that responds to and sends a variety of transactions 410, 408, 406, 404 and 402. The transactions include obtaining the next record 402, payment record 404, receipt 406, acceptance of the payment instrument 408 and GSO components 410. In turn, the payment manager 430 sends transactions 414 and receipts 420 to the wallet manager 422 and receives payment instruments, certificates and private keys 412 from the wallet manager 422.

The payment manager 430 also sends and receives transactions to the protocol manager 470 including a merchant's payment message 460, a consumer certificate and PK handle 450, a merchant URL 442, a payment 440, a signed receipt 434 and a GSO, Selected Payment Protocol and Selected Payment Instrument 432. The payment manager 430 also accepts input from the payment applet or MIME message from the merchant as shown at function block 480. One aspect of the payment processing is a Consumer Payments Class Library (CPCL) 470 which encapsulates the payment protocols into a single API. By encapsulating the payment protocols, applications are insulated from protocol variations. A SET Protocol provides an implementation of the client-side component of the Secure Electronic Transaction (SET) Protocol. A complete implementation of the client-side component of the CyberCash micro-payment protocol is also provided.

The Wallet Manager 422 provides a standard interface to the wallet. It defines the wallet database structures and the payment instrument data structures, controls the access to the wallet and provides concurrency checking if more than one application attempts to open the same wallet. The interface to the wallet manager 422 is published to allow OEMs to interface with the wallet manager and access the wallet database.

The wallet manager consists of the following sub-components:

Wallet Access. This component provides an interface to read and write wallet information.

Transaction Manager. This component provides an interface to read and write transaction corresponding to a wallet into the wallet database.

Payment Instrument Manager. This component manager provides a common interface to the specific payment instrument access components.

Credit Card Access, Debit Card Access, Check Access. These components deal with a specific payment instrument.

A Data Manager provides storage and retrieval of generic data items and database records. It is assumed that data fields, index fields or entire data records can be marked as encrypted and the encryption process is largely automated. The data manager has no specific knowledge of database records appropriate to different payment methods. This layer is separated out so as to reduce changes required when new payment methods are introduced. However RSA key pairs and certificates might be considered as "simple" data types. This component also provides an abstraction which supports wallet files on computer disk or contained in smart cards.

The Open Data Base Connectivity (ODBC)/Java Data Base Connectivity (JDBC) component provides Data Base Connectivity where formal database components are required. An embodiment of the Smart Card Wallet allows wallet data to be stored and/or secured by a cryptographic token.

A preferred embodiment includes a single file or directory of files comprising a "wallet" which contains personal information and information about multiple payment methods with the preferred implementation. These payment methods (Visa cards, debit cards, smart cards, micropayments etc.) also contain information such as account numbers, certificates, key pairs, expiration dates etc. The wallet is envisaged to also contain all the receipts and transaction records pertaining to every payment made using the wallet. A Cryptographic API component provides a standard interface for RSA and related cryptographic software or hardware. This support includes encryption, signature, and key generation. Choice of key exchange algorithm, symmetric encryption algorithm, and signature algorithm should all be configurable. A base class stipulates generic behavior, derived classes handle various semantic options (e.g. software based cryptography versus hardware based cryptography.)

The Cryptographic Software portion provides RSA and DES support. This may be provided utilizing the SUN, RSA or Microsoft system components depending on the implementation selected for a particular customer. Cryptographic Hardware creates a lower level API which can underpin the Cryptography API and be utilized to replace Cryptography Software with an off the shelf cryptography engine.

The message sequence charts describe the flow of messages/data between the consumer, the browser and/or the various major components of the Semeru system. The major components of the system are the Merchant system which includes the vPOS, the PayWindow, and the Payment Gateway. The merchant system allows a consumer to shop, accept the payment transactions sent by the PayWindow application, and send payment transactions to the acquiring bank. The Consumer Payments Class Library (CPCL) module is a layer within the application which sends the payment transactions, securely, from the consumer to the merchant.

Figure 5B:
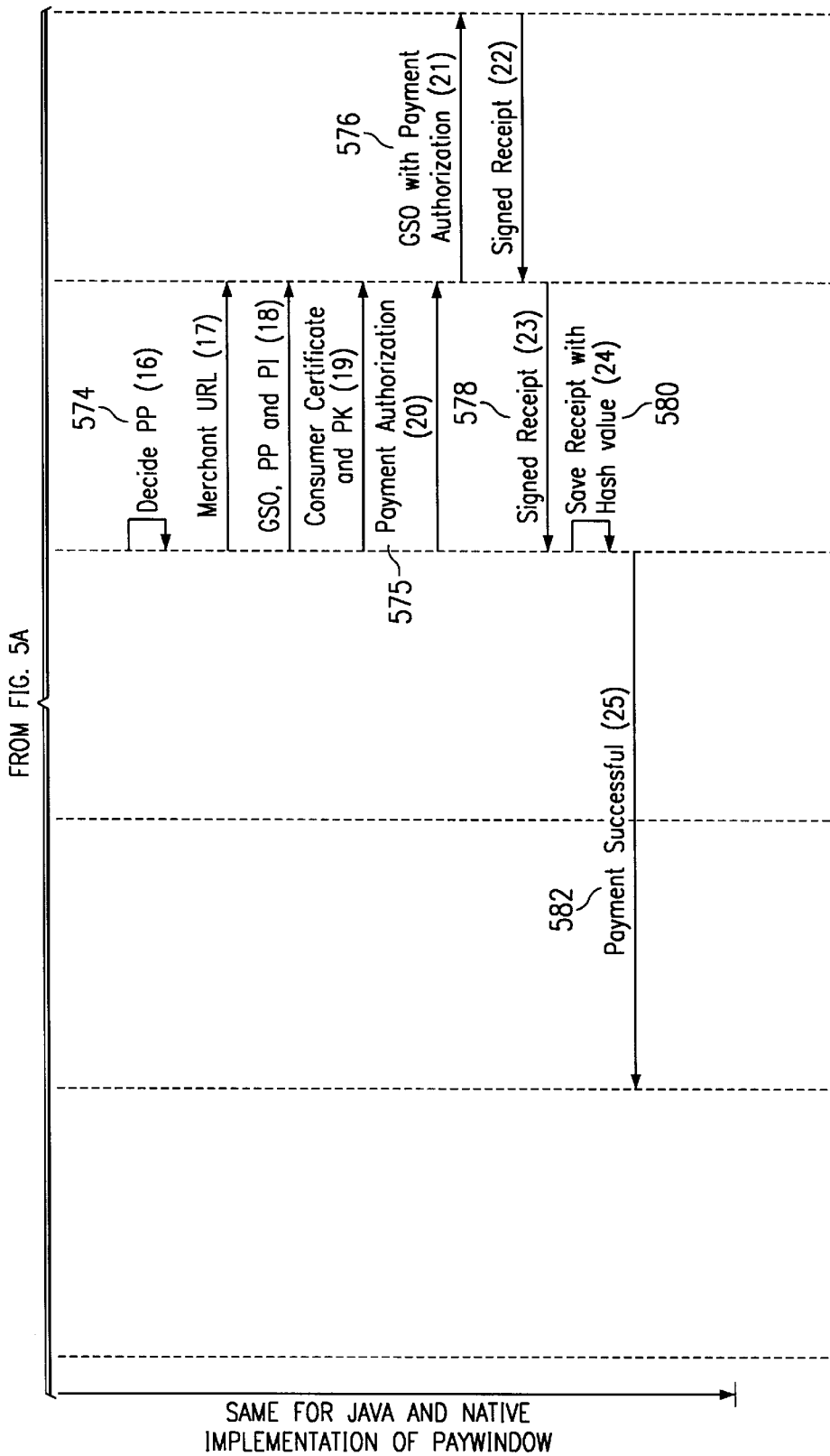

FIGS. 5A and 5B are a Consumer Payment Message Sequence Diagram in accordance with a preferred embodiment of the invention. The diagram presents the flow of messages between the consumer 502, the browser 504, the merchant system 512, the PayWindow application 508, and CPCL 510. This message flow describes the payment process from the time an order is completed and the consumer elects to pay, to the time the payment is approved and the receipt is returned to the consumer. The difference between the Native implementation and Java implementation of the PayWindow application 508 is in the delivery of the order information to the PayWindow 508. Once the order information is received by the PayWindow 508, the flow of messages/data is the same for both implementations. In the case of the Native implementation, the order information is delivered via a MIME message. This MIME message is sent to the PayWindow 508 by the browser 504 via a document file. In the Java implementation, the order information is delivered to the PayWindow 508 by an applet 506. The merchant system 512 sends an applet 506 with the order information to the browser 504 which in turn delivers the order to the PayWindow 508. Once the order is received, the PayWindow 508 interacts with the consumer 502 and the Protocol modules for the completion of the payment process.

Enters Order and Clicks Calculate Order 520

This message represents the consumer order entry and the clicking of the 'Calculate Order' button. The consumer's shopping experience is all condensed into this one message flow for the purpose of highlighting the payment process. The actual implementation of the shopping process varies, however, the purpose does not, which is the creation of the order.

Order 530

This message represents the order information which is sent by the browser 509 to the merchant system 512 via an HTML form.

Payment Applet with GSO, PPPs, AIs, Merchant Certificate and URL 540

On receipt of the order, the merchant system 512 calculates the payment amount. This message represents the HTML page which is sent by the merchant system 512 detailing the payment amount along with the Java payment applet which contains the GSO, PPPs, AIs, merchant certificate and URL.

Run Payment Applet 545

The Java enabled browser runs the Payment applet. The applet displays a button called "Pay" for the consumer 502 to click. This is embedded in the HTML page delivered by the merchant system 512.

Clicks Pay 550

This message represents the clicking of the Pay button on the browser 504 by the consumer 502 after confirming the payment amount.

GSO, PPPs, AIs, Merchant Certificate and URL 560

This message represents the GSO, PPPs, AIs, merchant certificate and the merchant URL carried by the Java applet 506. The Java applet 506 now delivers these to the PayWindow application 508.

Merchant Certificate 562

This message represents the merchant's certificate which is sent to the CPCL module 510 for checking the validity of the merchant 512.

Merchant's Validity 564

The CPCL module 510 examines the merchant's certificate and sends this message to the PayWindow 508 indicating whether or not the merchant 512 is a valid merchant.

Wallet, Payment Instruments 566

This message represents the wallets and payment instruments that are displayed to the consumer 502. Not all payment instruments from a wallet are shown to the consumer 502. Only the ones accepted by the merchant 512 are shown.

Payment Instrument 568

This message represents the payment instrument selected by the consumer 502. This message is created in the current design when the user double clicks on the payment image in the "Select Payment Method" Window.

GSO 570

This indicates that the GSO is displayed to the consumer 502 in the "Make Payment Authorization" screen.

Authorization of Payment 572

This message represents the authorization of the payment by the consumer 502. The consumer 502 authorizes the payment by clicking the 'Accept' button on the "Payment Authorization" screen.

Decide Payment Protocol 574

Once the consumer 502 authorizes the payment, the payment protocol is decided by PayWindow 508 based on the merchant's Payment Protocol Preferences and the consumer selected payment instrument.

Payment Authorization 575

These messages represent the merchant's URL, the GSO, payment protocol (PP) to use, account number, certificate and the private key handle (PK) associated with the payment instrument which is sent to the protocol module 510.

GSO with Payment Authorization 576

This message represents the payment instructions which is sent by the protocol module 510 to the merchant system 512. The GSO, PI, consumer certificate and PK is packaged based on the payment protocol.

Signed Receipt 578

This message represents the digitally signed transaction receipt received by the protocol module 510 from the merchant 512.

Save Receipt with hash value 580

The digitally signed transaction receipt is saved by the PayWindow 508 for future reference.

Payment Successful 582

This indicates that the transaction receipt and the 'payment successful' have been displayed to the consumer 502.

PayWindow Requirements in Accordance With a Preferred Embodiment

There are various requirements that a consumer demands of a paywindow application, such as, support for a particular target hardware platform, secure communication of payment information on the public network, easy configuration and accessibility, simplified order entry and transaction completion, store payment instrument information safely and securely, provide a wide variety of payment instruments, retain URLs of consumer's favorite shops, launch browser from the payment window to visit shops, keep records and export records for transaction data, provide shopping assistance, support multiple users with a single application, display merchant certificate and payment forms that are acceptable to a particular merchant, manage digital credentials, provide multiple accounts for a single payment type, provide support for merchant value add or loyalty programs and the support must be portable to another client machine.

A merchant has a different set of requirements for a payment application which include: consistent information format; loyalty and branding opportunities; multiple payment types for a consumer to select from; tight integration with a merchant store; links from the system to the merchant's store, better risk management/rates utilizing the system. A link could be a hypertext connetion between two displays, a point-to-point connection between areas in a single display, a Uniform Resource Locator (URL), an index, a reference to an address or other means which facilitates transfer of control from one area of execution to another area of execution (across machines, network locations or even satellite linkages and microwave transmissions).

A preferred embodiment in accordance with the invention provides a software application used by the consumer to make electronic payments. It runs on the consumer's workstation and is either a free standing application to a WWW browser or is embedded into a custom application, and is invoked whenever the consumer has completed the ordering process for a particular item and is ready to pay.

The Pay Window application in accordance with a preferred embodiment supports multiple local users. Each user's data is independently stored and secured. On program startup, a user must sign in with an ID and password. All information (on local disk or floppy) is encrypted with a password entered by the user each time the program is invoked.

Payment Instruments

Due to the varying size of transactions and differing payment instrument usage related to social, economic and cultural factors, support is required for multiple payment instruments. Much like today, a consumer making a purchase from a merchant must have a choice of payment methods depending upon their personal preference. The supported payment instruments include: credit cards, electronic checks, electronic money, micropayment (electronic coin), debit card and smart cards.

Secure Payment Protocol

One of the core features in accordance with a preferred embodiment is the ability to accept and make payments in a secure and reliable manner. Secure payment on the Internet becomes as safe and reliable as Point of Sale (POS) terminals today with payment solutions in accordance with another aspect of the present invention. While selection of a security protocol can be considered a technical design consideration, there is high marketing value in supplying quick time to market in the solution.

Payment Process

The payment process is separated from the administrative function. Once a consumer has decided to make a purchase from the merchant, the application requests a user name and wallet password, display merchant and order information, request that a user select a payment instrument from the wallet, and display and capture order acknowledgement and digital receipt. Basically for a payment instrument you can utilize any instrument that is evidence of membership, identity, certification or authority. For example, a card for video membership could be utilized to check out videos electronically via the internet.

Transactions Supported

The application in accordance with a preferred embodiment is able to originate sales and refund transactions types. It also provides automatic fillin of addresses based on a user preferences file, and if no information is specified when a transaction is initiated, the information from the last payment transaction is utilized as default information.

Shopping Support (shopping companion)

The application in accordance with a preferred embodiment also shares payment and shipping information with the merchant and URLs from merchants which a consumer has frequented before linkage for visitation.

Administrative Functions

To simplify use of the application, actual payment and administrative functions are separated. Users are not presented with administration information while trying to complete an on-line payment process. Therefore the following administrative functions are supported:

Data Management

Data is automatically backed up to disk on a periodic basis based on user requirements. A user can view the contents of a backup in various ways. For example, a user can restore selected data from a backup, everything stored, selected user information only, or everything except payment history information. Data export is also supported for selected digital receipts or order acknowledgements for email or to print for dispute resolution with a bank or other merchant. Data export is also provided to the following financial programs: Quicken, Microsoft Money and Managing your money.

Receipt and Transaction History Management

Receipt and transaction history management is also provided for viewing order history by time, payment instrument type, merchant and by completed, uncompleted or pending transaction. A purge order history transaction is also provided to purge the order history file by time or by payment instrument type. Another report is provided which shows digital receipts for orders placed including credit card number, expiration date, name, billing address and public key certificate. Order acknowledgements are also transmitted for every order that has been placed, and an export status tag is generated if an item has been exported to an external financial management program.

User Administration

Various user administration transactions are also provided. They include a feature that creates an empty wallet for a user and sets a default password for the user when a new user is created. A delete user, change user password, and sign on as a user is also provided, but requires a user's password to activate. A view list of users is also provided and does not require a password to see the users defined to the system.

Wallet administration

Wallets are user specific and require the particular user to whom the wallet belongs to be effective. A preferred embodiment provides transactions for adding a new payment instrument, deleting a payment instrument, viewing a list of payment instruments and modifying a payment instrument.

Loyalty Programs and Coupons

Coupons are also accepted as well as other loyalty programs that a merchant might utilize, and provisions are provided for viewing loyalty program status and viewing existing coupons.

Interoperability

A preferred embodiment of the invention interoperates with many browsers and merchant systems. The requirements for interoperability across browsers and merchants applies to a base level functionality.

Smart Card Integration

Smartcard integration provides the consumer another payment method (stored value on a smartcard), portability of wallet information (key, payment instrument info, etc.).

International Localization Requirements

Support for localization to a particular country is built into the product for the major countries of the world.

Figure 6:
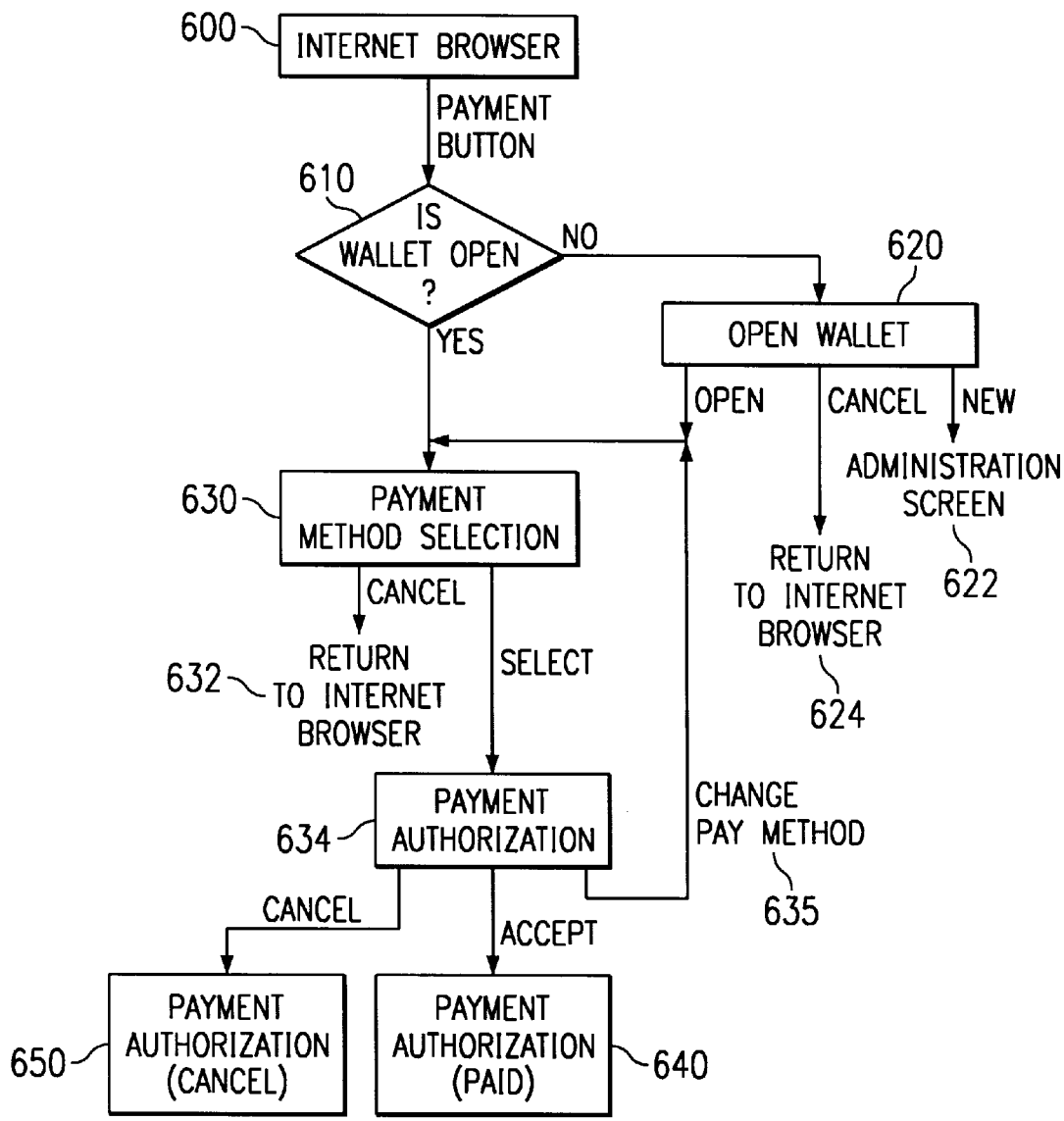
FIG. 6 is a flowchart setting forth the detailed logic of a paywindow user interface in accordance with a preferred embodiment of the invention.

FIG. 6 is a flowchart setting forth the detailed logic of a paywindow user interface in accordance with a preferred embodiment of the invention. Processing commences at function block 600 where an internet browser implemented as a Java applet detects the selection of a payment button and a test is performed at decision block 610 to determine if a wallet is open. If so, then the method of payment is determined at function block 630 and if a user cancels the processing, then control is returned to the Internet Browser at 632. If a user selects payment authorization at function block 634, then if the user can cancel authorization as shown at function block 650, accept payment authorization as shown at function block 640, or change the pay method as shown at 635 which results in a transfer of control to function block 630. If the wallet was not open when the test was performed at decision block 610, then the wallet is opened as shown at function block 620, and control is passed to the Administration Screen at 622 for processing consistent with the logic presented in FIG. 7, or if the user cancels processing, then control is returned to the Internet Browser as shown at 624.

Figure 7:
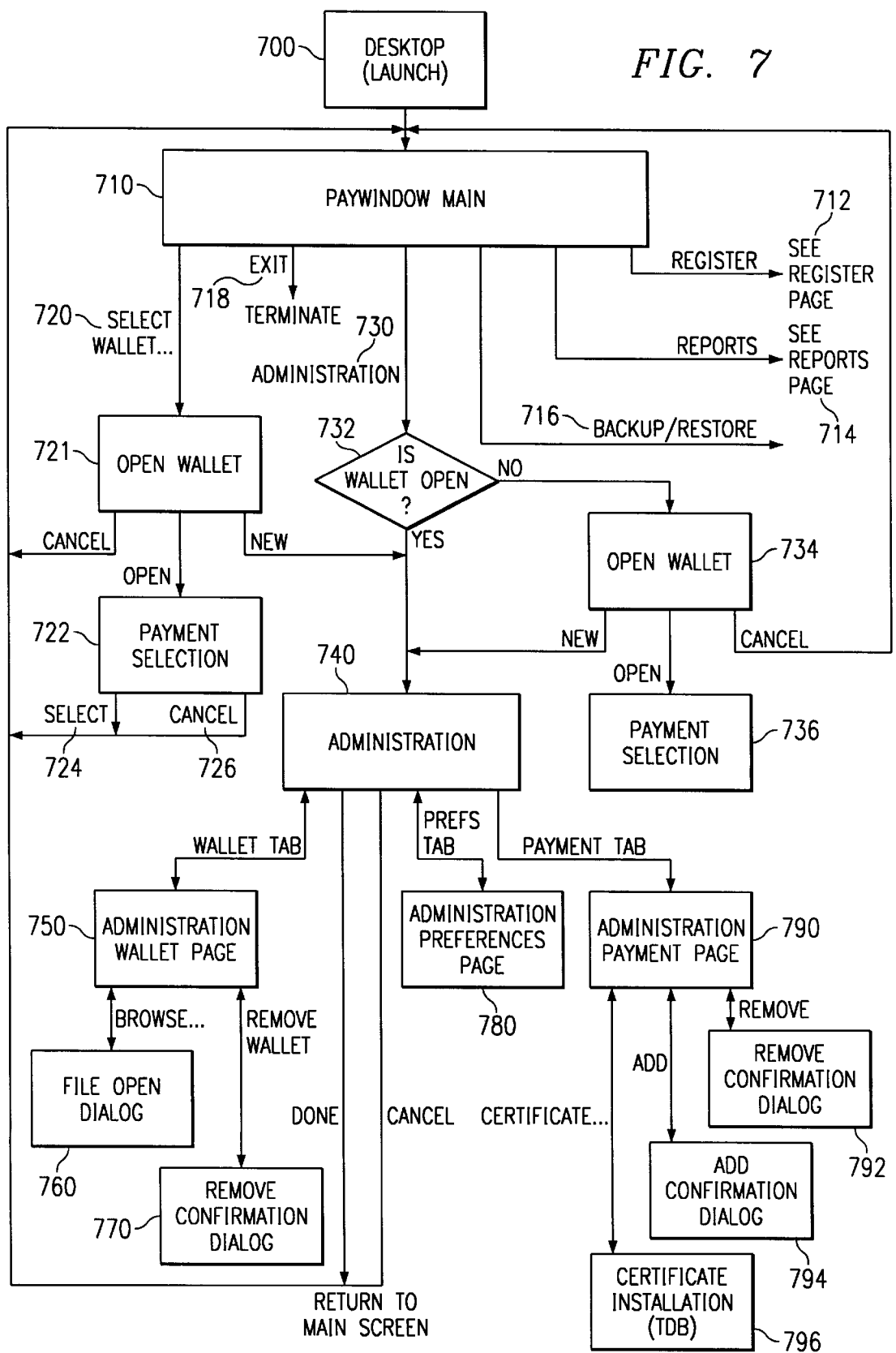
FIG. 7 is a flowchart of the detailed logic associated with the administration mode of the paywindow in accordance with a preferred embodiment.

FIG. 7 is a flowchart of the detailed logic associated with the administration mode of the paywindow in accordance with a preferred embodiment. Processing commences at function block 700 when the application is desktop launched. A user is first exposed to the PayWindow 710 which has a number of selections available. If a user selects a wallet 720 then at function block 721, the wallet is opened and control is passed to function block 722 for a particular form of payment to be selected. Once the particular form of payment is selected at 724 or payment selection is cancelled at 726, then control is returned to the main paywindow at function block 710. However, if a user has selected to open a new wallet at function block 721, then control is passed to the administration function block 740 for further processing.

If a user selects exit 718 from the main paywindow 710, the program terminates. If, however, a user selects administration mode 730 from the main paywindow 710, then another test is performed at decision block 732 to determine if the wallet is open. If the wallet is open, then control is passed to the administration function block 740 for further processing. If a user selects register processing 712 from the main paywindow 710, then control is passed to the register function block detailed in FIG. 8 at 800. If a user selects reports processing 714, then control is passed to the reports function block 860 of FIG. 8 for further processing. If a user selects backup/restore 716 then a backup or restore is performed utilizing the operating system tools in accordance with a preferred embodiment as described above.

If the wallet is determined to not be open at decision block 732, then control is passed to function block 734 to open the wallet. After the wallet is open, then control is either passed to function block 736 to select payment, or if the user has cancelled the operation, control is passed to the main window 710 or if this is a new wallet, then control is passed to the administration function block 740.

When control passes to the administration function block, then if the wallet tab is selected, then control passes to the administration wallet page at function block 750 and if a user is interested in browsing, then a file open dialog is initiated at function block 760, or if a request to remove the wallet from processing is received, then a remove confirmation dialog is initiated at function block 770. If a user is interested in changing the administration preferences, then control is passed to function block 780. If a payment administration processing is selected, then control is passed to the administration payment page as shown in function block 790 where a certificate can be installed as shown in function block 796, a confirmation dialog can be added at function block 794 or a remove confirmation dialog is processed at function block 792. When administration processing is completed, control is passed back to the main paywindow at function block 710.

Figure 8A:
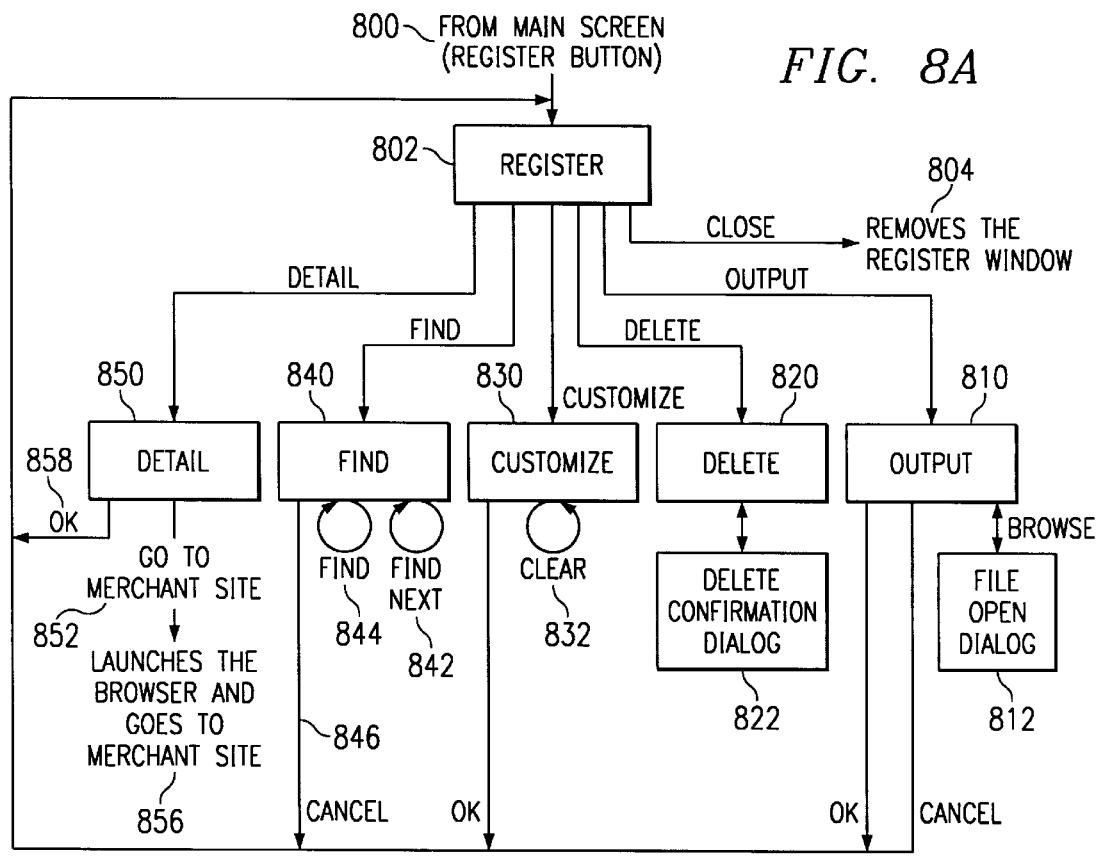
FIGS. 8A and 8B are flowcharts of administration mode processing associated with register and report processing in accordance with a preferred embodiment.
Figure 8B:
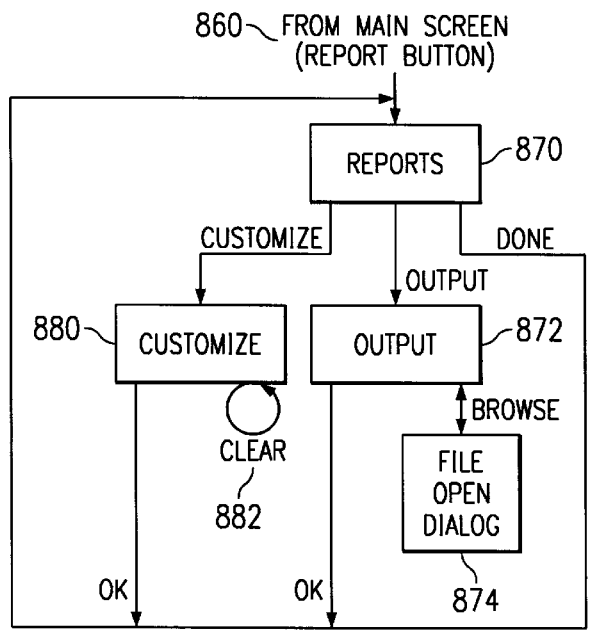

FIGS. 8A and 8B are flowcharts of administration mode processing associated with register and report processing in accordance with a preferred embodiment. Processing commences at 800 where control is passed if an administrative register task is to be processed. The register function is parsed at function block 802 and if a detail function is to be processed, control is passed to function block 850 to determine if a hot link to a merchant site is desired. If so, then control is passed via 852 to launch a browser and go to the merchant site at 856. If not, then control is passed via 858 back to the register function 802. If a find function is to be processed, then control is passed to function block 840 where a find operation is performed for a particular item 844 or a find next operation is performed 842. When find processing is completed or cancelled 846, control is passed back to the main register screen. If a customize register processing is desired, then control is passed to function block 830 to customize the register. If a clear operation is required, then control is passed to 832 to clear the register. When the customize operation is complete, then control is passed back to the main register processing. If a delete register operation is requested, then control is passed to function block 820 and a delete confirmation dialog is conducted at function block 822. Finally, if an output register operation is requested, then the register window is removed at 804, control is passed to function block 810 and a file open dialog is initiated at function block 812. When the dialog is completed, then control is returned to function block 802.

If a report button is pressed from the administration paywindow screen, then control is passed 860 to the reports function block 870 to customize reports at function block 880, clear reports 882 or output reports 872 which is accomplished via a file open dialog at function block 874.

PayWindow

Figure 9:
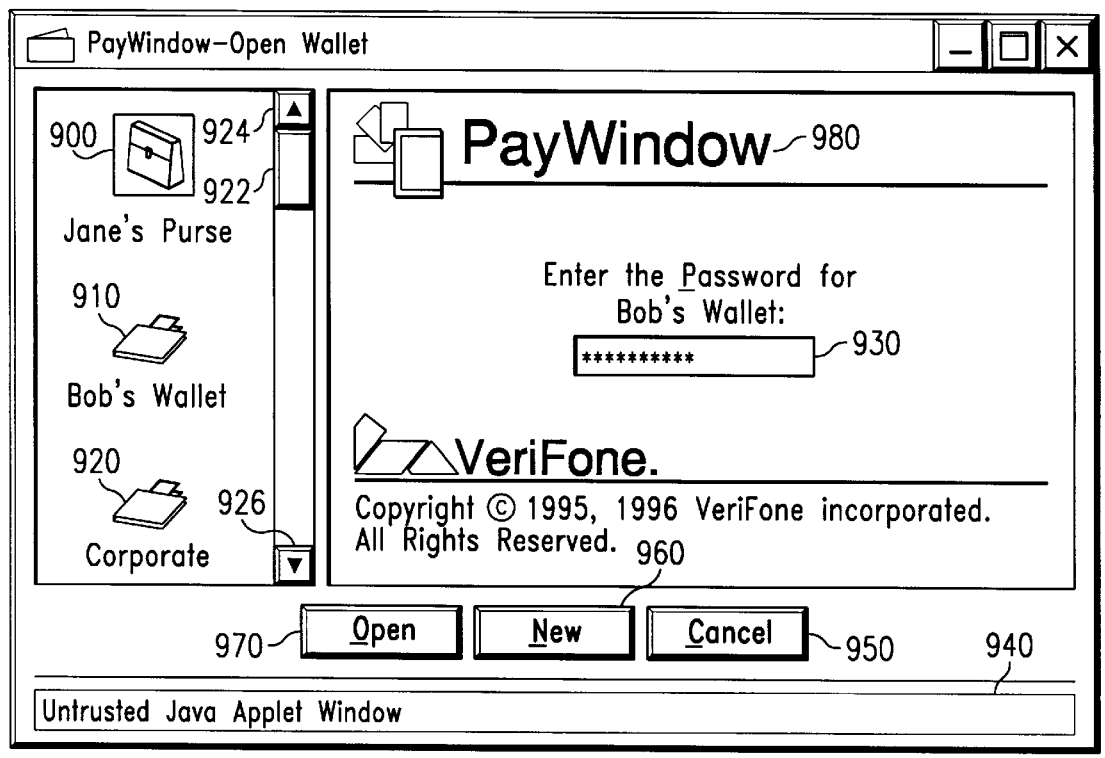
FIG. 9 is an illustration of a paywindow display in accordance with a preferred embodiment.

FIG. 9 is an illustration of a paywindow display in accordance with a preferred embodiment. The paywindow display 980 presents a list of available payment instrument holders in graphic form such as a purse bit image 900, or wallet bit image 910, 920 to a user once an appropriate password is entered via an entry point 930. A scroll bar 922 is provided to allow the list of available payment methods to be scrolled, or selecting the up arrow 924 or the down arrow 926 can be used to review the available payment methods. In addition, there are areas provided at the bottom of the screen for opening 970, creating a new 960 wallet and cancelling 950 payment. The Cancel button 950 invokes the display of the payment cancellation screen. Finally, a message area is provided at the bottom of the screen for communicating system messages 940. If a user presses the right or left mouse button the focus of the window is shifted accordingly. The tab key on the keyboard attached to the cpu is utilized to move and cycle the highlight between various controls on the display. If the enter key is pressed, the highlighted control is activated. For example, if the enter key is pressed after information is entered into the password field 930, then the password is checked with the password file to determine if a valid password has been entered. The wallet's listbox is a single selection listbox which displays all the wallets installed on the system. A user may utilize the mouse or keyboard to select a wallet to open. The New button 960 creates a new wallet file and displays the 'Administration' dialog for wallet information entry.

Payment Instrument

Figure 10:
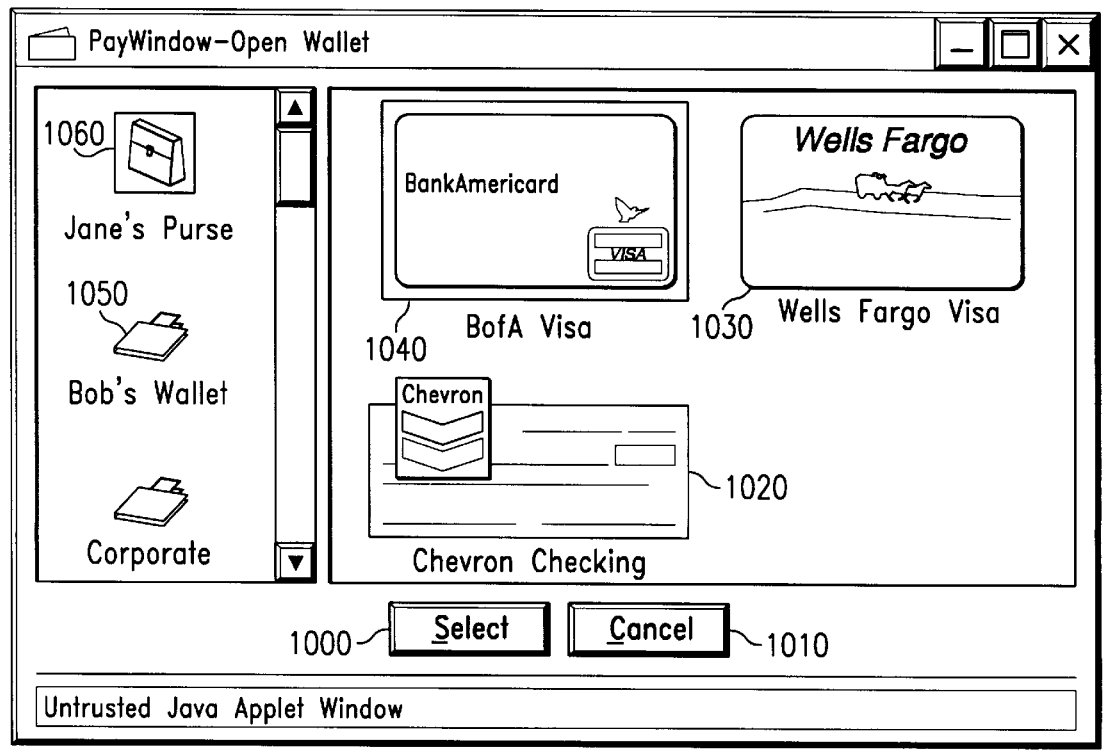
FIG. 10 illustrates a list of payment methods for a user to select from in accordance with a preferred embodiment.

FIG. 10 illustrates a list of payment instruments represented as bit mapped images for a user to select from in accordance with a preferred embodiment. The payment instruments include a credit card, debit card, smart card, ecash, micropayments and electronic checks. The open button 970 invokes the payment instrument screen. By clicking on the Select button 1000, control is transferred to an authorization screen where the details of the order are displayed. The payment instruments represented in FIG. 10 include a Bank Americard Visa 1040 with a graphical image that is virtually identical to the user's actual card, so such information as payment instrument holder's name, instrument name, membership period and expiration date. Such images can be obtained by scanning the user's cards or utilizing the manufacturer's template and adding text representative of the user's name. A Chevron checking account 1020 is also provided with an enlarged Chevron logo to represent the user's checking account which is another type of payment instrument that is supported in a preferred embodiment. A Wells Fargo Visa 1030 payment instrument is also provided in accordance with a preferred embodiment. Whereas realistic representations of actual visa cards are represented in FIG. 10, one of ordinary skill in the art will readily appreciate that other, user-defined graphic or text information can be utilized to represent the payment instruments. Pressing the Cancel button 1010 goes back to the Payment Cancellation screen. Choosing Bob's wallet 1050 goes back to the open wallet display screen to enter Bob's wallet password 930. Double clicking on any payment instrument takes you to an authorization screen for that particular payment instrument. Clicking on a payment instrument icon puts a border around it, indicating it has been selected. An example of the border is shown for Jane's purse 1060 and the graphic associated with Jane's purse has an indicia of the open state which is a graphic in an open position as shown at 1060. Similarly, if a wallet is selected, such as Bob's Wallet 1050, the graphic associated with the wallet could be represented with an indicia of openess, such as a changed color, or a graphic that portrays an open wallet.

Source code in accordance with a preferred embodiment is provided below as another form of detailed logic disclosure. The WalletBrowserPanel class displays the wallets and the payment instruments contained in it. It utilizes the PasswordEntryPanel, ImageSelectorPanel and the ImageItem classes. The PasswordEntryPanel class accepts the password for a given wallet from the user. The ImageSelectorPanel class displays the wallet icons and the payment instrument icons and allows the user to select/deselect an wallet or instrument. Displaying of an icon on the screen is managed by the ImageItem class.

```
import java.awt.*;
import java.net.*;
import java.util.*;
public class WalletBrowserPanel extends Panel {
    private PayWindow payWindow;
    private WalletManager walletManager;
    private ImageSelectorPanel walletPanel, instrumentPanel;
    private Button btnOK, btnCancel;
    private Panel buttonPanel, walletDetail;
    private PasswordEntryPanel passwordEntryPanel;
    private Insets insets = new Insets(15, 15, 15, 15);
    private ImageItemRef openWalletImageItem = null;
    public WalletBrowserPanel(PayWindow pw) {
        payWindow = pw;
        walletManager = WalletManager.getWalletManager( );
        btnOK = new Button("Open");
        btnCancel = new Button("Cancel");
        buttonPanel = new Panel( );
        buttonPanel.setLayout(new FlowLayout(FlowLayout.CENTER, 15,
10));
        buttonPanel.add(btnOK);
        buttonPanel.add(btnCancel);
        instrumentPanel = new ImageSelectorPanel(false, null);
        walletPanel = new ImageSelectorPanel(false, null);
        Enumeration walletNames = walletManager.getWalletNames( );
        String name;
        Wallet wallet;
        while(walletNames.hasMoreElements( )) {
            name = (String)walletNames.nextElement( );
            wallet = walletManager.getWallet(name);
            try {
                walletPanel.addImage(name, new
                URL(walletManager.getImageDir( ) +
                    wallet.getCloseBitmap( )), wallet);
            } catch (Exception e) {
                System.out.println(e);
            }
        }
        passwordEntryPanel = new PasswordEntryPanel(this);
        passwordEntryPanel.setPanelSize(new Dimension(375, 290));
        walletDetail = new Panel( );
        walletDetail.setLayout(new CardLayout( ));
        walletDetail.add("PasswordEntryPanel",
    passwordEntryPanel);
        walletDetail.add("InstrumentSelection", instrumentPanel);
        setLayout(new BorderLayout( ));
        add("South", buttonPanel);
        add("West", walletPanel);
        add("Center", walletDetail);
        walletNames = walletManager.getWalletNames( );
        name = (String)walletNames.nextElement( );
        passwordEntryPanel.setWallet(name);
        displayOpenWallet( );
    }
    public void openNewWallet( ) {
//      ImageItemRef imageItemRef = walletPanel.
//          getSelectedItem( );
//      passwordEntryPanel.setWallet(imageItemRef.getName( ));
//      btnOK.setLabel("Open");
//      ((CardLayout)walletDetail.getLayout( )).
//          show(walletDetail, "PasswordEntryPanel");
//      payWindow.setTitle("PayWindow - Open Wallet");
        displayOpenWallet( );
    }
    public void getPaymentInstrument( ) {
        ImageItemRef imageItemRef = walletPanel.
            getSelectedItem( );
        Wallet openWallet = payWindow.getOpenWallet( );
        Wallet selectedWallet = (Wallet)imageItemRef.getUserObject( );
        if ((selectedWallet != null) && (openWallet != null) &&
            openWallet.equals(selectedWallet)) {
//          btnOK.setLabel("Select");
//          ((CardLayout)walletDetail.getLayout( )).
//              show(walletDetail, "InstrumentSelection");
//
//          payWindow.setTitle("PayWindow - Choose Payment Method");
            displayChoosePaymentMethod( );
        }
        else {
            displayOpenWallet( );
```

```
            }
        }
        public void disableOpenButton( ) {
            btnOK.disable( );
        }
        public void enableOpenButton( ) {
            btnOK.enable ( );
        }
        public void newWallet(Wallet wallet) {
            System.out.println("Wallet Browser - newWallet");
            try {
                walletPanel.addImage(wallet.getName( ),
                    new URL(walletManager.getImageDir( ) +
wallet.getCloseBitmap( )),
                    wallet);
            } catch (Exception e) {
                System.out.println(e);
            }
        }
        public Insets insets( ) {
            return insets;
        }
        public boolean handleEvent(Event evt) {
            if (evt.target == instrumentPanel) {
                if (evt.id == ImageSelectorPanel.EVENT_IMAGEDOUBLECLICK)
{
                    PaymentInstrument instrument;
                    ImageItemRef imageItemRef = (ImageItemRef)evt.arg;
                    instrument = (PaymentInstrument)
                        imageItemRef.getUserObject( );
                    payWindow.authorizePayment(instrument);
                }
            }
            else
            if (evt.target == walletPanel) {
                if (evt.id == ImageSelectorPanel.EVENT_IMAGESELECTION) {
                    ImageItemRef imageItemRef = (ImageItemRef)evt.arg;
                    Wallet wallet =
(Wallet)imageItemRef.getUserObject( );
                    if (wallet == payWindow.getOpenWallet( ) &&
                        payWindow.isPaymentRequest( )) {
//                      btnOK.setLabel("Select");
//                      ((CardLayout)walletDetail.getLayout( )).
//                      show(walletDetail, "InstrumentSelection");
//                      payWindow.setTitle("PayWindow - Choose
                                                    Payment Method");
                        displayChoosePaymentMethod( );
                    }
                    else {
//
    passwordEntryPanel.setWallet(imageItemRef.getName( ));
//                      btnOK.setLabel("Open");
//                      ((CardLayout)walletDetail.getLayout( )).
//                      show(walletDetail, "PasswordEntryPanel");
//                      payWindow.setTitle("PayWindow-Open Wallet");
                        displayOpenWallet( );
                    }
                }
            }
            else
            if (evt.target == btnOK){
                if (evt.id == Event.ACTION_EVENT) {
                    if (btnOK.getLabel( ) == "Open") {
                        System.out.println("Open");
                        ImageItemRef imageItem = walletPanel.
                            getSelectedItem( );
                        Wallet selectedWallet =
                            (Wallet)imageItem.getUserObject( );
                        // validate the password
                        // close any open other open wallet
                        if (openWalletImageItem != null) {
                            Wallet prevOpenWallet = (Wallet)
    openWalletImageItem.getUserObject( );
                            prevOpenWallet.close( );
                            try {
    walletPanel.changeImage(openWalletImageItem,
                                                new
URL(walletManager.getImageDir( ) +
    prevOpenWallet.getCloseBitmap( )));
                            } catch (Exception e) {
```

```
                System.out.println(e);
            }
        }
        // open selected wallet
walletManager.openWallet(selectedWallet.getName( ), "");
            payWindow.setOpenWallet(selectedWallet);
            openWalletImageItem = imageItem;
            // display open wallet icon
            try {
                walletPanel.changeImage(imageItem,
                    new
URL(walletManager.getImageDir( ) +
                        selectedWallet.getOpenBitmap( )));
            } catch (Exception e) {
                System.out.println(e);
            }
            // get instruments
            instrumentPanel.removeAllElements( );
            Enumeration instrumentNames =
                selectedWallet.getInstruments( );
            PaymentInstrument instrument;
            String name;
            while(instrumentNames.hasMoreElements( )) {
                name =
(String)instrumentNames.nextElement( );
                instrument =
selectedWallet.getInstrument(name);
                try {
                    instrumentPanel.addImage(name,
                        new
URL(walletManager.getImageDir( ) +
                            instrument.getBitmap( )),
instrument);
                } catch (Exception e) {
                    System.out.println(e);
                }
            }
            if (payWindow.isPaymentRequest( )) {
                // display instruments
//              btnOK.setLabel("Select");
//              ((CardLayout)walletDetail.getLayout( )).
//                  show(walletDetail,
"InstrumentSelection");
                displayChoosePaymentMethod( );
            }
            else {
                payWindow.showMenu( );
            }
        }
        else
        if (btnOK.getLabel( ) == "Select") {
            PaymentInstrument instrument;
            ImageItemRef imageItemRef =
instrumentPanel.getSelectedItem( );
            instrument = (PaymentInstrument)
                imageItemRef.getUserObject( );
            payWindow.authorizePayment(instrument);
        }
    }
    else
    if (evt.target == btnCancel) {
        if (payWindow.isPaymentRequest( )) {
            payWindow.cancelTransaction( );
        }
        else {
            payWindow.showMenu( );
        }
    }
    return super.handleEvent(evt);
}
public void paint(Graphics g)
{
    g.drawLine(insets.left, size( ).height-insets.bottom,
        size( ).width-insets.right, size( ).height-insets.bottom);
    g.drawLine(insets.left, size( ).height-insets.bottom+1,
        size( ).width-insets.right, size( ).height-
insets.bottom+1);
}
private void displayOpenWallet( ) {
```

```
                ImageItemRef imageItemRef = walletPanel.
                    getSelectedItem( );
                passwordEntryPanel.setWallet(imageItemRef.getName( ));
                btnOK.setLabel("Open");
                ((CardLayout)walletDetail.getLayout( )).
                    show(walletDetail, "PasswordEntryPanel");
                payWindow.setTitle("PayWindow - Open Wallet");
        }
        private void displayChoosePaymentMethod( ) {
                btnOK.setLabel("Select");
                btnOK.enable( );
                ((CardLayout)walletDetail.getLayout( )).
                    show(walletDetail, "InstrumentSelection");
                payWindow.setTitle("PayWindow - Choose Payment Method");
        }
}
class PasswordEntryPanel extends Panel {
        private Image panelImage;
        private TextField password;
//      private URL imageFileURL;
        private Dimension panelSize;
        private Label enterPasswordLabel;
        private Label walletNameLabel;
        private WalletBrowserPanel walletBrowserPanel;
        public PasswordEntryPanel(WalletBrowserPanel wbp) {
                walletBrowserPanel = wbp;
                ImageLoader imageLoader = new ImageLoader(this);
                WalletManager wm = WalletManager.getWalletManager( );
                try {
//                      imageFileURL = new
//
URL("File://e:/htdocs/PayWindow/JavaDemoDev/images/open.wallet.background.g
if");
//
URL("http://kimberly/PayWindow/JavaDemoDev/images/open.wallet.background.gi
f");
                }catch(Exception e)
                        System.out.println(e);
//              panelImage = imageLoader.LoadImage(imageFileURL);
                panelImage = imageLoader.LoadImage(wm.getPwdScrImage( ));
                panelSize = new Dimension(panelImage.getWidth(this),
                        panelImage.getHeight(this));
                enterPasswordLabel = new Label("Enter the Password for",
Label.CENTER);
                walletNameLabel = new Label("", Label.CENTER);
                password = new TextField( );
                password.setEchoCharacter('★');
                setLayout(null);
                add(password);
                add(enterPasswordLabel);
                add(walletNameLabel);
        }
        public void setWallet(String walletName) {
                walletNameLabel.setText(walletName+":");
                password.setText("");
                walletBrowserPanel.disableOpenButton( );
        }
        public void setPanelSize(Dimension size) {
                panelSize = size;
        }
        public String getPassword( ) {
                return password.getText( );
        }
        public Dimension minimumSize( ) {
                return preferredSize( );
        }
        public Dimension preferredSize( ) {
                return panelSize;
        }
        public boolean handleEvent(Event evt) {
                if (evt.target == password) {
                        if (evt.id == Event.KEY_RELEASE) {
                                if (password.getText( ).length( ) == 0) {
                                        walletBrowserPanel.disableOpenButton( );
                                }
                                else {
                                        walletBrowserPanel.enableOpenButton( );
                                }
                        }
                }
```

-continued

```
        return super.handleEvent(evt);
    }
    public void update(Graphics g) {
        paint (g);
    }
    public void paint(Graphics g) {
//      g.drawImage(panelImage, 0, 0, size( ).width, size( ).height,
this);
        g.drawImage(panelImage,
            (size( ).width - panelImage.getWidth(this))/2,
            (size( ).height - panelImage.getHeight(this))/2,
            this);
        int labelWidth;
        FontMetrics fontMetrics = g.getFontMetrics( );
        labelWidth = fontMetrics.stringWidth(
            enterPasswordLabel.getText( )) + 60;
        enterPasswordLabel.reshape((size( ).width - labelWidth)/2,
            (size( ).height/2) - 30, labelWidth, 20);
        labelWidth = fontMetrics.stringWidth(
            walletNameLabel.getText( )) + 60;
        walletNameLabel.reshape((size( ).width - labelWidth)/2,
            (size( ).height/2) - 10, labelWidth, 20);
        password.reshape((size( ).width - 100)/2, (size( ).height/2) +
10,
            100, 20);
        g.drawRect(0, 0, size( ).width-1, size( ).height-1);
    }
}
```

Authorization

Figure 11:
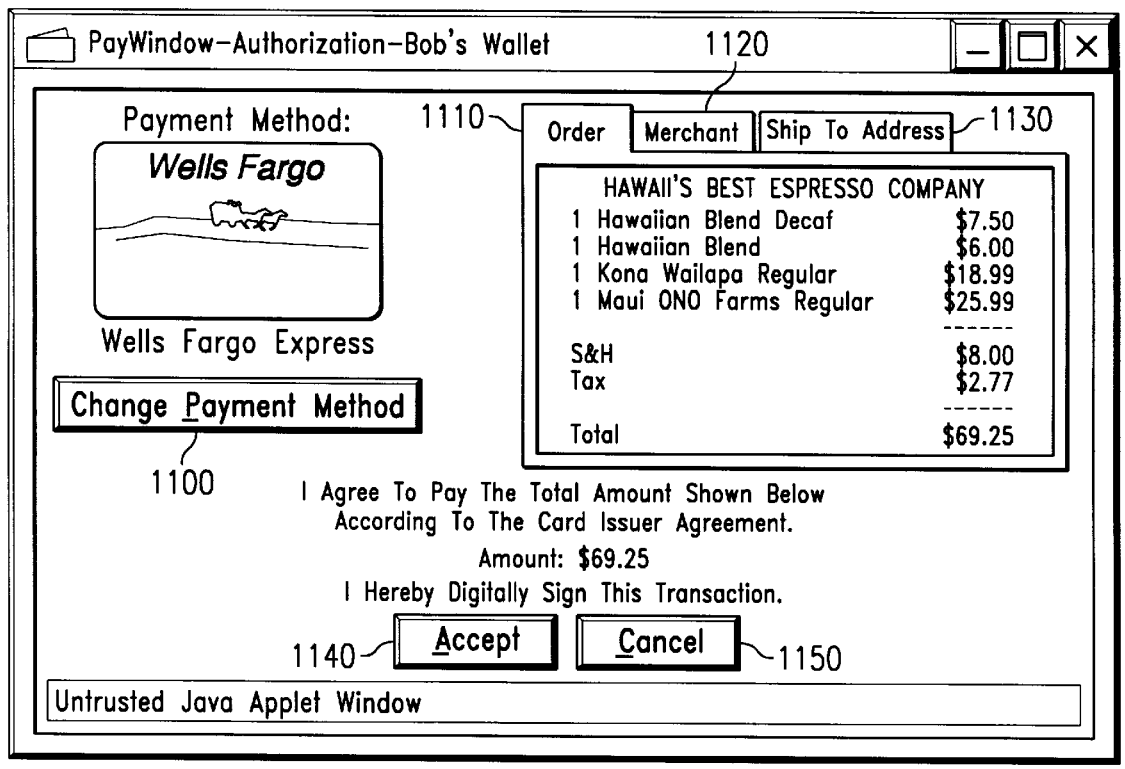
FIG. 11 is an authorization display screen in accordance with a preferred embodiment.
Figure 12:
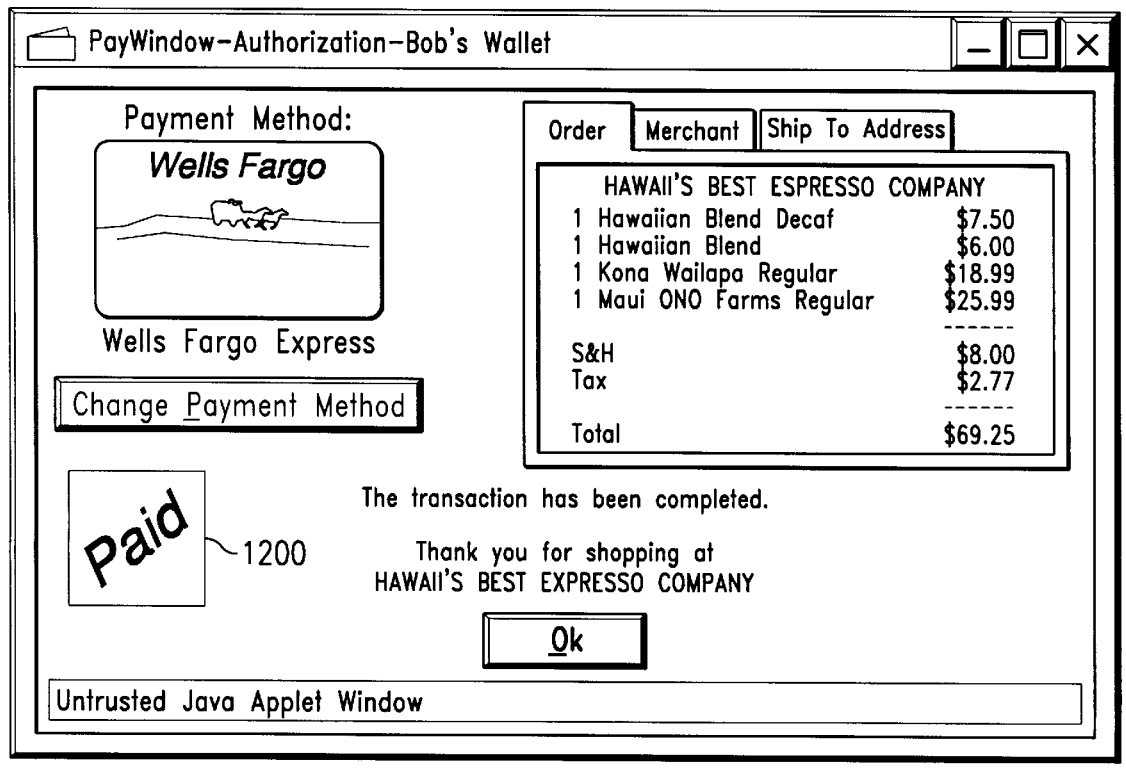
FIG. 12 is a PAID authorization display screen in accordance with a preferred embodiment.
Figure 13:
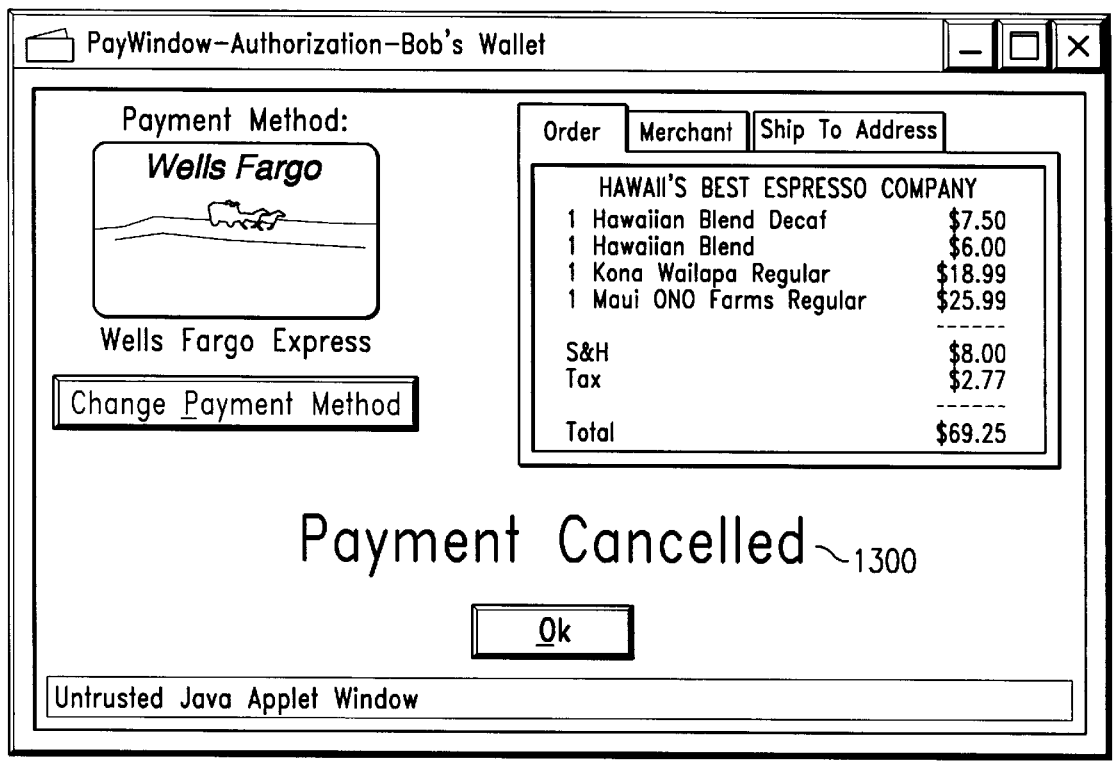
FIG. 13 is a cancellation of authorization display screen in accordance with a preferred embodiment.

FIG. 11 is an authorization display screen in accordance with a preferred embodiment. The authorization screen displays the transaction details and facilitates a user's examination of all the details of a particular transaction. It also allows a user to accept or cancel a transaction, or change the payment method for a particular transaction. The payment button on a web page launches this screen when a wallet is already open. The change payment method 1100 displays the Payment Instrument screen to allow a user to choose a different payment instrument and transfers control to the paywindow display shown in FIG. 9. The Order tab 1110 controls the display of pages of information about the transaction on order, merchant or address. The merchant tab 1120 provides information on the merchant. Selecting the Ship to Address tab 1130 provides a link to the address information for the selected merchant. Pressing the accept button 1140 signals the user's acceptance of the transaction, and it records the transaction data into the wallet's register and displays a PAID receipt as shown at 1200 at FIG. 12. Pressing the Cancel button 1150 displays the payment cancellation screen as shown in FIG. 13 at 1300.

PayWindow Main

Figure 14:
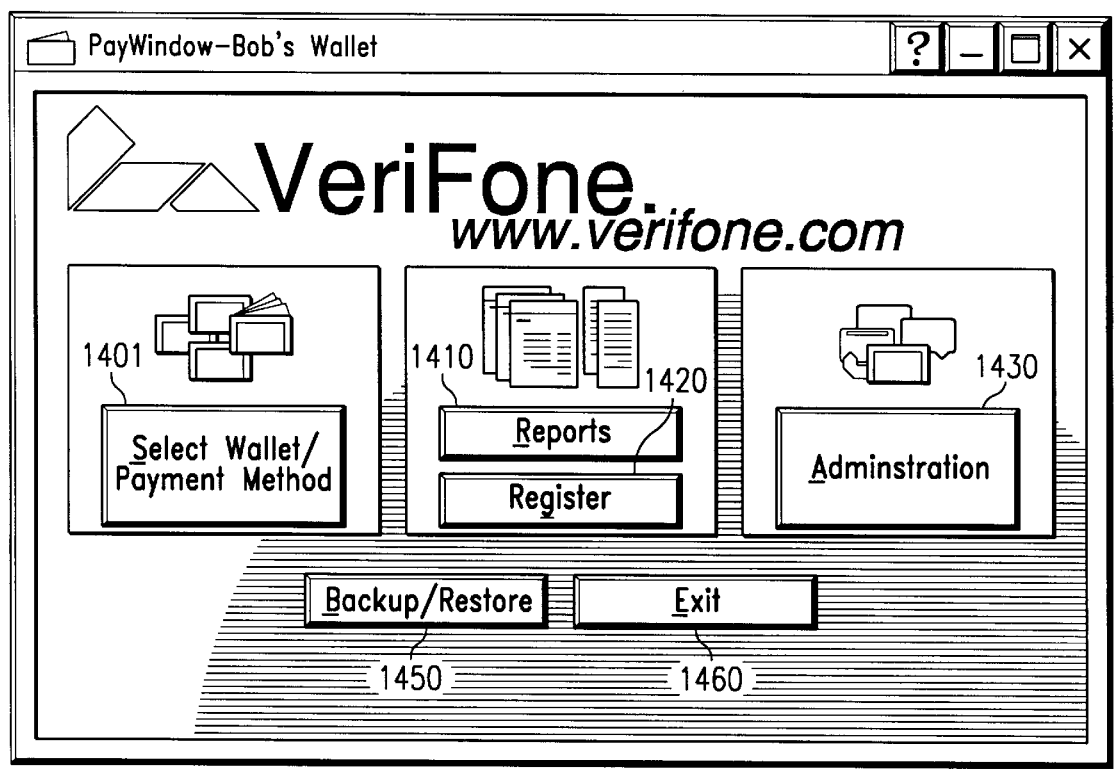
FIG. 14 illustrates a Main screen in accordance with a preferred embodiment of the invention.

FIG. 14 illustrates a Main screen in accordance with a preferred embodiment of the invention. This screen is displayed when a user runs an application in the local mode and indicates that the paywindow is operating in administration mode. The application launches from the desktop. The screen controls include a button for selecting wallet 1401 which displays the paywindow screen and allows a user to open or create a new wallet. Another button, the report button 1410 opens an instance of the report window when it is selected. Selecting the register button 1420 opens the register window which allows a user to select from a variety of register transactions. Selection of the administration button 1430 opens the administration screen which allows a user to perform various administrative tasks. If a user selects the backup/restore button 1450, then the backup/restore dialog is initiated. Finally, selection of the exit button 1460 closes the screen and terminates the application.

Administration

Figure 15:
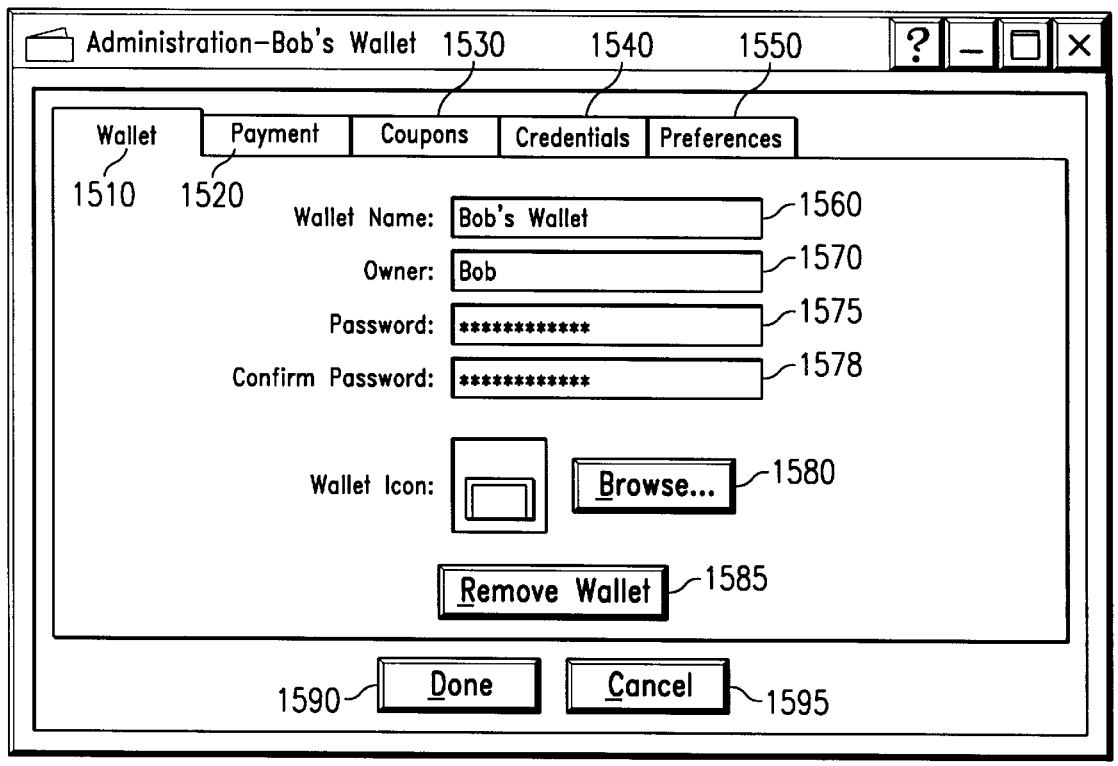
FIG. 15 is an illustration of an Administration display screen in accordance with a preferred embodiment.

FIG. 15 is an illustration of an Administration display screen in accordance with a preferred embodiment. This is the main screen for entering information pertinent to wallets, payment methods and user preference settings into the system. The information is organized and presented in pages of grouped data, which are accessed by tabs 1510, 1520, 1530, 1540 and 1550. The Administration display is launched from the Administration button 1430 of FIG. 14 in response to selection of the button by a user. The wallet tab 1510 controls management of pages of related information pertaining to the currently active wallet. Users can utilize the mouse or the keyboard to modify the pages of information. The wallet tab 1510 contains entry fields for the wallet name 1560, owner name 1570, password 1575 and password confirm 1578. The browse button 1580 opens the file containing a list of wallets to choose from using a wallet icon file as input to the process. The remove wallet button 1585 removes the current wallet from the system and displays a confirmation message box prior to deletion. The done button 1590 saves the new information in the wallet when it is selected. The cancel button 1595 discards the changes and closes the display screen when it is selected.

Figure 16:
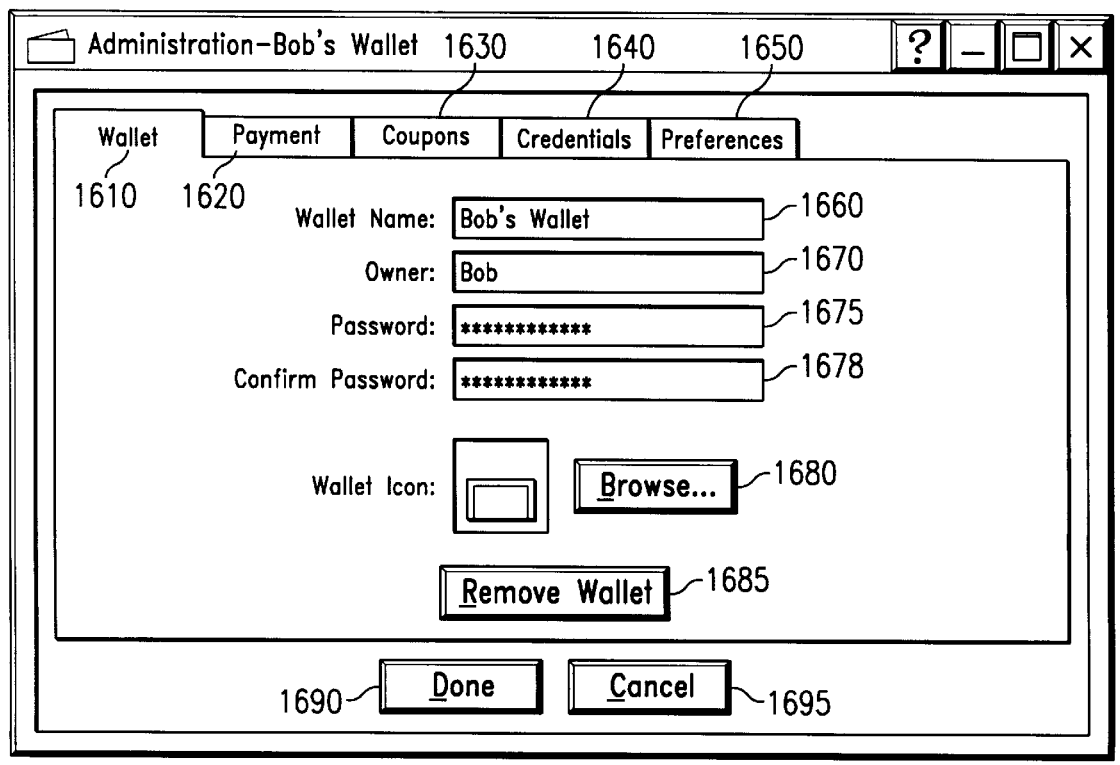
FIG. 16 illustrates a display of the wallet administration page in accordance with a preferred embodiment.

FIG. 16 illustrates a display of the administration wallet page in accordance with a preferred embodiment. The wallet tab 1610, payment tab 1620, coupon tab 1630, credentials tab 1640 and preferences tab 1650 provide easy access to these groups of information. When accessing the wallet tab 1610, the user must enter the name of the wallet into the entry field 1660, the wallet's owner must be entered at 1670, a password corresponding to the named wallet must be entered at 1675 the password entry is displayed with "*" characters entered in place of the letters and numbers of the password, and a confirm password must be entered at entry field 1678. This confirm password 1678 must match the password entered at 1675. The browse button 1680 opens the file open dialog to present a user with a list of wallets to choose from using a wallet icon file as input to the process. The remove wallet button 1685 removes the current wallet from the system and displays a confirmation message box prior to deletion. The done button 1690 saves the new information in the wallet when it is selected. The cancel button 1695 discards the changes and closes the display screen when it is selected.

Figure 17:
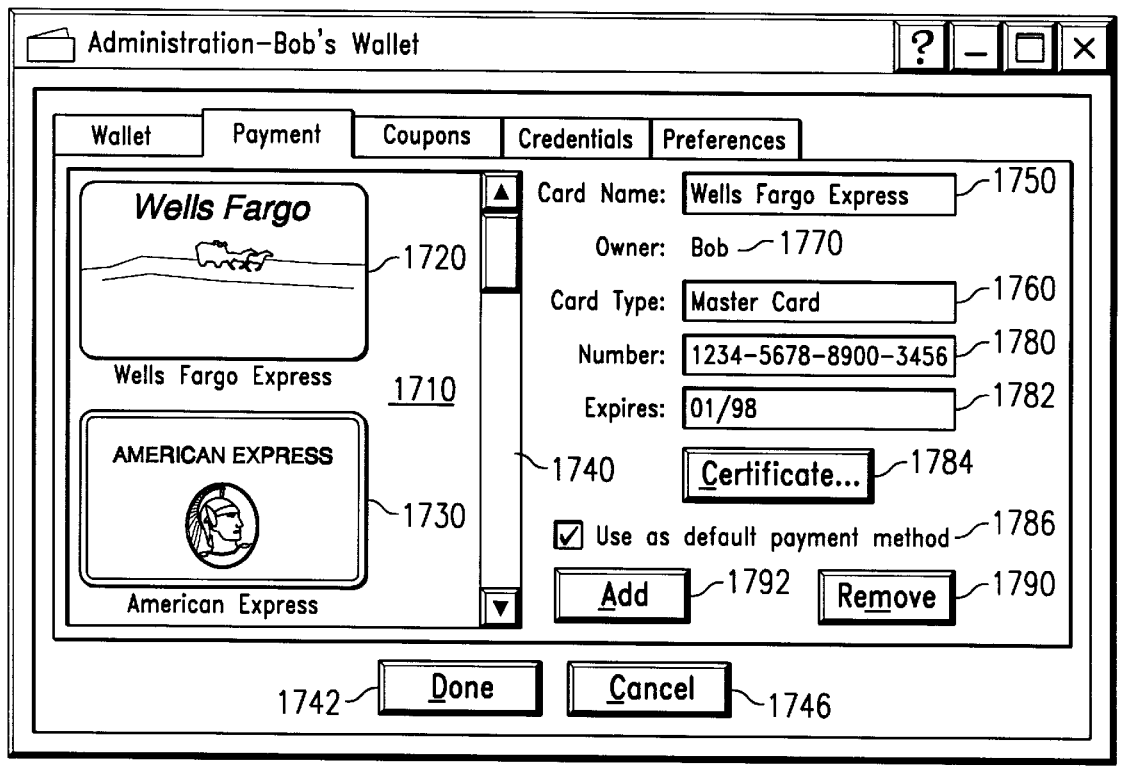
FIG. 17 is a payment administration window in accordance with a preferred embodiment.

The administration payment tab 1520 of FIG. 15 initiates a screen as illustrated in FIG. 17. FIG. 17 is a payment administration window in accordance with a preferred embodiment. A user may use payment page of the administration screen to view or edit a payment method's information. The listbox control 1710 displays all the payment methods currently installed in this wallet. A user can scroll 1740 the listbox control 1710 to see all of the payment methods available to the owner 1770. Each payment method is displayed in the listbox as an approved bitmap 1720, 1730. The user must select a payment method prior to viewing its information. The selection is accomplished by positioning the cursor over a payment method 1720, 1730 that the user requires and clicking the mouse button or pressing the enter key to select that card as the method for payment. The card name edit field 1750 is used to display or edit the name that the system utilizes to refer to the currently selected method for payment. The card type data entry field 1760 corresponds to the various types of methods for payment. Many of the types are predefined for a user, such as: master card, visa, discover.

An associated card number entry field 1780 is also provided to display and/or edit the card number. An entry field 1782 is also provided for display and/or edit of the card's expiration date. A certificate dialog box 1784 button is also provided for initiating the attachment or editing of a certificate. A checkbox control 1786 is also provided if a user desires to make the selected card the default method for payment for a particular wallet. This is an attractive feature since it eliminates selection of a particular method of payment each time a wallet is opened. The ergonomics are well thought out to parallel a user's wallet in which the favorite credit card is usually stored in a convenient location for ready retrieval when the holder of payment methods (ie., wallet, purse, brief case, smart card) is selected. Two other buttons are provided for adding 1792 and removing 1790 a payment method to/from the holder of payment methods. The removal button 1790 displays a confirmation message prior to removal of the payment method. A button to signify completion of processing 1742 and a button for cancelling processing 1746 are also provided.

Figure 18:
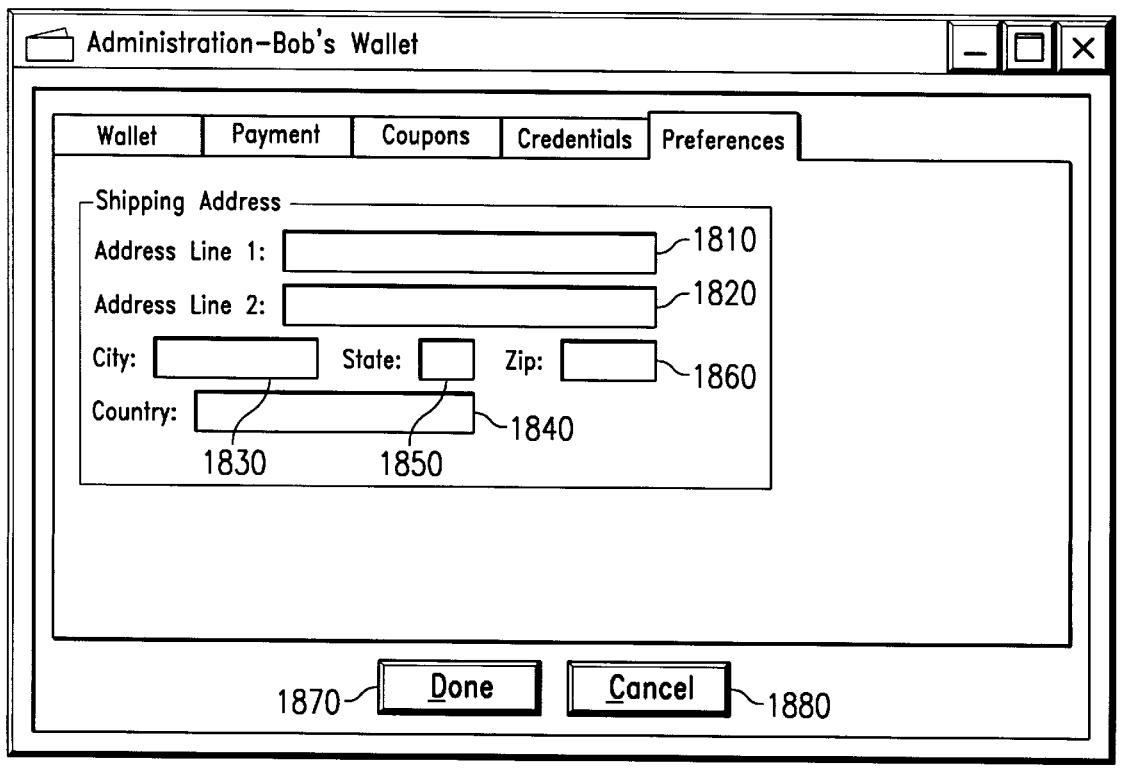
FIG. 18 is an illustration of the administration preferences page in accordance with a preferred embodiment.

FIG. 18 is an illustration of the administration preferences page in accordance with a preferred embodiment. The address line one edit control 1810 is used to view or edit the first shipment address line for a particular user. The address line two edit control 1820 is used to view or edit the second shipment address line for a particular user. The city edit control 1830 is used to edit or view the shipment city for a particular user. The state edit control 1850 is used to edit or view the shipment state for a particular user. The zip code edit control 1860 is used to edit or view the shipment zip for a particular user. The country edit control 1840 is used to edit or view the shipment country for a particular user. A button to signify completion of processing 1870 and a button for cancelling processing 1880 are also provided.

FIG. 19 illustrates the window controls in accordance with a preferred embodiment. The name of the active window is always displayed in the upper left hand corner 1930 for easy recognition by a user. The upper right hand corner has three buttons for minimizing the display 1900, maximizing the display 1910 and closing a display 1920. One of ordinary skill in the art will readily comprehend that other windowing display tools could be substituted for the tools described without undue experimentation. A touch display screen could also be substituted for environments where a mouse or keyboard might not be appopriate. One could even envision the displays being manipulated using a remote control device (infrared) that interfaces with a television set for viewing, selecting and paying for purchases from the comfort of a living room or easy chair.

FIG. 20 is a register display in accordance with a preferred embodiment of the invention. The register display lists all transactions in chronological order and allows a user to navigate through and examiner transactions associated with a wallet. A user also has the option of searching for particular transactions and examining detailed transaction information for any transaction. Finally a user can reconcile transactions against a bank statement as well as a shipment list of merchandise. This display is initiated by selecting the-register button from the administration screen. A user may only create a single instance of the register display, so additional clicks of the mouse button is only be utilized to set the focus to the single register display window. Clicking on an item displayed on the register display sets the selection highlight to the hit record associated with the area the cursor is currently displayed. Double clicking brings up additional detail on the currently selected record.

If the user presses the tab key, the cursor moves to and highlights the next control on the display. If the user presses the enter key, the highlighted button is invoked on the register display. When a transaction record is highlighted, pressing the up arrow key moves the highlight (selected item) to the preceding record. When a transaction record is highlighted, pressing the down arrow moves the highlight (selected area) to the next record. Selecting the home key sets the highlight to the first record in the register report, and similarly, pressing the end key sets the highlight to the last record in the register report. Selecting the detail button 2010 on the register display opens the register detail dialog. Selecting the find button 2020 opens the register find dialog. Selecting the customize button 2030 opens the register customize dialog. Once a user has customized a particular register, then the customize button 2030 displays a colored dot symbol to indicate an active filter is defined. If the delete button 2040 is selected, then the highlighted register is deleted after an appropriate confirmation message box is displayed and selected in the affirmative. Moreover, selection of the output button 2050, opens the output dialog with a user. Finally, selection of the close button 2060 closes the register screen. A scroll bar 2090 is also provided to allow a user to scroll through records extending over a single page. For each record, a date 2080, a time 2082, a payment instrument 2084, an item 2086, an amount 2088, a paid 2070 and a received 2072 entry is provided in a columnar representation. The paid 2070 and received 2072 allow a user to check/reconcile a record when paying the credit card payment.

FIG. 21 is register detail display in accordance with a preferred embodiment. The register detail display allows a user to view or examine all of the specific details of a transaction. The display is launched when a user double clicks on a highlighted transaction record, or when a user presses the detail 2030 button as illustrated in FIG. 20 of the register display. The order tab 2100 control selects an information page on the display. The merchant tab button 2110 provides information about the merchant. The Go To Merchant Site button 2130 button spawns the internet browser and sets it to the merchant web page. The ShipToAddress 2120 provides a link to the address information for the selected merchant. The memo 2150 edit control is used to view/edit a short memo text for each transaction. The paid 2170 checkbox allows a user to check/reconcile a record when he or she pays the credit card payment. The received 2160 checkbox allows a user to check/reconcile the record when he/she receives the merchandise. The done 2140 closes the 'Register Detail' dialog and returns the focus to the register.

Register Find

FIG. 22 is a register find display in accordance with a preferred embodiment. A user utilizes this display to search for a transaction record. The find button 2020 of the register display as described with reference to FIG. 20 is used to initiate this display. The from date 2200 control is used to enter the starting date of a transaction. The to date 2210 control is used to enter the ending date of the transaction. The combobox 2220 is used to list all of the payment methods in the wallet. A pulldown 2225 control causes a list of payment methods to be displayed to the user. The item 2230 control is used to enter a full or substring of the target item of the search. The merchant combo 2240 display lists all of the merchant names in the wallet. The item 2250 control causes a list of all the merchant names to be displayed for selection of the particular merchant name required. The memo 2265 edit control is used to enter the full or substring of the memo to search for. The cancel 2295 button cancels and closes the register find dialog. The find 2290 button starts the search command. The find dialog remains open during the search and the search result in the register is highlighted. The search up 2260 button and down 2270 button direct the direction of the find operation. The find next 2280 button continues the search to locate the next register record.

Figure 23:
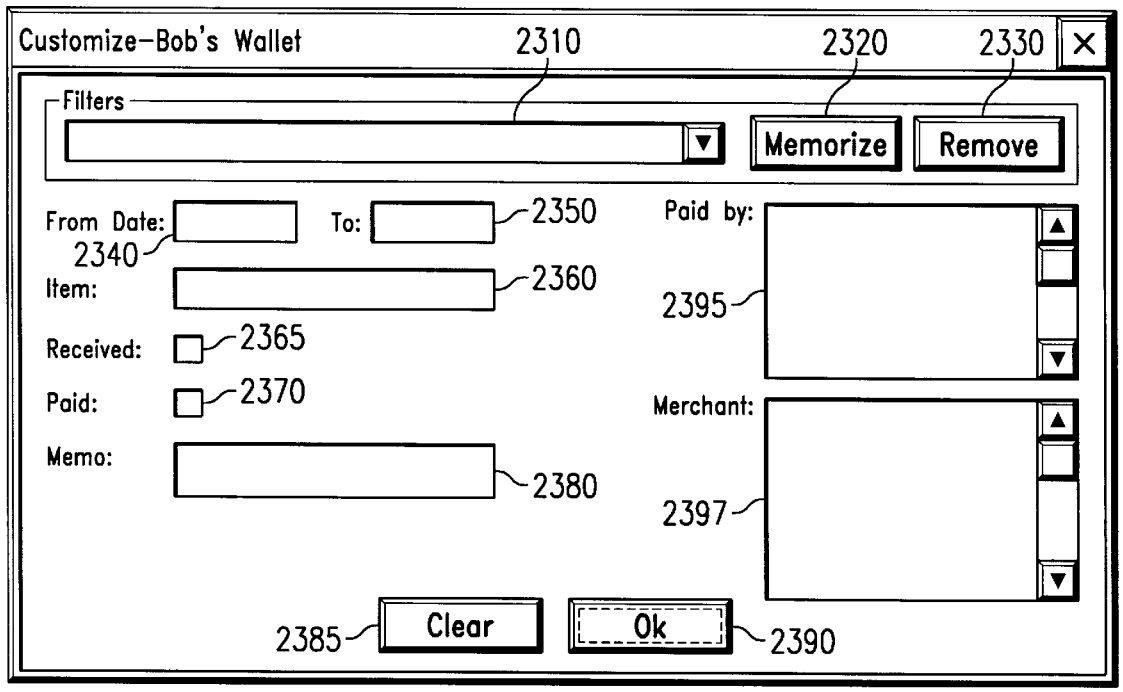
FIG. 23 is a register customize display in accordance with a preferred embodiment.

FIG. 23 is a register customize display in accordance with a preferred embodiment. The display facilitates a dialog which allows a user to create a record filter for transaction records. It provides functionality to save, recall and remove filters. Saved filters are shared between the register and report functions of the paywindow in accordance with a preferred embodiment. To initiate this display, a user selects the customize button 2030 of the register screen. The from date 2340 entry field allows a user to enter a starting date to show the records after this date. The to date 2350 entry field allows a user to enter an ending date to show the records up to and including this date. The item 2360 entry field allows a user to enter a full or substring of the item field as a filter parameter. The received 2365 button allows a user to select a 'received' flag as a filter parameter. The paid 2370 button allows a user to select a 'paid' flag as a filter parameter. The memo field 2380 allows a user to enter a full or substring of the memo field as a filter parameter. A user may select one or more payment methods as a filter parameter utilizing the paid by 2395 box. This multi-selection listbox displays all the payment methods in the wallet for a user to choose from. The merchant box 2397 allows a user to select one or more merchants as a filter parameter. This multiselection listbox displays all of the merchant names in the transaction register for a user to select from. The filters 2310 allow a user to name, store and retrieve filters by using the combobox and selecting, or entering a stored filter name. The memorize 2320 button assigns the name appearing in the filter 2310 box to the parameters specified on the display. The remove 2330 button allows a user to select a filter using the combobox, and delete it. The clear 2385 button allows a user to clear all of the filter parameters. The ok 2390 button activates a filter and closes the customize dialog. The customize button of the register displays a dot indicating an active filter.

Figure 24:
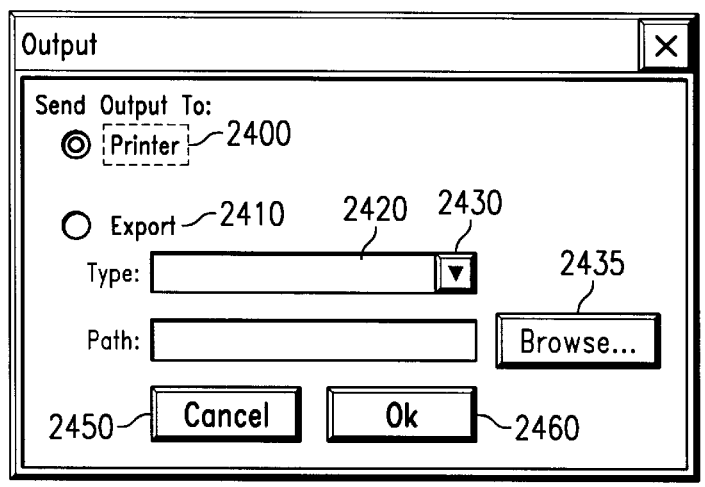
FIG. 24 is a register output display for directing the output target for register information.

FIG. 24 is a register output display for directing the output target for register information. For example, a user may select a printer or a file as the target for outputting the results of a register display. The output display is invoked by pressing the output button of a register display. The user clicks the printer button 2400 to initiate output of register display information to the printer. A user selects the export button 2410 to output the register information to a file in a file format selected form the type 2420 combobox. The user specifies a path/name for the output file in text entry field 2430. A user may open the file save dialog by selecting the browse 2435 button and setting the output file path and file name. The cancel 2450 buton cancels the operation and closes the dialog display. The ok 2460 button closes the dialog and starts the output of the register screen.

Report

FIG. 25 is a report of a wallet in accordance with a preferred embodiment. The display is a pre-formatted report for use in customizing a report. A user invokes the report by pressing a button of the paywindow display. The customize button 2500 opens the register customize dialog. If a colored dot appears in the customize button 2500, then a filter is currently active. The output button 2510 opens the output dialog. The done 2520 button closes the report window. The report type listbox 2530 allows a user to select a pre-formatted report type by using the report type combobox. The user can also select any of the fields 2540, 2550, 2560, 2570, 2580 or 2590 to set the report sort field. The selected sort field appears as boldface in the sort field.

Report Customize

Figure 26:
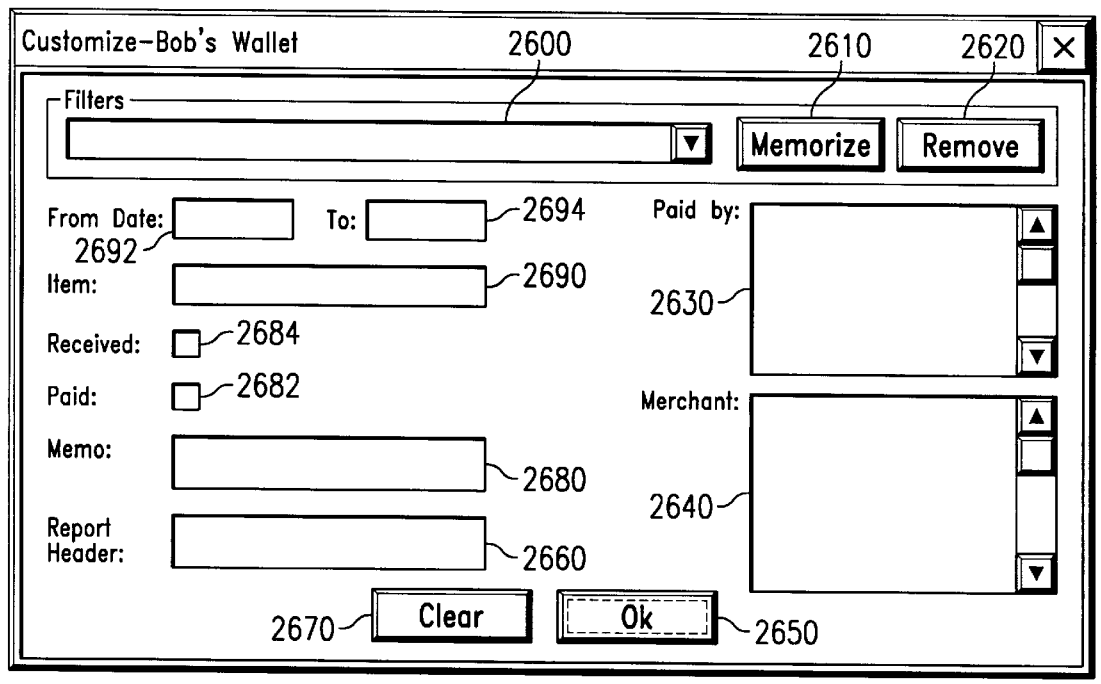
FIG. 26 illustrates a report customize display in accordance with a preferred embodiment.

FIG. 26 illustrates a report customize display in accordance with a preferred embodiment. The screen allows a user to create a record filter for transaction records. It provides functionality to save, recall and remove filter(s). Saved filters are shared between the Register and Report functions of the PayWindow. To initiate this display, a user selects the customize button of the report screen. The from date 2692 entry field allows a user to enter a starting date to show the records after this date. The to date 2694 entry field allows a user to enter an ending date to show the records up to and including this date. The item 2690 entry field allows a user to enter a full or substring of the item field as a filter parameter. The received 2684 button allows a user to select a 'received' flag as a filter parameter. The paid 2682 button allows a user to select a 'paid' flag as a filter parameter. The memo field 2680 allows a user to enter a full or substring of the memo field as a filter parameter. A user may select one or more payment methods as a filter parameter utilizing the paid by 2630 box. This multi-selection listbox displays all the payment methods in the wallet for a user to choose from. The merchant box 2640 allows a user to select one or more merchants as a filter parameter. This multiselection listbox displays all of the merchant names in the report for a user to select from. The filters 2600 allow a user to name, store and retrieve filters by using the combobox and selecting, or entering a stored filter name. The memorize 2610 button assigns the name appearing in the filter 2610 box to the parameters specified on the display. The remove 2620 button allows a user to select a filter using the combobox, and delete it. The report header 2660 entry field allows a user to enter information for display as a title for the report. The clear 2670 button allows a user to clear all of the filter parameters. The ok 2650 button activates a filter and closes the customize dialog. The customize button of the report displays a dot indicating an active filter.

Report Output

Figure 27:
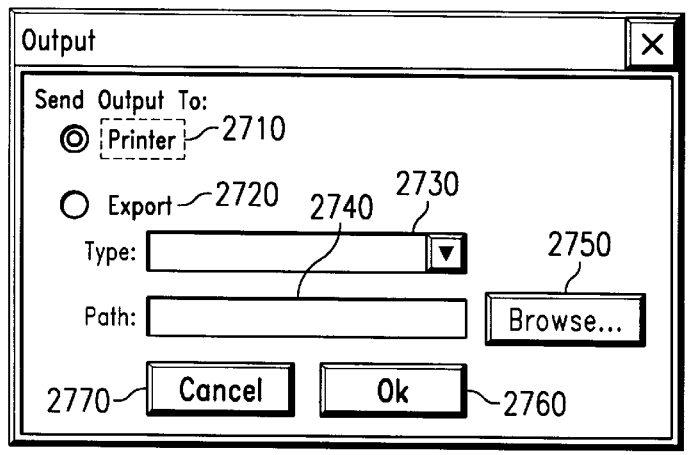
FIG. 27 is a report output display in accordance with a preferred embodiment.

FIG. 27 is a report output display in accordance with a preferred embodiment. A user can select the output target utilizing this dialog. This display is invoked by selecting the output button 2510 of the report display. A user may select a target of choice using this dialog. A user selects the printer 2710 checkbox if the ouput from the report is targetted for a printer. This action disables all controls under the export button. A user selects the export button 2720 to output the report to an export file. This action enables all export button controls. A user selects a file format for the export operation file utilizing the pull down menu 2730. A user selects a path/file name for the output file using the path data entry field 2740. The browse button 2750 allows a user to open a file save dialog to browse and set the file path or file name. The cancel button 2770 cancels the operation and closes the dialog. The ok button 2760 closes the dialog and starts the output process.

In an alternative embodiment fo the Register and Report functions described above, a separate financial application program, such as Quicken, could be utilized as a helper application with the internet program. This feature would have the additional advantage of allowing seamless reporting with other financial transactions bundled with the Quicken application. Another alternative embodiment could utilize JPEG format or GIF formatted files for storing and retrieving image files as a compression alternative. These standards are well known in the industry and proven effective for reducing the amount of storage that is necessary for saving graphic files and bitmapped images.

Payment Instrument Holders

Figure 28:
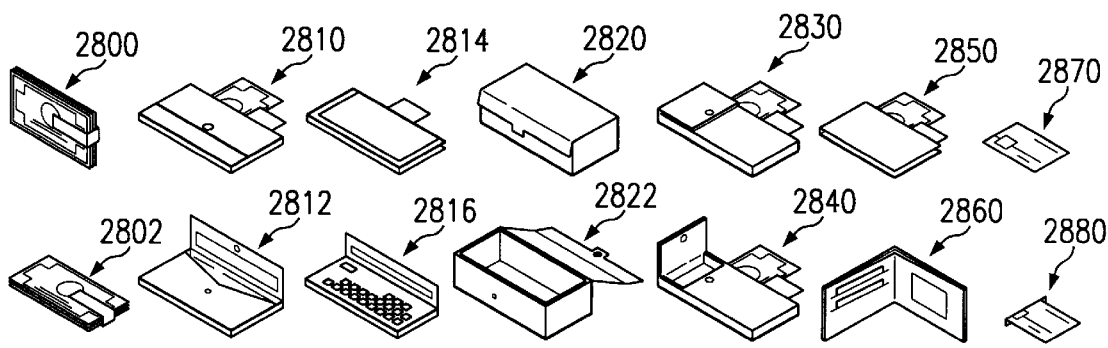
FIG. 28 illustrates a set of images illustrating "open" and "closed" icons for payment holders in accordance with a preferred embodiment.

FIG. 28 illustrates various payment instrument holders in accordance with a preferred embodiment. A moneyclip is shown at 2800 and 2802. Various wallets are shown in the closed position at 2810, 2814, 2830 and 2850; and in the open position at 2812, 2816, 2840 and 2860. A purse in the closed position is depicted at 2820 and in the open position at 2822. Finally, a smartcard is shown in the closed position at 2870 and in the open position at 2880. One of ordinary skill in the art will recognize that the depictions are representations of bit mapped images that could be stored as JPEG, GIF or other representations to conserve space.

Certificate Processing

A payment instrument must be certified by a "certificate issuing authority" before it can be used on a computer network. In the case of credit card payments, the issuer may be one of the card issuing banks, but it might also be a merchant (eg SEARS), a transaction acquiring bank or an association such as VISA or Mastercard.

Payment instrument information is stored in the consumer's wallet. The certificate which authorizes the payment instrument will be stored along with that data in a secured database. The process of acquiring a certificate is described below. A certificate can be delivered to a consumer in a preconfigured wallet. The consumer receives a wallet which contains the certificate together with the necessary details associated with a payment instrument including a payment instrument bitmap which is authorized by a certificate issuing authority or the agencies represented by the issuing authority.

Obtaining a certificate

A consumer will deliver or cause to be delivered information to a certificate issuing authority. FIG. 29 is an illustration of a certificate issuance form in accordance with a preferred embodiment. A user may fill out the form on-line, on paper and mail it in, or get his bank or credit card company to deliver it. The consumer delivered data will usually contain a public key belonging to a security key pair generated by consumer software. This information will normally be mailed to the consumer's address and actuated by a telephone call from the consumer. The certificate authority takes this information and uses it to validate that he is indeed entitled to use the payment method. This processing normally takes a few days to accomplish. Information will normally be exchanged with the organization issuing the payment method in the physical space if there is one, and with credit agencies. The certificate information is loaded into the consumer's software to enable payment processing to proceed online.

In some cases the consumer will be able to select details about a payment instrument holder (wallet) he desires to own. This may be the icon representing a holder 2930, the access password 2932, 2934 or other information. After creating the certificate, the issuing authority can use information received in the certificate application to create a custom payment instrument holder ready to use. This payment instrument holder will contain, for example the following information: payment instrument information including card number 2900 and expiration date 2902, and personal information including name 2904, address 2906, social security number 2908, date of birth 2910, and phone number 2912.

Figure 30:
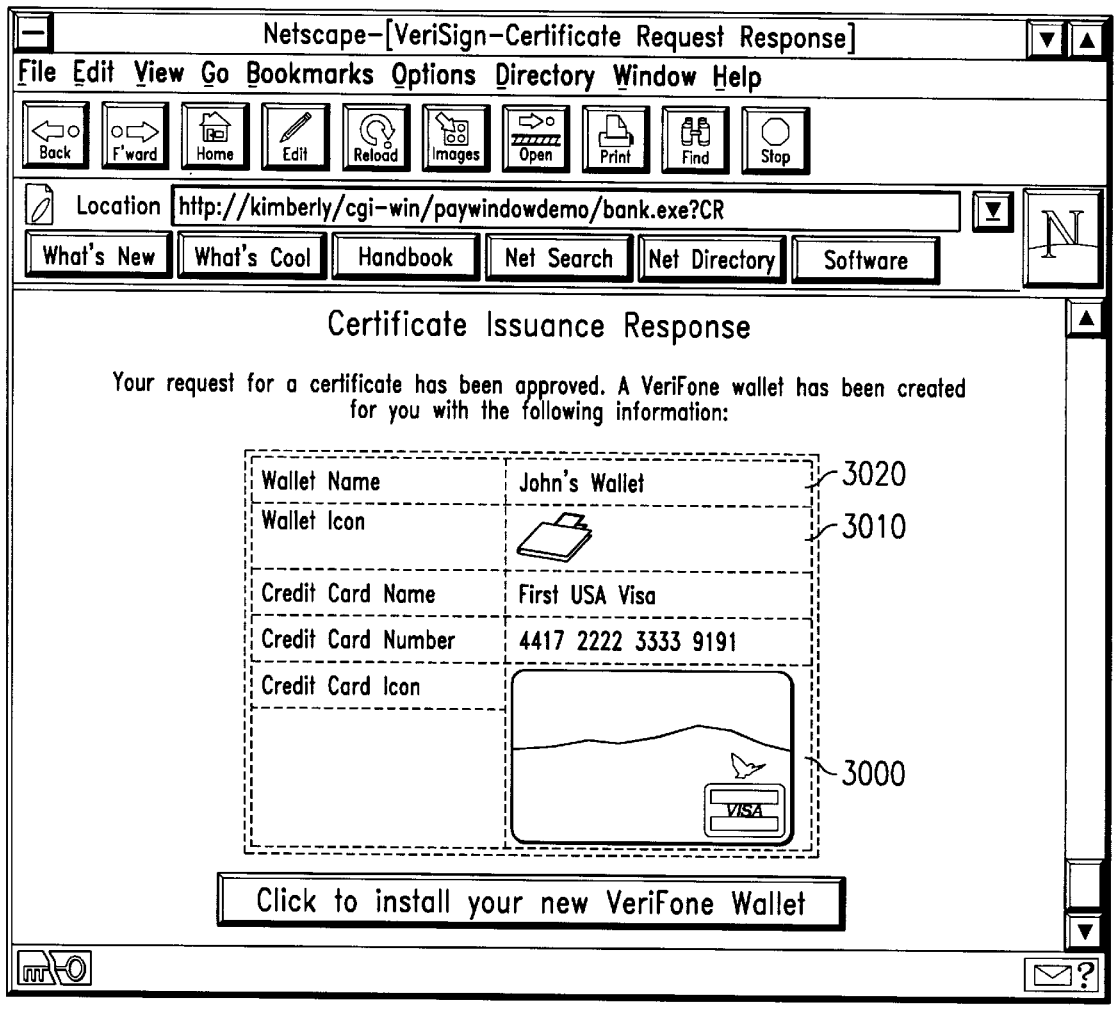
FIG. 30 illustrates a certificate issuance response in accordance with a preferred embodiment.
Figure 31:
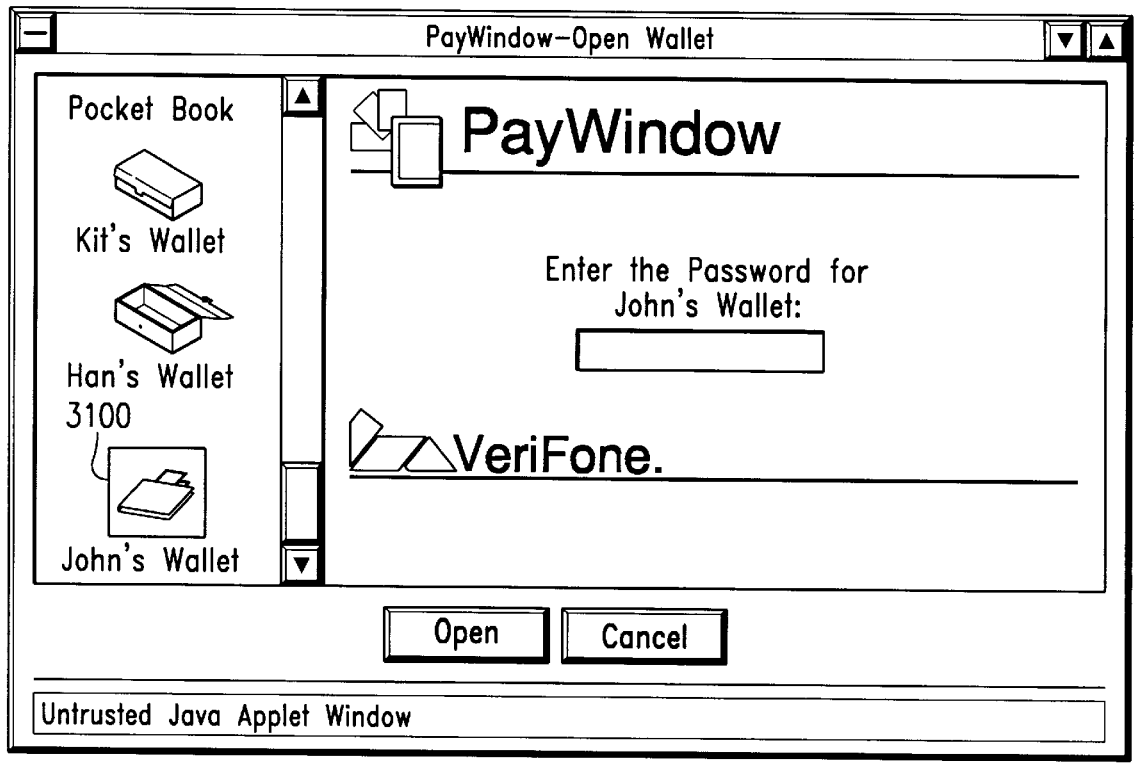
FIG. 31 illustrates a collection of payment instrument holders in accordance with a preferred embodiment.
Figure 32:
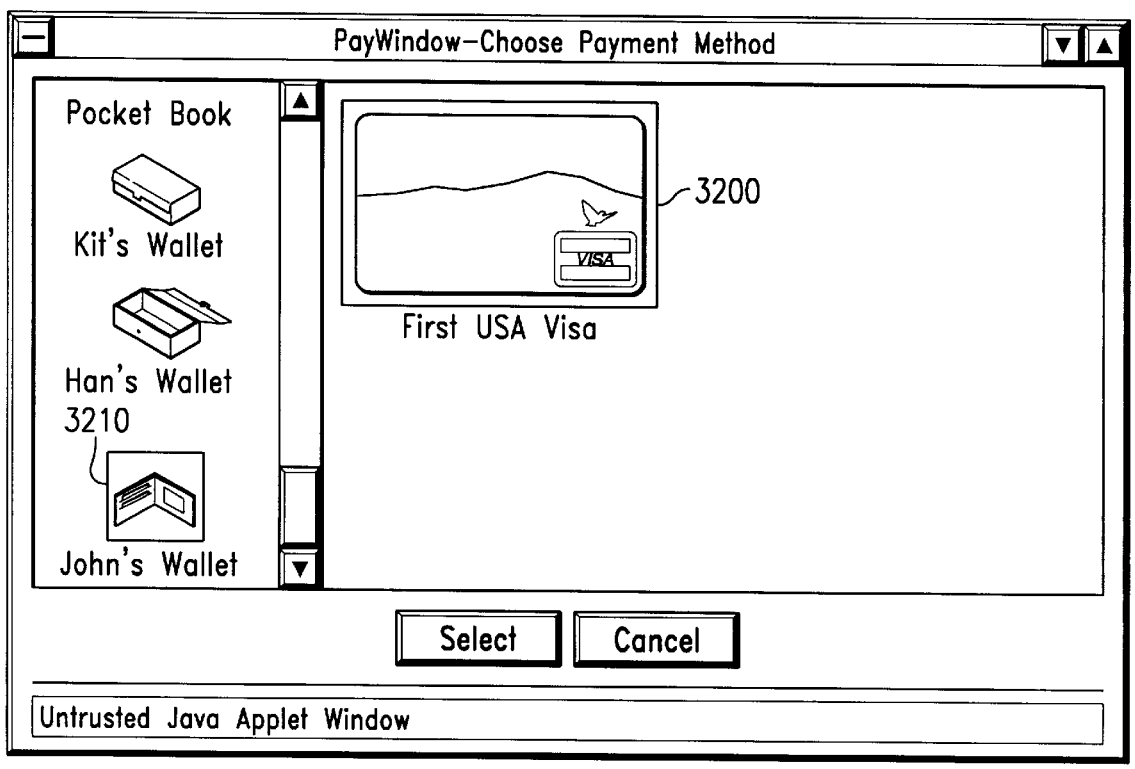
FIG. 32 illustrates the default payment instrument bitmap in accordance with a preferred embodiment.

The associated certificate (eg X509 standard ), an associated public key or in some cases public/private key pair (eg RSA), and an approved bitmap representing the payment instrument are provided to the requesting consumer. FIG. 30 illustrates a certificate issuance response in accordance with a preferred embodiment. An approved bitmap for a VISA card is shown at 3000. Also a default payment holder 3010 and a default payment holder name 3020 are provided with the certificate issuance. After the consumer acquires the payment instrument holder 3010, the payment instrument holder is immediately visible to him in his collection of payment instrument holders. FIG. 31 illustrates a collection of payment instrument holders in accordance with a preferred embodiment. The predefined payment instrument holder 3100 is the same JOHN's WALLET that was predefined based on defaults by the certificate issuance form. FIG. 32 illustrates the default payment instrument bitmap 3200 associated with the predefined payment instrument holder 3210 resulting from the consumer filling in and obtaining approval for a VISA card.

Figure 33:
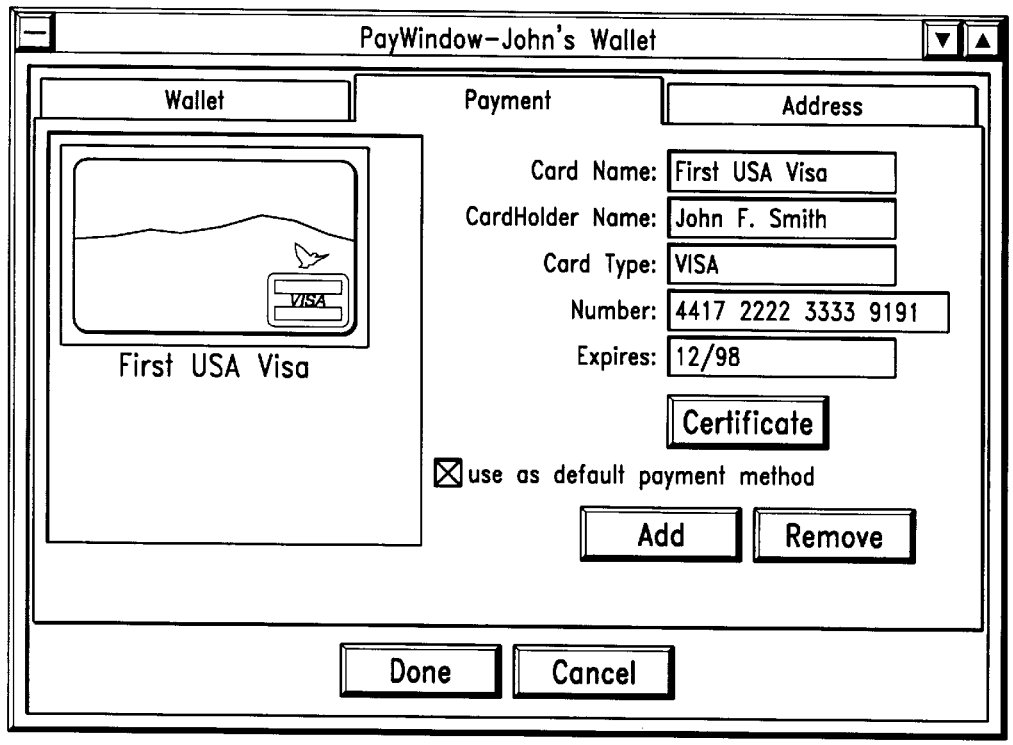
FIG. 33 illustrates a selected payment instrument with a fill in the blanks for the cardholder in accordance with a preferred embodiment.
Figure 34:
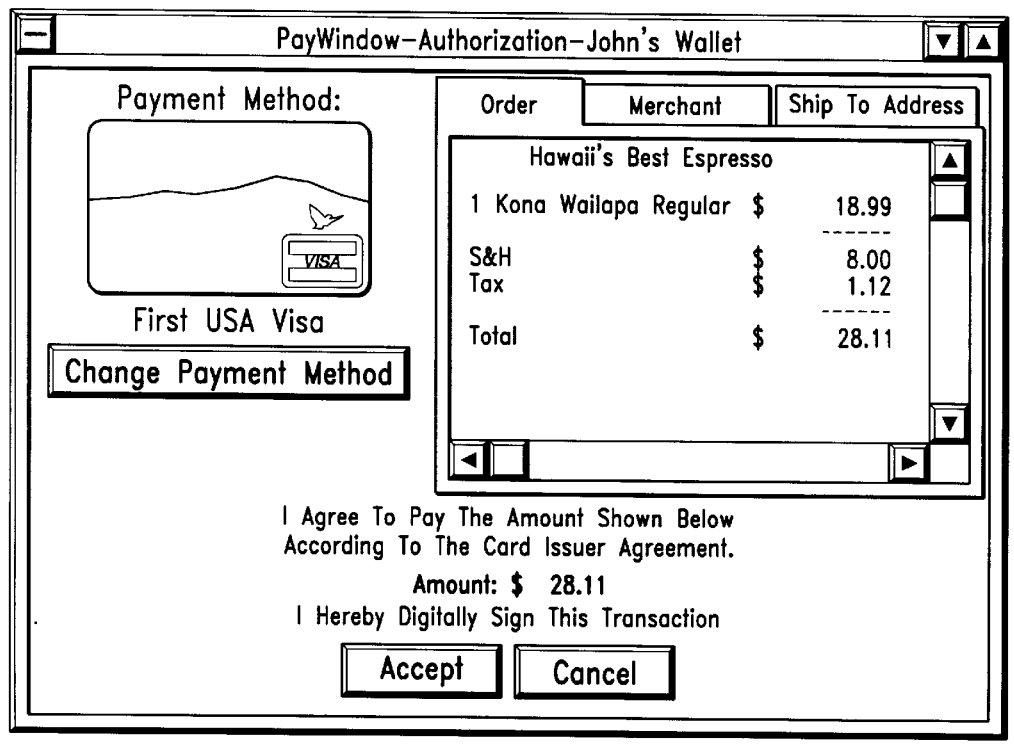
FIG. 34 illustrates a coffee purchase utilizing the newly defined VISA card in accordance with a preferred embodiment of the invention.

FIG. 33 illustrates a selected payment instrument with fill in the blanks for the cardholder in accordance with a preferred embodiment. The next time the payment instrument holder is opened in a payment context the certificate issuing authority's approved instrument bitmap can be used to select the payment instrument and utilize it to make purchases. FIG. 34 illustrates a coffee purchase utilizing the newly defined VISA card in accordance with a preferred embodiment of the invention.

While various embodiments of a preferred embodiment have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for obtaining a certificate for a payment instrument by using a first computer with an attached display connected by a network to a second computer, comprising the steps of:
   (a) displaying a certificate request form for the payment instrument on the display of the first computer for entry of one or more data elements;
   (b) detecting completion of data entry into the certificate request form;
   (c) assembling a request for the certificate using the one or more data elements;
   (d) transmitting the request for the certificate to the second computer;
   (e) creating the certificate for the payment instrument at the second computer;
   (f) generating a payment instrument holder containing the payment instrument at the second computer; and
   (g) delivering the certificate and the payment instrument holder to the first computer.

2. The method as recited in claim 1, wherein the payment instrument is represented in accordance with a bitmap selected based on the one or more data elements.

3. The method as recited in claim 1, including the step of determining if the certificate for the payment instrument should be granted.

4. The method as recited in claim 1, including the step of providing linkages in the payment instrument holder to other displays providing additional functions associated with processing payment information.

5. The method as recited in claim 1, including the step of prompting for an authorization code to authenticate the payment instrument.

6. The method as recited in claim 1, including the step of defining a payment method based on the one or more data elements.

7. The method as recited in claim 1, wherein the payment instrument is represented in accordance with preferences of an issuer of the payment instrument.

8. The method as recited in claim 1, wherein the payment instrument is represented in accordance with a bank's preference.

9. The method as recited in claim 1, further comprising the step of customizing the payment instrument holder using the one or more data elements.

10. The method as recited in claim 1, further comprising the step of customizing the payment instrument holder using one or more user preferences.

11. An apparatus for obtaining a certificate for a payment instrument by using a first computer with an attached display connected by a network to a second computer, comprising:
   (a) the first computer under the control of software for displaying a certificate request form for the payment instrument on the display of the first computer for the entry of one or more data elements;
   (b) the first computer under the control of software for detecting completion of data entry into the certificate request form;
   (c) the first computer under the control of software for assembling a request for the certificate using the one or more data elements;
   (d) the first computer under the control of software for transmitting the request for the certificate to the second computer;
   (e) the second computer under the control of software for creating the certificate for the payment instrument;
   (f) the second computer under the control of software for generating a payment instrument holder containing the payment instrument; and
   (g) the second computer under the control of software for delivering the certificate and the payment instrument holder to the first computer.

12. The apparatus as recited in claim 11, wherein the payment instrument is represented in accordance with a bitmap selected based on the one or more data elements.

13. The apparatus as recited in claim 11, wherein the payment instrument is represented in accordance with user defined preferences.

14. The apparatus as recited in claim 11, wherein the payment instrument is represented in accordance with preferences of an issuer of the payment instrument on the display.

15. The apparatus as recited in claim 11, further comprising the first computer under the control of software for customizing the payment instrument holder using the one or more data elements.

16. The apparatus as recited in claim 11, further comprising the first computer under the control of software for customizing the payment instrument holder using one or more user preferences.

17. A computer program embodied on two computer-readable mediums for obtaining a certificate for a payment instrument by using a first computer with an attached display connected by a network to a second computer, comprising:
   (a) a code segment on the first computer for displaying a certificate request form for the payment instrument on the display of the first computer for entry of one or more data elements;
   (b) a code segment on the first computer for detecting completion of data entry into the certificate request form;
   (c) a code segment on the first computer for assembling a request for the certificate using the one or more data elements;
   (d) a code segment on the first computer for transmitting the request for the certificate to the second computer;
   (e) a code segment on the second computer for creating the certificate for the payment instrument at the second computer;
   (f) a code segment on the second computer for generating a payment instrument holder containing the payment instrument at the second computer; and
   (g) a code segment on the second computer for delivering the certificate and the payment instrument holder to the first computer.

18. The computer program embodied on two computer-readable mediums as recited in claim 17, wherein the payment instrument is generated in accordance with a bitmap selected based on the one or more data elements.

19. The computer program embodied on two computer-readable mediums as recited in claim 17, further comprising a code segment on the first computer for customizing the payment instrument holder using the one or more data elements.

20. The computer program embodied on two computer-readable mediums as recited in claim 17, further comprising a code segment on the first computer for customizing the payment instrument holder using one or more user preferences.

21. A method for obtaining a certificate for a payment instrument by using a first computer with an attached display connected by a network to a second computer, comprising the steps of:

(a) displaying a certificate request form for the payment instrument on the display of the first computer for entry of one or more data elements;

(b) detecting completion of data entry into the certificate request form;

(c) assembling a request for the certificate using the one or more data elements;

(d) transmitting the request for the certificate to the second computer;

(e) creating the certificate and a bitmap for the payment instrument at the second computer; and (f) delivering the certificate and the bitmap to the first computer.

* * * * *